(12) United States Patent
Raghupathy et al.

(10) Patent No.: US 9,247,392 B2
(45) Date of Patent: Jan. 26, 2016

(54) SYSTEMS AND METHODS FOR LOCATION POSITIONING OF USER DEVICE

(71) Applicant: NextNav, LLC, Sunnyvale, CA (US)

(72) Inventors: Arun Raghupathy, Bangalore (IN); Ganesh Pattabiraman, Los Gatos, CA (US); Shubham Kumar, Bangalore (IN); Henry Clark, Chittenango, NY (US); Andrew Sendonaris, Los Gatos, CA (US); Steven J. Willhoff, Stateline, CA (US)

(73) Assignee: NextNav, LLC, Sunnyvale, CA (US)

( * ) Notice: Subject to any disclaimer, the term of this patent is extended or adjusted under 35 U.S.C. 154(b) by 164 days.

(21) Appl. No.: 13/909,977

(22) Filed: Jun. 4, 2013

(65) Prior Publication Data

US 2013/0324154 A1 Dec. 5, 2013

Related U.S. Application Data

(60) Provisional application No. 61/786,467, filed on Mar. 15, 2013, provisional application No. 61/655,787, filed on Jun. 5, 2012.

(51) Int. Cl.
| | |
|---|---|
| *H04W 4/02* | (2009.01) |
| *H04W 64/00* | (2009.01) |
| *G01S 19/10* | (2010.01) |
| *G01S 19/46* | (2010.01) |
| *G01S 5/02* | (2010.01) |

(52) U.S. Cl.
CPC ............ *H04W 4/025* (2013.01); *G01S 5/0236* (2013.01); *G01S 19/10* (2013.01); *G01S 19/46* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 5,327,144 A | 7/1994 | Stilp | |
| 5,406,091 A | 4/1995 | Burba | |
| 5,416,800 A | 5/1995 | Frank | |
| 5,600,706 A | 2/1997 | Dunn | |
| 5,604,765 A | 2/1997 | Bruno | |
| 5,652,592 A | 7/1997 | Sanderford et al. | |
| 5,754,657 A | 5/1998 | Schipper | |

(Continued)

FOREIGN PATENT DOCUMENTS

| | | |
|---|---|---|
| DE | 10107133 A1 | 8/2002 |
| JP | 2008-51808 A | 3/2008 |

(Continued)

OTHER PUBLICATIONS

B.W. Parkinson, J.J. Spilker: "The Global Positioning System: Theory and Applications, vol. 1", Jan. 1, 1996, American Institute of Aeronautics and Astronautics, Cambridge Massachusetts, XP002686935, pp. 121-133.

(Continued)

*Primary Examiner* — Daniel Lai

(57) ABSTRACT

Devices, systems, and methods for gathering, calculating and sending positioning information at a user device to one or more networks may be disclosed. In a first implementation the user device transforms pseudorange information relating to terrestrial beacons into GNSS pseudorange information. In a second implementation, the user device sends position information using GNSS information elements. In a third implementation, the user device sends position information using non-GNSS information elements.

24 Claims, 15 Drawing Sheets

(56) References Cited

U.S. PATENT DOCUMENTS

| | | |
|---|---|---|
| 5,758,288 A | 5/1998 | Dunn |
| 5,822,363 A | 10/1998 | Leroy |
| 5,912,644 A | 6/1999 | Wang |
| 5,924,037 A | 7/1999 | Mao |
| 5,959,580 A | 9/1999 | Maloney |
| 5,999,124 A | 12/1999 | Sheynblat |
| 6,094,168 A | 7/2000 | Duffet-Smith |
| 6,097,336 A | 8/2000 | Stilp |
| 6,101,178 A | 8/2000 | Beal |
| 6,127,975 A | 10/2000 | Maloney |
| 6,160,837 A | 12/2000 | Bruno |
| 6,172,644 B1 | 1/2001 | Stilp |
| 6,184,829 B1 | 2/2001 | Stilp |
| 6,201,803 B1 | 3/2001 | Munday |
| 6,266,013 B1 | 7/2001 | Stilp |
| 6,275,705 B1 | 8/2001 | Drane |
| 6,285,321 B1 | 9/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,342,854 B1 | 1/2002 | Duffet-Smith |
| 6,353,390 B1 | 3/2002 | Beri |
| 6,366,241 B2 | 4/2002 | Pack |
| 6,400,320 B1 | 6/2002 | Stilp |
| 6,433,739 B1 | 8/2002 | Soliman |
| 6,483,460 B2 | 11/2002 | Stilp |
| 6,518,918 B1 | 2/2003 | Vannucci et al. |
| 6,522,890 B2 | 2/2003 | Drane |
| 6,525,688 B2 | 2/2003 | Chou |
| 6,529,165 B1 | 3/2003 | Duffet-Smith |
| 6,559,800 B2 | 5/2003 | Rabinowitz |
| 6,603,428 B2 | 8/2003 | Stilp |
| 6,661,379 B2 | 12/2003 | Stilp |
| 6,665,541 B1 | 12/2003 | Krasner |
| 6,735,542 B1 | 5/2004 | Burgett et al. |
| 6,741,578 B1 | 5/2004 | Moon |
| 6,771,625 B1 | 8/2004 | Beal |
| 6,782,264 B2 | 8/2004 | Anderson |
| 6,831,943 B1 | 12/2004 | Dabak |
| 6,865,394 B2 | 3/2005 | Ogino |
| 6,873,290 B2 | 3/2005 | Anderson |
| 6,876,859 B2 | 4/2005 | Anderson |
| 6,894,644 B2 | 5/2005 | Duffet-Smith |
| 6,900,758 B1 | 5/2005 | Mann |
| 6,937,866 B2 | 8/2005 | Duffet-Smith |
| 6,959,032 B1 | 10/2005 | Richards |
| 6,996,392 B2 | 2/2006 | Anderson |
| 6,999,780 B1 | 2/2006 | Zhao |
| 7,006,834 B2 | 2/2006 | Gaal |
| 7,023,383 B2 | 4/2006 | Stilp |
| 7,031,722 B2 | 4/2006 | Naghian |
| 7,126,527 B1 | 10/2006 | Bajikar |
| 7,126,536 B2 | 10/2006 | Rabinowitz et al. |
| 7,149,504 B1 * | 12/2006 | Weaver et al. ............ 455/414.2 |
| 7,167,713 B2 | 1/2007 | Anderson |
| 7,203,499 B2 | 4/2007 | Wigren |
| 7,251,562 B1 | 7/2007 | Brodie |
| 7,260,407 B2 | 8/2007 | Duffet-Smith |
| 7,271,765 B2 | 9/2007 | Stilp |
| 7,315,745 B2 | 1/2008 | Duffet-Smith |
| 7,327,310 B2 | 2/2008 | Abraham |
| 7,340,259 B2 | 3/2008 | Maloney |
| 7,359,719 B1 | 4/2008 | Duffett-Smith |
| 7,423,580 B2 | 9/2008 | Markhovsky |
| 7,433,321 B2 | 10/2008 | Grilli |
| 7,508,883 B2 | 3/2009 | Duffet-Smith |
| 7,561,048 B2 | 7/2009 | Yushkov |
| 7,593,736 B1 | 9/2009 | Duffet-Smith |
| 7,616,155 B2 | 11/2009 | Bull |
| 7,636,061 B1 | 12/2009 | Thomas |
| 7,639,179 B2 | 12/2009 | Hansen |
| 7,652,622 B2 | 1/2010 | Hansen |
| 7,706,328 B2 | 4/2010 | Mukkavilli |
| 7,706,754 B2 | 4/2010 | Krasner |
| 7,751,949 B2 | 7/2010 | Alanen et al. |
| 7,760,132 B1 | 7/2010 | Markhovsky |
| 7,783,299 B2 | 8/2010 | Anderson |
| 7,787,886 B2 | 8/2010 | Markhovsky |
| 7,796,549 B2 | 9/2010 | Grilli |
| 7,797,000 B2 | 9/2010 | Anderson |
| 7,804,448 B2 | 9/2010 | Bull |
| 7,822,424 B2 | 10/2010 | Markhovsky |
| 7,826,343 B2 | 11/2010 | Krasner |
| 7,852,267 B2 | 12/2010 | Duffet-Smith |
| 7,872,583 B1 | 1/2011 | Markhovsky |
| 7,876,265 B2 | 1/2011 | Black |
| 7,893,873 B2 | 2/2011 | Black |
| 7,903,633 B2 | 3/2011 | Grilli |
| 7,911,988 B2 | 3/2011 | Riley |
| 7,912,057 B2 | 3/2011 | Petry |
| 7,956,804 B2 | 6/2011 | Jin |
| 7,961,717 B2 | 6/2011 | Lee et al. |
| 7,962,162 B2 | 6/2011 | McNair |
| 7,969,311 B2 | 6/2011 | Markhovsky |
| 7,978,136 B2 | 7/2011 | Duffet-Smith |
| 8,013,788 B2 | 9/2011 | Duffet-Smith |
| 8,041,505 B2 | 10/2011 | Pierce |
| 8,050,687 B2 | 11/2011 | Duffet-Smith |
| 8,059,028 B2 | 11/2011 | Boyer et al. |
| 8,102,317 B2 | 1/2012 | Lee |
| 8,103,294 B2 | 1/2012 | Duffet-Smith |
| 8,106,828 B1 | 1/2012 | Do |
| 8,109,168 B2 | 2/2012 | Wurm |
| 8,130,141 B2 | 3/2012 | Pattabiraman |
| 8,150,415 B2 | 4/2012 | Kim et al. |
| 8,154,442 B2 | 4/2012 | Alanen et al. |
| 8,160,610 B2 | 4/2012 | Harper et al. |
| 8,165,064 B2 | 4/2012 | Mukkavilli |
| 8,233,091 B1 | 7/2012 | Rabinowitz |
| 8,233,911 B2 | 7/2012 | Charbit et al. |
| 8,242,959 B2 | 8/2012 | Mia et al. |
| 8,243,712 B2 | 8/2012 | Krasner |
| 8,244,275 B2 | 8/2012 | Islam |
| 8,249,619 B2 | 8/2012 | Kong |
| 8,253,628 B2 | 8/2012 | Duffet-Smith |
| 8,255,160 B2 | 8/2012 | Duffet-Smith |
| 8,279,116 B2 | 10/2012 | Duffet-Smith |
| 8,295,853 B2 | 10/2012 | Heikkila |
| 8,305,215 B2 | 11/2012 | Markhovsky |
| 8,306,523 B2 | 11/2012 | Fischer |
| 8,306,676 B1 | 11/2012 | Ingvalson et al. |
| 8,325,661 B2 | 12/2012 | Montojo |
| 8,335,522 B2 | 12/2012 | Mate et al. |
| 8,390,512 B2 | 3/2013 | Ische |
| 8,401,033 B2 | 3/2013 | Palanki |
| 8,401,111 B2 | 3/2013 | Sampath |
| 8,401,570 B2 | 3/2013 | Wigren et al. |
| 8,412,227 B2 | 4/2013 | Edge |
| 8,412,239 B1 | 4/2013 | Palanki |
| 8,472,971 B2 | 6/2013 | Rowe |
| 8,489,124 B2 | 7/2013 | Mukkavilli |
| 2002/0087628 A1 | 7/2002 | Rouse |
| 2002/0181565 A1 | 12/2002 | Boyd |
| 2003/0011511 A1 * | 1/2003 | King et al. ............... 342/357.02 |
| 2003/0174090 A1 | 9/2003 | Spilker |
| 2004/0180669 A1 | 9/2004 | Kall |
| 2004/0242205 A1 | 12/2004 | Yamane |
| 2005/0052318 A1 | 3/2005 | Jendbro |
| 2005/0078032 A1 | 4/2005 | Gilkes |
| 2005/0176441 A1 | 8/2005 | Jurecka |
| 2005/0228613 A1 | 10/2005 | Fullerton |
| 2005/0254558 A1 | 11/2005 | Dutka |
| 2005/0278120 A1 | 12/2005 | Manfred |
| 2005/0285790 A1 | 12/2005 | Gagnon |
| 2006/0111840 A1 | 5/2006 | Van Diggelen |
| 2007/0013584 A1 | 1/2007 | Camp |
| 2007/0016346 A1 | 1/2007 | Alanen |
| 2007/0030841 A1 | 2/2007 | Lee |
| 2007/0063896 A1 | 3/2007 | Alban |
| 2007/0133391 A1 | 6/2007 | Roh |
| 2007/0142013 A1 | 6/2007 | Bucknor |
| 2007/0157283 A1 | 7/2007 | Setlur |
| 2007/0168124 A1 | 7/2007 | Dossas |
| 2007/0218823 A1 | 9/2007 | Wolf |

(56) References Cited

U.S. PATENT DOCUMENTS

| | | |
|---|---|---|
| 2008/0022352 A1 | 1/2008 | Seo |
| 2008/0032706 A1 | 2/2008 | Sheynblat |
| 2008/0166974 A1 | 7/2008 | Teo |
| 2008/0304520 A1 | 12/2008 | Hannuksela |
| 2008/0309557 A1 | 12/2008 | Mailaender |
| 2009/0121927 A1 | 5/2009 | Moshfeghi |
| 2009/0146871 A1 | 6/2009 | Abraham |
| 2009/0196177 A1 | 8/2009 | Teyeb |
| 2009/0225816 A1 | 9/2009 | Cheng |
| 2009/0256750 A1 | 10/2009 | Mathews |
| 2009/0286556 A1 | 11/2009 | Yumoto |
| 2010/0039316 A1 | 2/2010 | Gronemeyer |
| 2010/0049469 A1 | 2/2010 | Wirola et al. |
| 2010/0073229 A1 | 3/2010 | Pattabiraman |
| 2010/0130229 A1 | 5/2010 | Sridhara et al. |
| 2010/0204916 A1 | 8/2010 | Garin |
| 2010/0250134 A1 | 9/2010 | Bornstein et al. |
| 2010/0260154 A1 | 10/2010 | Frank et al. |
| 2010/0309057 A1 | 12/2010 | Edge et al. |
| 2011/0057836 A1 | 3/2011 | Ische et al. |
| 2011/0227790 A1 | 9/2011 | Li |
| 2011/0317613 A1 | 12/2011 | Gerstenberger |
| 2012/0013475 A1 | 1/2012 | Farley et al. |
| 2012/0027110 A1 | 2/2012 | Han et al. |
| 2012/0072110 A1 | 3/2012 | Venkatraman |
| 2012/0122478 A1 | 5/2012 | Siomina et al. |
| 2012/0182180 A1 | 7/2012 | Wolf |
| 2012/0290253 A1 | 11/2012 | Barrett et al. |
| 2012/0316831 A1 | 12/2012 | Klinghult |
| 2013/0023285 A1 | 1/2013 | Markhovsky et al. |
| 2013/0033999 A1 | 2/2013 | Siomina et al. |
| 2013/0045759 A1 | 2/2013 | Smith |
| 2013/0057434 A1 | 3/2013 | Krasner |
| 2013/0057436 A1 | 3/2013 | Krasner |
| 2013/0063302 A1 | 3/2013 | Krasner |
| 2013/0063307 A1 | 3/2013 | Krasner |
| 2013/0063308 A1 | 3/2013 | Krasner |
| 2013/0122930 A1 | 5/2013 | Woo et al. |
| 2013/0169484 A1 | 7/2013 | Raghupathy |
| 2013/0252629 A1 | 9/2013 | Wigren et al. |
| 2013/0271324 A1 | 10/2013 | Sendonaris et al. |

FOREIGN PATENT DOCUMENTS

| | | | |
|---|---|---|---|
| WO | WO 2007011334 A1 | 1/2007 | |
| WO | WO 2007096683 A1 | 8/2007 | |
| WO | WO 2008069712 A1 | 6/2008 | |
| WO | WO 2010030825 A1 | 3/2010 | |
| WO | WO2011019357 A1 | 2/2011 | |
| WO | WO 2011020083 A1 | 2/2011 | |
| WO | WO 2012065184 A2 | 5/2012 | |
| WO | WO 2013003492 A1 | 1/2013 | |
| WO | WO 2013003636 A2 | 1/2013 | |
| WO | WO 2013019986 A1 | 2/2013 | |

OTHER PUBLICATIONS

Form PCT/ISA/220, PCT/US2009/056572, "Notification of Transmittal of the International Search Report and the Written Opinion of the International Searching Authority, or the Declaration", 1 page; Form PCT/ISA/210, PCT/US2009/056572, "International Search Report", 2 pages; Form PCT/ISA/237, PCT/US2009/056572, "Written Opinion of the International Searching Authority", 3 pages, Date of mailing: Nov. 3, 2009.
Form PCT/ISA/220, PCT/US2011/060655, "Notification of Transmittal of the International Search Report and the Written Opinion of the International Searching Authority, or the Declaration", 1 page; Form PCT/ISA/210, PCT/US2011/060655, "International Search Report", 6 pages; Form PCT/ISA/237, PCT/US2011/060655, "Written Opinion of the International Searching Authority", 22 pages, Date of mailing: May 10, 2012.
Form PCT/ISA/220, PCT/US2012/044452, "Notification of Transmittal of the International Search Report and the Written Opinion of the International Searching Authority, or the Declaration", 1 page; Form PCT/ISA/210, PCT/US2012/044452, "International Search Report", 5 pages; Form PCT/ISA/237, PCT/US2012/044452, "Written Opinion of the International Searching Authority", 10 pages, Date of mailing: Dec. 6, 2012.
Form PCT/ISA/220, PCT/US2012/044719, "Notification of Transmittal of the International Search Report and the Written Opinion of the International Searching Authority, or the Declaration", 1 page; Form PCT/ISA/210, PCT/US2012/044719, "International Search Report", 2 pages, Date of mailing: Jan. 25, 2013.
Form PCT/ISA/220, PCT/US2012/049390, "Notification of Transmittal of the International Search Report and the Written Opinion of the International Searching Authority, or the Declaration", 1 page; Form PCT/ISA/210, PCT/US2012/049390, "International Search Report", 2 pages; Form PCT/ISA/237, PCT/US2012/049390, "Written Opinion of the International Searching Authority", 15 pages, Date of mailing: Nov. 15, 2012.
Form PCT/ISA/206, PCT/US2013/036634, "Invitation to Pay Additional Fees and, Where Applicable, Protest Fee", 5 pages.
"Extended GPS Navigation Bits Message", 3GPP2 Draft; C16-20040112-005 QCOM NAV BIT MSG, $3^{RD}$ Generation Partnership Project 2, 3GPP2, 2500 Wilson Boulevard, Suite 300, Arlington, Virginia 22201, vol. TSGC, Jan. 16, 2004, XP062049825.
"Digital cellular telecommunications system (Phase 2+); Location Services (LCS); Mobile Station (MS)—Serving Mobile Location Center (SMLC) Radio Resource LCS Protocol (RRLP) (3GPP TS 44.031 version 10.0.0 Release 10", Technical Specification, European Telecommunications Standards Institute (ETSI), 650, Route Des Lucioles; F-06921 Sophia-Antipolis; France, vol. 3GPP GERAN 2, No. V 10.0.0, May 1, 2011, XP014066483.
Form PCT/ISA/220, PCT/US2013/044147, "Notification of Transmittal of the International Search Report and the Written Opinion of the International Searching Authority, or the Declaration", 1 page; Form PCT/ISA/210, PCT/ US2013/044147, "International Search Report ", 4 pages; Form PCT/ISA/237, PCT/ US2013/044147, "Written Opinion of the International Searching Authority", 8 pages, Date of mailing: Sep. 9, 2013.
Form PCT/ISA/220, PCT/US2013/036634, "Notification of Transmittal of the International Search Report and the Written Opinion of the International Searching Authority, or the Declaration", 1 page; Form PCT/ISA/210, PCT/ US2013/036634, "International Search Report", 7 pages; Form PCT/ISA/237, PCT/US2013/036634, "Written Opinion of the International Searching Authority", 11 pages.
Response to Search Report for European Patent Application No. 13730729.4, 14 pages. (dated Jul. 1, 2015).

\* cited by examiner

SYSTEMS AND METHODS FOR LOCATION POSITIONING OF USER DEVICE

CROSS REFERENCE TO RELATED APPLICATIONS

This application claims priority under 35 U.S.C. §119(e) to U.S. Provisional Patent Application Ser. No. 61/655,787, filed Jun. 5, 2012, entitled WIDE AREA POSITIONING SYSTEMS AND METHODS FOR UE-BASED AND UE-ASSISTED LOCATION POSITIONING ON MULTIPLE NETWORKS, the content of which is hereby incorporated by reference herein in its entirety for all purposes.

This application claims priority under 35 U.S.C. §119(e) to U.S. Provisional Patent Application Ser. No. 61/786,467, filed Mar. 15, 2013, entitled WIDE AREA POSITIONING SYSTEMS AND METHODS FOR UE-BASED AND UE-ASSISTED LOCATION POSITIONING ON MULTIPLE NETWORKS, the content of which is hereby incorporated by reference herein in its entirety for all purposes.

FIELD

This disclosure relates generally to positioning systems. More specifically, but not exclusively, the disclosure relates to devices, systems, and methods for providing signaling for position determination and determining high accuracy position/location information for a user device using an array of transmitters in communication with the user device.

BACKGROUND

Systems for providing position information, such as Global Navigation Satellite Systems (GNSS), have been used to determine position information for persons, vehicles, equipment, and the like. These systems have limitations associated with factors such as location accuracy, transmitted and received signal levels, radio channel interference and/or channel problems such as multipath, device power consumption, and the like. Determination of an exact location of a computing device can be quite challenging. If the device is indoors or in an urban area with obstructions, the device may not be able to receive signals from satellites, and the network may be forced to rely on network-based triangulation/multi-lateration methods that are less precise. Additionally, if the device is in a multi-story building, knowing only that the device is in the building and not the floor on which is resides, will result in delays in providing emergency assistance (which could be potentially life-threatening). Clearly, a system that can assist the device in speeding up the location determination process, provide greater 3-dimensional accuracy, and solve some of the challenges of location determination in urban areas and inside buildings is needed. Adding to this challenge is the FCC's directive to increase emergency call location accuracy requirements for cellular service providers and device manufacturers. Accordingly, solutions that improve location calculation capabilities are needed.

SUMMARY

This disclosure relates generally to positioning systems. More specifically, but not exclusively, the disclosure relates to devices, systems, and methods for providing and processing signaling in relation to determining the location of a user device. In accordance with certain aspects, signals from an array of transmitters may be used by the user device and/or a server to quickly and accurately determine the location of the user device in terms of latitude, longitude and altitude. Various aspects for determining and using the location of a user are described in more detail herein.

Some aspects relate to user devices, transmitters and other system components that are configured to gather, calculate and transmit positional information within a suitable network. The network may include a system with an array of terrestrial transmitters and one or more user devices. The user device may transform pseudo-range information relating to particular transmitters into GNSS pseudo-range information before sending that information to the network. Alternatively, the user device may transmit pseudo-range information using modified GNSS information elements, or using new information elements. Additional aspects are described below in conjunction with the Drawings, Detailed Description and Claims

DETAILED DESCRIPTION

This disclosure relates generally to systems and methods for determining a position (also denoted herein as "location")

of a user device. It is noted that, in the context of this disclosure, a positioning system is one that localizes one or more of latitude, longitude, and altitude coordinates, which may also be described or illustrated in terms of one, two, or three dimensional coordinate systems (e.g., x, y, z coordinates, angular coordinates, and the like).

The disclosure also relates generally to networks of transmitters configured to broadcast positioning signals to various user devices. A position of a particular user device may be computed by that user device using the broadcast position signal and (optionally) other information available to the user device from the transmitter, sensors at the user device, and other components. Alternatively, the position of the user device may be computed by a server that is coupled directly or indirectly (though other components) to the user device via wireless or wired means described elsewhere herein.

In the following description, numerous specific details may be introduced to provide a thorough understanding of, and enabling description for, the systems and methods described. One skilled in the relevant art, however, will recognize that these embodiments can be practiced without one or more of the specific details, or with other components, systems, and the like. In other instances, well-known structures or operations may not be shown, or may not be fully described, to avoid obscuring aspects of the embodiments.

System Aspects

Figure 1:
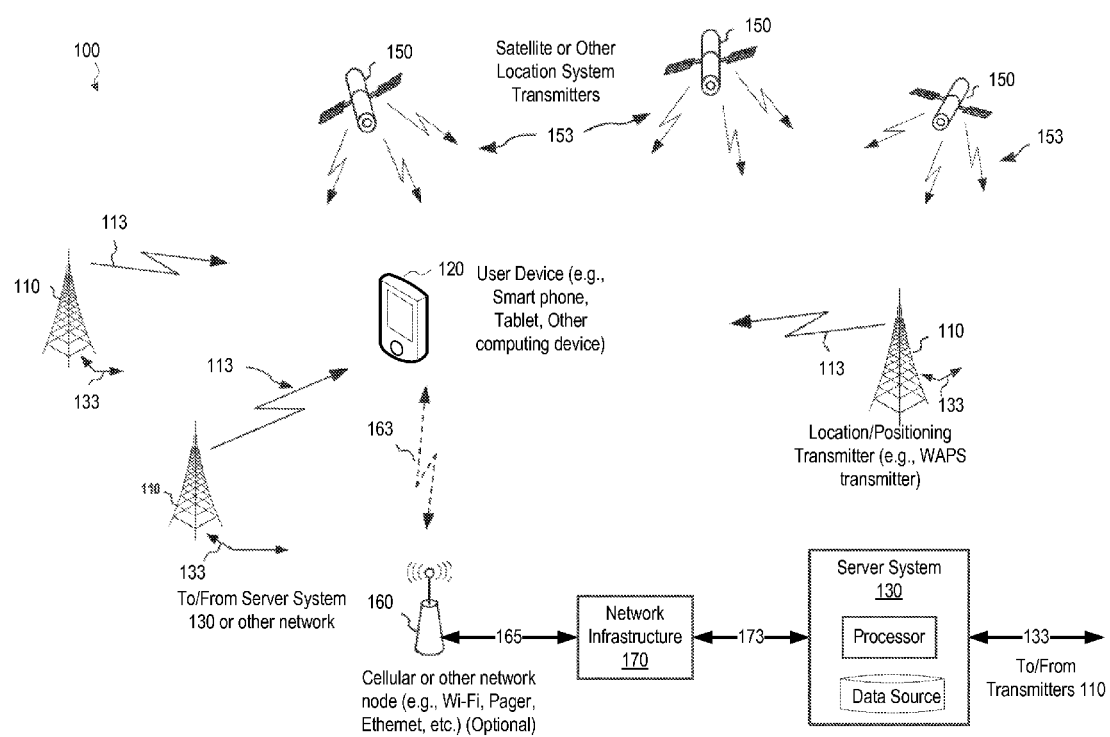
FIG. 1 depicts aspects of a positioning system.

FIG. 1 is a block diagram illustrating details of an example positioning system 100 on which various embodiments may be implemented. Positioning system 100 includes a network of synchronized transmitters 110 (also denoted herein as "beacons" or "towers"), which are depicted as terrestrial, as well any number of user devices 120 configured to acquire and track signals provided from the transmitters 110 and/or other networks like a network of satellites 150 and/or a terrestrial network node 160. A user device 120 may include a location computation engine (not shown) to determine position information based on the signals received from the transmitters 110 or other networks (e.g., satellites 150, node 160 comprising a cellular telephony transmitter).

The system 100 may further include a server system 130 in communication with various other systems, such as the transmitters 110, the user device 120, and one or more network infrastructures 170 (e.g., the Internet, cellular networks, wide or local area networks, and/or other networks). The server system 130 may include various system-related information, such as an index of the transmitters 110, a billing interface, one or more encryption algorithm processing modules, which may be based on one or more encryption algorithms, a location computation engine module, and/or other processing modules to facilitate position, motion, and/or location determination for users of the system 100. The server system 130 may also comprise one or more data sources (not shown) that store information described herein.

A single user device 120 is shown in FIG. 1 for simplicity, however, the system 100 would typically be configured to support many user devices 120 within a defined coverage area. The user device 120 may be any of a variety of electronic devices configured to receive signaling from the transmitters 110, as well as optionally configured to receive signaling using various connection means, including wired means (e.g., Ethernet or other cable channels as is known or later developed in the art) or wireless means (radio frequency, Wi-Fi, Wi-Max, Bluetooth, or other wireless channels as is known or later developed in the art). Each user device 120 may be in the form of a cellular or smart phone, a tablet device, a PDA, a notebook or other computing device, and/or similar or equivalent devices. It is noted that different terms are used to specify user devices 120, including User Equipment (UE), Mobile Station (MS), User Terminal (UT), SUPL Enabled Terminal (SET), Receiver (Rx), and Mobile Device (among others known by one of skill in the art). Any of these terms may be used herein to refer to the user device 120. It is also noted that user devices 120 may communicate with different networks using standardized or non-standardized communication protocols. Such networks may also be referred to herein as "Service Providers" (SP).

The user devices 120 may have communication connectivity with various system components. For example, the user devices 120 may receive and/or send signaling from multiple transmitters 110 via corresponding communication links 113. User devices 120 may also be configured to receive and/or send other signals via communication link 163 to a network node 160 (e.g., a cellular base station, a Wi-Fi hotspot, and others). User devices 120 may also receive and/or send signaling from satellites 150 via satellite communication links 153. While the satellite positioning signaling shown in the exemplary embodiment of FIG. 1 is shown as being provided from GPS system satellites 150, in other embodiments the signaling may be provided from other satellite systems. User devices 120 may also receive and/or send signaling from the server system 130, other user devices 120, and the network infrastructure (connectivity not shown). Communication connectivity between a user device 120 and other system components may be carried out using wired and wireless means disclosed elsewhere herein.

The transmitters 110 of system 100 may be configured to operate in an exclusively licensed or shared licensed/unlicensed radio spectrum; however, some embodiments may be implemented to provide signaling in an unlicensed shared spectrum. The transmitters 110 may transmit signaling in these various radio bands using signaling described in the incorporated reference identified elsewhere herein. This signaling may be in the form of a signal configured to provide specific data in a defined format advantageous for location and navigation purposes. For example, the signaling may be structured to be particularly advantageous for operation in obstructed environments, such as where traditional satellite position signaling is attenuated and/or impacted by reflections, multipath, and the like. In addition, the signaling may be configured to provide fast acquisition and position determination times to allow for reduced power consumption while enabling quick location determination upon user device power-on or location activation.

The transmitters 110 may be configured to send transmitter signals to multiple user devices 120. The transmitter signals may be transmitted via communication links 113, and may include positioning and other signaling. The transmitters 110 may also be connected to the server system 130 via communication links 133, and/or may have other communication connections (not shown) to the nodes 160 and the network infrastructure 170. Communication connectivity between a transmitter 110 and other system components may be carried out using wired and wireless means disclosed elsewhere herein.

Wide Area Positioning System (WAPS) Network

Reference may be made herein to a "Wide Area Positioning System" (WAPS) network. The term "Metropolitan Beacon System" (MBS) may also refer to the WAPS network. The WAPS network may include any number of components shown in FIG. 1, including the transmitters 110 located at different geographic positions in a geographic coverage area within which one or more user devices 120 may reside at a given point in time. The WAPS network may also include, for example, the server system 130 of FIG. 1. Additionally, user devices (e.g., user devices 120 of FIG. 1) may be "WAPS-compatible" in a manner that permits those user devices to communicate with the WAPS network components, to process the WAPS network information (e.g., information from the transmitters 110, the server system 130, or other components), and to generate information for use within the WAPS network.

Various embodiments of the WAPS network may be combined with or used by other positioning systems (e.g., GNSS positioning systems, cellular positioning systems) to provide enhanced location and position determination. Accordingly, information determined within the WAPS network may be provided to other networked systems. For example, in a cellular network, a cellular backhaul link 165 may be used to provide information from user devices 120 to associated cellular carriers and/or others (not shown) via network infrastructure 170. This may be used to quickly and accurately locate the position of user device 120 during an emergency, or may be used to provide location-based services or other functions from cellular carriers or other network users or systems.

Transmitters 110 may be configured to broadcast positioning information, and/or other data or information, in transmitter output signals to the user devices 120. The positioning signals may be coordinated so as to be synchronized across all transmitters of a particular system or regional coverage area, and may use a disciplined GPS clock source for timing synchronization. Positioning transmissions may include dedicated communication channel resources (e.g., time, code and/or frequency) to facilitate transmission of data required for trilateration, notification to subscriber/group of subscribers, broadcast of messages, general operation of the WAPS network, and/or for other purposes.

Positioning data may include two specific types of information: (1) a high speed ranging signal, and (2) location data such as transmitter ID and position, time of day, health, environmental conditions such as pressure and temperature data, and other data. Positioning data may further include messages or information such as notification/access control messages for a group of subscribers, general broadcast messages, and/or other data or information related to system operation, users, interfaces with other networks, and other system functions. The positioning data may be provided in a number of ways as disclosed in the incorporated references listed elsewhere herein.

Additional disclosure regarding various features of the WAPS network are described in the following co-assigned patent applications which are incorporated by reference in their entirety for any and all purposes: U.S. Utility patent application Ser. No. 13/412,487, entitled WIDE AREA POSITIONING SYSTEMS, filed on Mar. 5, 2012; U.S. Utility patent Ser. No. 12/557,479 (now U.S. Pat. No. 8,130,141), entitled WIDE AREA POSITIONING SYSTEM, filed Sep. 10, 2009; U.S. Utility patent application Ser. No. 13/412,508, entitled WIDE AREA POSITIONING SYSTEM, filed Mar. 5, 2012; U.S. Utility patent application Ser. No. 13/296,067, entitled WIDE AREA POSITIONING SYSTEMS, filed Nov. 14, 2011; Application Serial No. PCT/US12/44452, entitled WIDE AREA POSITIONING SYSTEMS, filed Jun. 28, 2011); U.S. patent application Ser. No. 13/535,626, entitled CODING IN WIDE AREA POSITIONING SYSTEMS, filed Jun. 28, 2012; U.S. patent application Ser. No. 13/565,732, entitled CELL ORGANIZATION AND TRANSMISSION SCHEMES IN A WIDE AREA POSITIONING SYSTEM, filed Aug. 2, 2012; U.S. patent application Ser. No. 13/565,723, entitled CELL ORGANIZATION AND TRANSMISSION SCHEMES IN A WIDE AREA POSITIONING SYSTEM, filed Aug. 2, 2012; U.S. patent application Ser. No. 13/831,740, entitled SYSTEMS AND METHODS CONFIGURED TO ESTIMATE RECEIVER POSITION USING TIMING DATA ASSOCIATED WITH REFERENCE LOCATIONS IN THREE-DIMENSIONAL SPACE, filed Mar. 14, 2013. The above applications, publications and patents may be individually or collectively referred to herein as "incorporated reference(s)", "incorporated application(s)", "incorporated publication(s)", "incorporated patent(s)" or otherwise designated. The various aspects, details, devices, systems, and methods disclosed herein may be combined with disclosures in any of the incorporated references.

Transmitters

Figure 2:
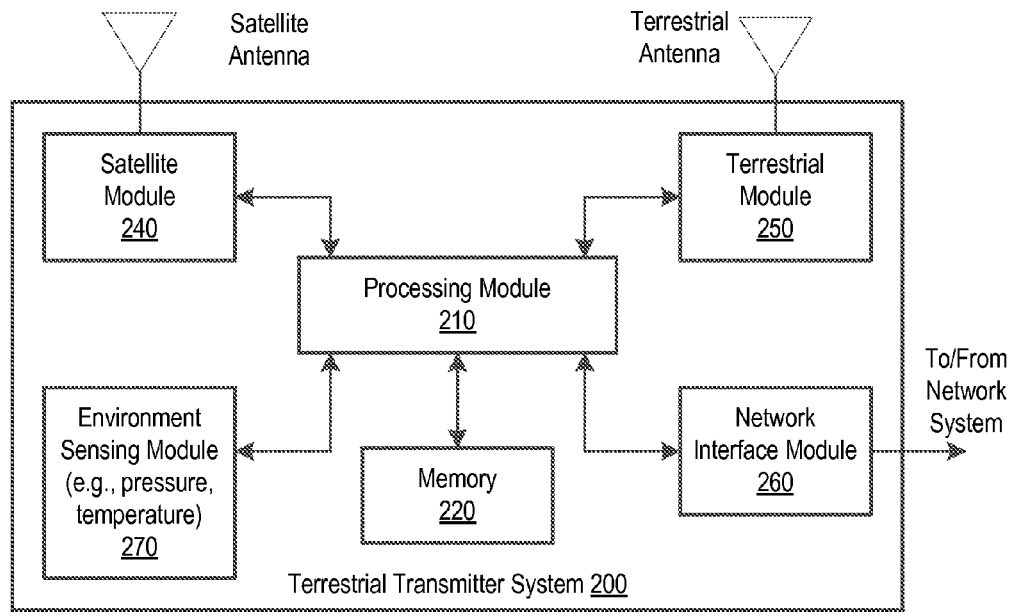
FIG. 2 depicts aspects of a transmitter in the positioning system in FIG. 1.

FIG. 2 is a block diagram illustrating details of a transmitter system 200 from which positioning signals may be sent, which may correspond to transmitters 110 of FIG. 1. Transmitter system 200 is depicted as including blocks for performing associated signal reception and/or processing. These blocks may be combined and/or organized differently to provide similar or equivalent signal processing, signal generation, and signal transmission.

As shown in FIG. 2, transmitter system 200 may include a satellite module 240 for receiving satellite (e.g., GPS) signals and for providing location information and/or other data, such as timing data, dilution of precision (DOP) data, or other data or information as may be provided from a GPS or other positioning system, to a processing module 210.

Transmitter system 200 may also include one or more transmitter modules 250 for generating and sending transmitter output signals as described elsewhere herein. transmitter module 250 may also include various elements as are known or later developed in the art for providing output signals to a transmit antenna, such as analog or digital logic and power circuitry, signal processing circuitry, tuning circuitry, buffer and power amplifiers, and the like. Signal processing for generating the output signals may be done in the processing module 210 which, in some embodiments, may be integrated with the transmitter module 250 or, in other embodiments, may be a standalone processing module for performing multiple signal processing and/or other operational functions.

One or more memories 220 may be coupled with processing module 210 to provide storage and retrieval of data and/or to provide storage and retrieval of instructions for execution in the processing module 210. For example, the instructions may be instructions for performing the various processing methods and functions described elsewhere herein, such as for determining location information or other information associated with the transmitter system 200, such as local environmental conditions, as well as to generate transmitter output signals to be sent to the user devices 120 of FIG. 1.

Transmitter system 200 may further include one or more environmental sensing modules 270 for sensing or determining conditions associated with the transmitter, such as, for example, local pressure, temperature, or other conditions. Pressure information may be generated in the environmental sensing module 270 and provided to the processing module 210 for integration with other data in transmitter output signals as described elsewhere herein. One or more server interface modules 260 may also be included in the transmitter system 200 to provide an interface between the transmitter system 200 and other remote components, such as server system 130 and network infrastructure 170 of FIG. 1. Server system 130 may send data or information to the transmitter system 200 via an interface module 260. In addition, the transmitter system 200 may include other modules (not shown) to provide related operational functionality.

User Device

Figure 3:
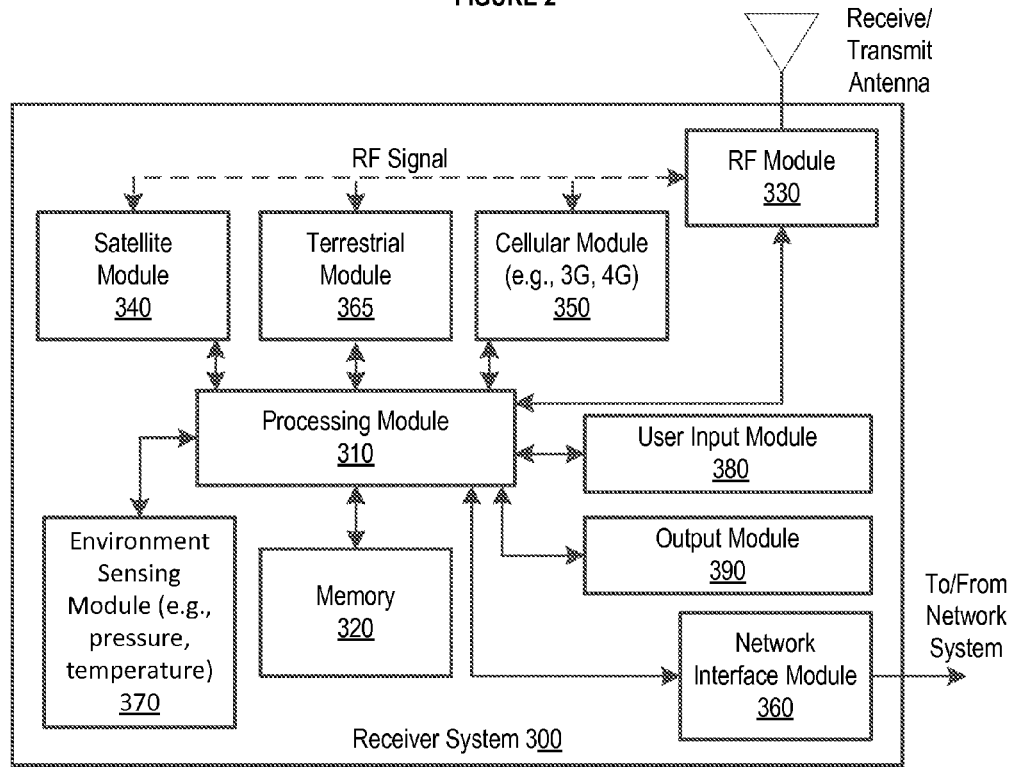
FIG. 3 depicts aspects of a user device in the positioning system in FIG. 1.

FIG. 3 is a block diagram illustrating details of a user device system 300 on which signals from the transmitter system 200 of FIG. 2 may be received and processed to determine position information associated with the user device system 300. The user device system 300 may correspond with user device 120 of FIG. 1.

The user device system 300 may include an RF module 330 configured to receive signals from remote components and to transmit signals to remote components.

The user device system 300 further includes a satellite module 340 for receiving satellite (e.g., GPS) signals and for providing location information and/or other data, such as timing data, dilution of precision (DOP) data, or other data or information as may be provided from a GPS or other positioning system, to a processing module 310.

The user device system 300 may also include a cellular module 350 for sending and receiving data or information via a cellular or other data communications system. The user device system 300 may include communications modules (not shown) for sending and/or receiving data via other wired or wireless communications networks, such as Wi-Fi, Wi-Max, Bluetooth, USB, or other networks.

The user device system 300 may also include a position transmitter module 365 for receiving signals from transmitters that broadcast position signals (e.g., transmitter 110 of FIG. 1), and for processing the signals to determine position information. The transmitter module 365 may be integrated with and/or may share resources such as antennas, RF circuitry, and the like with other modules (e.g., the satellite module 340, the cellular module 350). For example, the position transmitter module 365 and the satellite module 240 may share some or all radio front end (RFE) components and/or processing elements. The processing module 310 may be integrated with and/or share resources with the position transmitter module 365, the satellite module 340 and/or the cellular module 350 to determine position information and/or perform other processing functions as described herein.

One or more memories 320 may be coupled with processing module 310 to provide storage and retrieval of data and/or to provide storage and retrieval of instructions for execution in the processing module 310. For example, the instructions may be instructions for performing the various processing methods and functions described elsewhere herein, such as for determining location information or other information based on received transmitter, GPS, cellular, pressure, temperature, and/or other signals or data though the RF modules 330 or the network interface module 360.

The user device system 300 may further include one or more environmental sensing modules 370 for sensing or determining conditions associated with the user device, such as, for example, local pressure, temperature, or other conditions. In an exemplary embodiment, pressure and temperature information may be generated in environmental sensing module 370 and provided to the processing module 310 for use in determining three-dimension position information in conjunction with transmitter 110, GPS, cellular, or other signals received through the RF module 330 or the network interface module 360. It is noted that other sensing modules (not shown) are contemplated, including accelerometers, compasses, and other components that may be found in user devices.

The user device 200 may further include various additional user interface modules, such as a user input module 380, which may be in the form of a keypad, touchscreen display, mouse, or other user interface element. Audio and/or video data or information may be provided on an output module 390, such as in the form of one or more speakers or other audio transducers, one or more visual displays, such as touchscreens, and/or other user I/O elements as are known or developed in the art. In an exemplary embodiment, output module 390 may be used to visually display determined position information based on received transmitter signals, and the determined position information may also be sent to cellular module 350 to an associated service provide or other entity.

Methods for Determining and Transmitting Position Information

Variations described below in relation to the three (3) inventive methods may apply to different networks and to different methods for determining location position. For instance, certain methods may apply to mobile-originated or mobile-terminated determinations in relation to 3GPP RRC/RRLP, 3GPP2 CDMA, LTE, or other networks. Certain methods may also apply to control-plane or user-plane (e.g., SUPL) UE-Based or UE-Assist determinations. Still, certain methods may apply to E-911 mobile-terminated determinations.

Method 1

In general, Method 1 uses existing network infrastructure and transmission protocols so as to minimize capital investment when implementing Method 1. According to Method 1, a user device may be modified to make WAPS pseudo-range measurements and then transform those WAPS pseudo-range measurements to GPS pseudo-range measurements. By modifying the user device, procedures of various legacy (i.e., existing) or new networks may be unaltered, thus minimizing the cost of adopting Method 1 into those networks. Method 1 may also or alternatively use Global Navigation Satellite System (GNSS) constellation fields or other reserved fields to provide a "WAPS indicator" to notify the network that position information from the user device was derived from WAPS, as compared to GPS. Other constellation fields may be used to transmit additional WAPS (or another network's) information.

Method 1 provides for changes to the user device without any substantive changes to the network process for determining position. In accordance with Method 1, the network does not need to be "WAPS-aware." This means that the network need not be configured with WAPS functionality, and therefore the network may process LCS service requests with WAPS position information in a similar manner to how it processes those requests with GPS position information sent from the user device.

Method 1 further provides for transformation of WAPS pseudo-ranges into GPS pseudo-ranges without any use of new GNSS constellation formats or new information elements specific to WAPS.

One method for converting WAPS pseudo-ranges to GPS pseudo-ranges may include some or all of the following steps. A WAPS-enabled user device would first estimate WAPS pseudo-ranges using time of arrival or other range determining techniques, then use WAPS positioning network parameters and environmental data (e.g.: latitude, longitude, altitude of the WAPS beacons; WAPS timing corrections; pressure and temperature measured at the beacon) to compute a WAPS-based position estimate and position quality of the receiver (e.g., in the form of latitude, longitude and altitude). The WAPS network parameters and WAPS environmental data may be obtained by demodulating the WAPS signal or through alternate means (e.g., such as from a WAPS server using a data connection). Then, the user device would use GNSS satellite constellation information (e.g., such as satellite position, timing corrections and other GNSS correction parameters which may be obtained using the ephemeris and almanac) to compute at least three satellite positions at an arbitrarily chosen GPS time and then compute a synthetic pseudo-range from the satellite as the distance from the WAPS-enabled user device estimated position to the satellite.

In a similar manner, a synthetic Doppler can be computed using an estimated user device velocity and computed satellite Doppler at the same arbitrarily chosen GPS time. The Dilution of Precision (DOP) of the satellites at the estimated user device position is also computed. These synthetic pseudo-ranges can then be sent as GNSS pseudo-ranges and the synthetic Doppler as GNSS Doppler using the same information elements used for sending GNSS pseudo-ranges. The GNSS server attached to the SMLC, for example, would then compute the receiver position using GNSS pseudo-ranges without needing any knowledge that the pseudo-ranges may be actually synthetic pseudo-ranges derived from WAPS beacon pseudo-ranges. Any arbitrary common time bias could be added to the synthetic pseudo-ranges without affecting the position computed by the GNSS server.

As an example, the user device positioning GPS measured results information element message fields can be filled as follows: the "GPS reference time only" field is filled with the arbitrary chosen GPS time used to compute satellite position, "Satellite ID" field may be filled with the GPS satellite ID; the "C/NO" field may be filled with an arbitrarily selected signal-to-noise ratio corresponding to open-sky scenario; the "Doppler" field may be filled with the synthetic Doppler; the "Whole GPS chips" and "Fractional GPS chips" fields may be derived from the synthetic pseudo-range in the same manner as in GPS systems; the "Multipath Indicator" field may be set as NM; and the "Pseudorange RMS error" field may be set as the WAPS-based quality estimate divided by the Dilution of Precision (DOP) so that the confidence metric computed in the GPS server corresponds to the WAPS-based position quality.

Method 1 also provides for UE-Based and UE-Assisted position determinations. For example, under a UE-Based approach, the user device may use some assistance data (e.g., GPS Satellite ephemeris) from the network to computes its location. The user device, however, computes position using un-encrypted or encrypted WAPS signals. Examples of such WAPS signals are disclosed in U.S. Utility patent Ser. No. 12/557,479 (now U.S. Pat. No. 8,130,141), entitled WIDE AREA POSITIONING SYSTEM, filed Sep. 10, 2009, which is hereby incorporated by reference in its entirety for all purposes. When encrypted signals are used, the user device may use a WAPS decryption key to decrypt the signals. The WAPS decryption key may be obtained over the air as part of the WAPS signals or through a communication side channel between the user device and WAPS, or through other communication means known in the art or otherwise within the scope and spirit of the present disclosure. The computed position may then be returned to the network.

Under a UE-Assist approach, the user device may receive some assistance data from the network, and may perform measurements of received WAPS signals before sending those measurements to the network, which then computes the user device's location.

Figure 4:
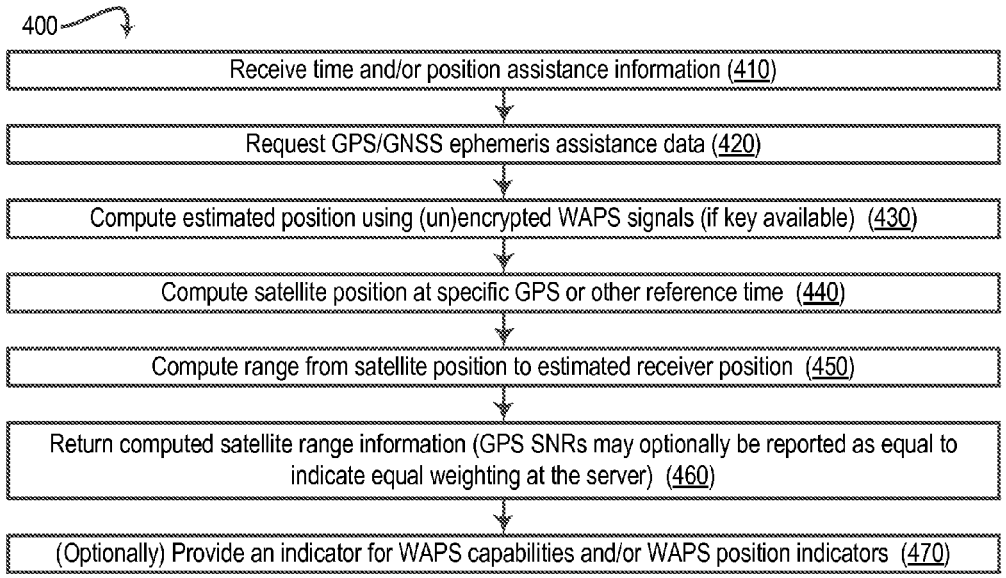
FIG. 4 illustrates a process for performing a UE-Assisted position determination.

FIG. 4 illustrates details of an embodiment of a process 400 for determining the user device's location using a UE-Assisted approach. At stages 410 and 420, the user device receives time and position assistance data, and requests GPS/GNSS ephemeris assistance data. The user device may then, at stage 430, develop position information using the received assistance data and/or WAPS signals it receives from WAPS beacons. At stage 440, the user device may compute satellite position at specific GPS or other reference time. Then, at stage 450, the user device may compute a range from the satellite position to the computed WAPS position. At stage 460, the user device may return computed satellite range information as required by standard protocol described in, for example, FIGS. 10-20 elsewhere herein. GPS satellite SNRs may be reported as equal to indicate equal weighting at the network. At stage 470, the user device may optionally send a WAPS indicator using reserved GNSS constellation fields or other reserved fields.

Method 2

In general, Method 2 provides for some modification to network procedures. Along with transmitting a WAPS capability indicator, the user device in Method 2 may return untransformed WAPS pseudo-ranges that follow the format and function of a GNSS constellation. For example, the user device in Method 2 may be configured to return WAPS-specific information elements that may be exchanged among network infrastructure, and that follow the procedures of a GNSS constellation. Accordingly, additional capabilities may be built into networks to process the WAPS pseudo-ranges.

As compared to Method 1, Method 2 provides for no transformation of WAPS pseudo-ranges to GPS pseudo-ranges. Instead, Method 2 uses modified information elements (IEs). For example, in accordance with a UE-Assisted approach under Method 2, WAPS pseudo-ranges may be transmitted from the user device to the network using modified information elements, which require some network updates in order for the network to process the WAPS pseudo-ranges. Method 2 may also introduce new WAPS/MBS IEs used to transmit WAPS/MBS measurements such as pressure and temperature, which may require some network updates in order for the network to process the WAPS/MBS measurements.

Figure 5:
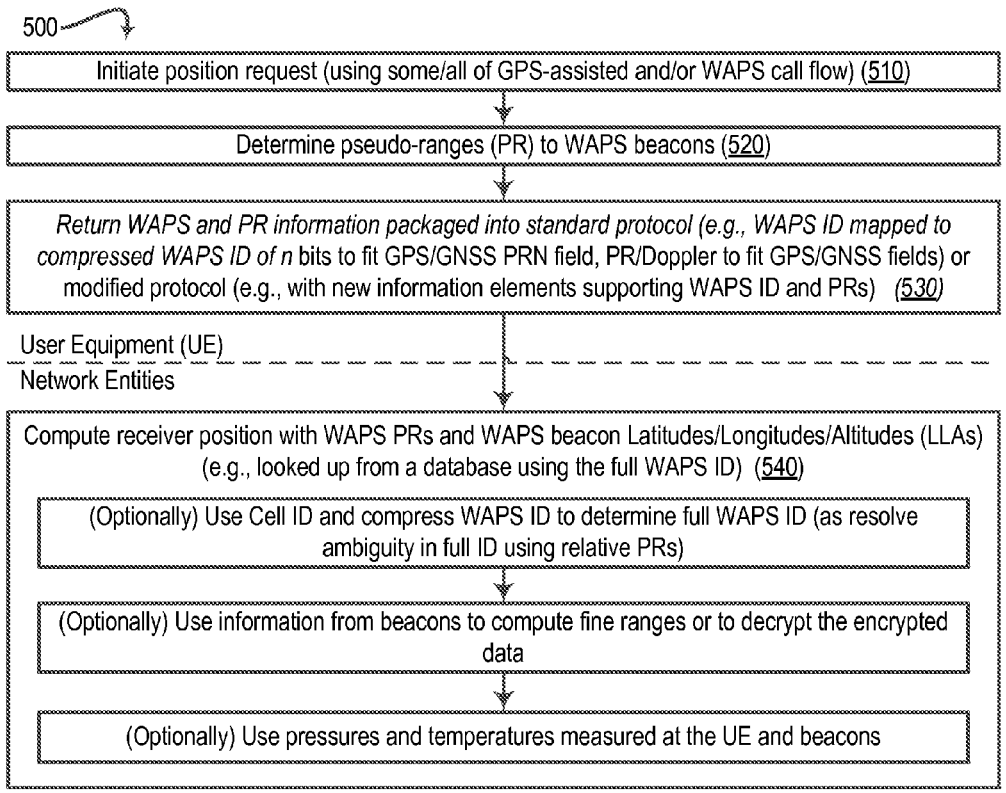
FIG. 5 illustrates a process for performing a UE-Assisted position determination using WAPS network pseudo-ranges.

FIG. 5 illustrates details of an embodiment of a process 500 for determining the user device's location using a UE-Assisted approach and WAPS pseudo-ranges. At stage 510, the user device initiates position determination procedures. Once initiated, the user device determines pseudo-ranges to WAPS beacons at stage 520. Upon determining the pseudo-ranges, the user device sends the WAPS range information to the network at stage 530. The WAPS range information may be packaged into a standard protocol where a full WAPS ID is mapped to a compressed WAPS ID of 6 bits in order to fit that information into a GPS/GNSS ID/SatID field, and so that the pseudo-ranges/Doppler fit into the GPS fields. Alternatively, the WAPS range information may be packaged into a modified protocol using new information elements to support WAPS ID and pseudo-ranges (e.g., as further described in relation to Method 3).

At stage 540, the network receives the range information from the user device, and computes the user device's location based on the range information. The network may use a full WAPS ID to look up WAPS beacon LLAs after the network determines the full WAPS ID based on Cell ID and the compressed WAPS ID of 6 bits. The compression may be done using a hash table. In one embodiment, a hash table defined as compressed WAPS ID=full WAPS ID % 64 is used. In another embodiment, a hash table defined as compressed WAPS ID=full WAPS ID % 41 is used. If a collision results, compressed WAPS ID=41+full WAPS ID % 23 may alternatively be used. The network's computation of the user device's location may be further based on information from the beacons and the user device, including relative temperatures and pressures. One of skill in the art will recognize other ways in which such information may be transmitted, including the use of a code indexes.

Figure 6:
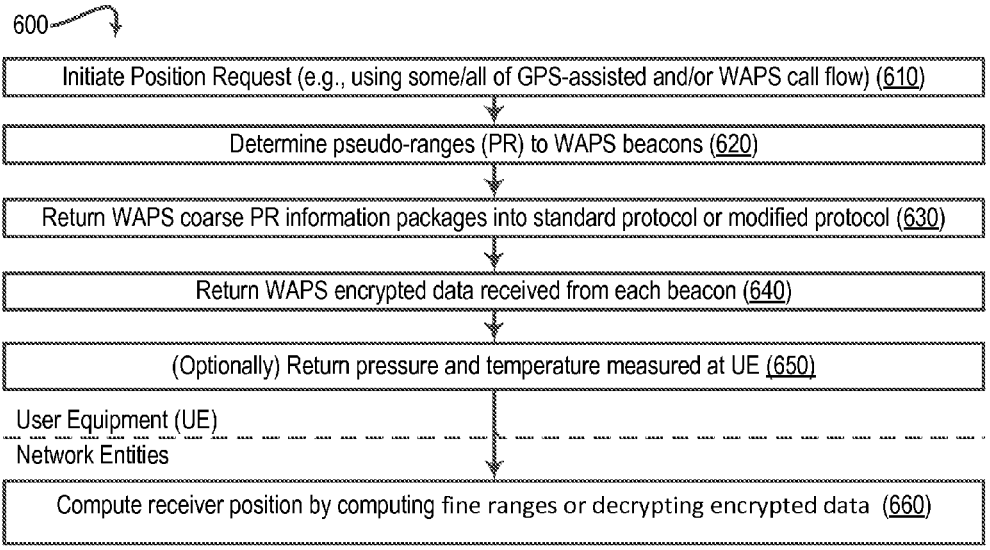
FIG. 6 illustrates a process for performing a UE-Assisted position determination using WAPS network pseudo-ranges when the user device cannot decrypt WAPS signals.

FIG. 6 illustrates details of an embodiment of a process 600 for determining the user device's location using a UE-Assisted approach and WAPS pseudo-ranges when the user device cannot decrypt WAPS signals. The process 600 is also suitable for E-911 scenarios. At stage 610, the user device initiates position determination procedures, and at stage 620, the user device determines coarse pseudo-ranges for in-range WAPS beacons. The user device sends the coarse pseudo-range information, along with encrypted data received from the WAPS beacons and optionally pressure and temperate measurements, to the network at stages 630-650. Then, at stage 660, the network computes position after determining the fine ranges based on the encrypted data.

Further detail regarding Method 2 and the modifications to existing IEs is provided below in relation to the "Location Capabilities for Different Network Technologies" section.

Method 3

In general, Method 3 provides for new procedures to those of existing networks. Along with transmitting a WAPS capability indicator, the user device in Method 3 may return WAPS-specific information elements that may be exchanged among network infrastructure components.

Method 3 uses one or more new information elements (IEs) to transmit position information among the user device and network components, and new procedures to process these new IEs. Method 3 is particularly relevant to LTE, the standard to which is still developing. The new IEs may be used for UE-Based and UE-Assisted approaches, and may represent varying levels of position information, including WAPS pseudo-ranges and other WAPS position information.

Further detail regarding Method 3 and these new IEs is provided below in relation to the "Location Capabilities for Different Network Technologies" section.

Aspects Relating to UE-Standalone, UE-Based and UE-Assisted Computations

Various aspects herein relate generally to UE-Standalone, UE-Based and UE-Assisted position determinations using network and WAPS resources.

WAPS provides high precision urban and indoor positioning services for user devices. WAPS employs a network of highly synchronized Beacons transmitting data in a specified temporal slot structure. The WAPS transmission enables a fast Time to First Fix (TTFF) and allows the user device to perform long coherent integrations to enable high ranging accuracy. The user device location is reported in conventional Latitude and Longitude, and may include altitude.

Certain embodiments contemplate different configurations of the network where WAPS is a separate system apart from the network (e.g., a cellular network), and where WAPS is integrated into the network. Use of WAPS assistance may advantageously reduce beacon search requirements by reducing the list of beacons and/or the frequencies to search, reduce TTFF additionally by removing a requirement to demodulate, and remove a requirement for decryption on user device in order to and simplify the encryption-decryption conditional access architecture.

A WAPS server may be used to provide assistance data in a similar manner to which assistance is provided by a GPS server. The WAPS server may send WAPS network information to the user device (via a direct communication channel or through the network). New information, including "WAPS indicators" may be returned with position information from the user device. Such indicators may be returned in the GNSS constellation fields or other reserved fields so as to indicate that the position information was based on WAPS system info. Modified information elements may also or alternatively be used to return WAPS pseudoranges. New information elements may also or alternatively be used to return WAPS pseudoranges.

WAPS user device positioning provides distinct value added location based services capabilities, and so requires protection from unauthorized access to this service. Therefore, WAPS assistance data, whether broadcast or provided to a specific user device, may be encrypted. The relevant certificates may be provided to user devices on a per application basis. In the case of emergency calls, the relevant certificate may be preloaded on devices supporting WAPS.

The WAPS capable user device can perform autonomous/standalone positioning. In this case, the user device searches for nearby WAPS Beacons, receives the transmissions from a number of Beacons, and computes its position. The position computation provides the user device's Latitude, Longitude, and Altitude (LLA). The location information may be utilized within the user device or sent to the network depending upon the application.

WAPS assistance data is provided in the UE-Based and UE-Assisted modes of operation in order to reduce the beacon search time interval, provide a faster TTFF and improve sensitivity. In UE-Assisted mode, the assistance server provides the WAPS PRN and frequency search information. The user device acquires and tracks the WAPS signals to determine a time of arrival. The user device returns the time-of-arrival measurements to the server. The server uses the time-of-arrival measurements along with assistance data from the Assistance Server (NNAS) to compute the user device's position. The assistance is provided by enhancing an E-SMLC/SMLC/SAS/SLP to support WAPS assistance data. Some of the assistance data is dynamic. Assistance data is provided through an interface between the particular location support server and the NNAS.

In order to provide cell centric assistance, various features and functionalities may be used. For example, the WAPS position computation entity on the E-SMLC maps the cell ID to cell LLA using the base station almanac. The cell LLA is sent through an interface to the NNAS to request assistance local to the area around the cell LLA. The NNAS then provides the appropriate assistance information to the user device.

Another option is for the WAPS position computation entity to pass the cell ID to the NNAS. The NNAS then accesses the cellular base station almanac to determine the cell latitude and longitude. Using the cell latitude and longitude, the NNAS sends assistance data corresponding to the corresponding WAPS beacons likely to be detectable in the geographical area where the user device is operating.

WAPS assistance data may be provided by the Location Server to the WAPS capable user device, and the user device measurement data that may be returned to the Location Server.

Assistance data provided to the UE before a UE-Based computation of position may include, for each visible Beacon: Beacon PRN; Beacon LLA; Beacon Timing Correction; Beacon Frequency Index; Beacon Reference Pressure and Temperature; WAPS System Time; and Beacon Unique ID. Measurements returned by the UE after the UE-Based computation may include LLA of the user device and WAPS System Time.

Assistance data provided to the UE before a UE-assisted (i.e., server-based) computation of position may include, for each visible Beacon: Beacon PRN; Beacon Frequency Index; WAPS System Time. Measurements returned by the UE after the UE-assisted computation may include, for each received Beacon: Beacon PRN; Beacon Frequency Index; Beacon Slot Index; Beacon Unique ID; Beacon Code Phase; Beacon Doppler; user device Pressure and Temperature measurement; WAPS System Time; user device Estimated Altitude.

The WAPS assistance data elements may correspond to the GNSS IEs as follows: WAPS information elements (IEs) Beacon PRN, Beacon Frequency Index, WAPS System Time, and Beacon Timing Correction may be transmitting using GNSS information elements (IEs) Satellite PRN, Satellite Doppler, Satellite System Time, and Satellite Clock correction parameter, respectively. Note that some of the WAPS data elements such as Beacon LLA, Beacon timing correction and beacon reference pressure/temperature may not fit exactly into existing GNSS elements and may require new WAPS information elements. The WAPS Beacon PRN may not be unique, and can come from a list of preferred Gold codes. These Gold codes may be different from the standard GPS Gold codes, but may be from the same family. The Beacon Frequency Index may be discrete (e.g., 7 values) and may correspond to a fixed beacon frequency offset, whereas the Satellite Doppler is a variable. The Frequency Offset ranges (−6.5 to 6.5 kHz) may be similar to the Satellite Doppler range. WAPS System Time may be synchronized to GPS system time, and may have a fixed offset relative to GPS System Time. The Beacon LLA may provide a fixed position of the WAPS Beacon, similar to the Satellite Ephemeris that provides the satellite orbit parameters to enable satellite position computation at a given satellite time. The WAPS Beacon Timing Correction may be dynamic and specify the correction relative to WAPS system time at a particular instant, similar to the satellite clock correction. The Beacon Timing Correction may be more dynamic, and may change within a minute, whereas the ephemeris timing correction is valid for a few hours. The Beacon Reference Pressure and Temperature may be a dynamic measurement of the local atmospheric pressure and temperature at the location of the WAPS Beacon and may provide an accuracy required for altitude determination.

The WAPS user device measurement IEs may correspond to the GNSS measurement IEs as follows: WAPS measurement IEs Receiver LLA, Beacon PRN, Beacon Doppler, and WAPS System Time may correspond to GNSS measurement IEs Receiver LLA, Satellite PRN, Satellite Doppler, and Satellite System Time, respectively.

Certain WAPS measurement IEs may not have corresponding GNSS measurement IEs, including Beacon Frequency Index, Beacon Slot Index, Receiver Pressure and Temperature, and Receiver Estimated Altitude. Beacon PRN may not be unique, but may normally be unique in a local area when combined with a frequency index. Beacon PRN may come from a list of preferred Gold codes which may be different from the standard GPS Gold codes, but of the same family. Beacon frequency index may be discrete (e.g., 7 values). The WAPS network allocation may be accomplished in a manner that the Beacon PRN and Beacon Frequency Index are locally unique. The beacon slot index is optional and may indicate the slot in which the PRN/frequency index measurement is made. The slot can be logical if absolute time is not known. The Beacon Doppler measurement may be terrestrial Doppler (like on cellular networks; e.g., +/−430 Hz for 500 kmph at 926 MHz) whereas satellite Doppler measured can be up to +/−6 KHz. The WAPS system time at measurement may be absolute if the user device is able to determine absolute time or can be a relative time scale. Atmospheric pressure and temperature may be measured at the location of the mobile (if available). Receiver Estimated Altitude may be provided in a UE-Assisted Mode to enable the network Position Calculation function to include Altitude in the UE Position Determination calculation.

In the UE-Based mode, the assistance server provides the WAPS PRN and frequency search information. The user device acquires and tracks the WAPS signals to determine a time of arrival. To assist in very difficult environments such as deep indoor/underground parking garages or in E911 call flows, as well as, the quickest time-to-first-fix, data that can be obtained by demodulating the data transmitted over-the-air on the WAPS signal may be provided as assistance data through the control/user plane. This assistance data includes pressure, temperature and timing corrections. A WAPS UE-Based mode may work as follows.

The WAPS capable positioning server (e.g. SAS, E-SMLC, and SLP) provides the user device with a list of WAPS beacons (corresponding to the local area defined by the cell-ID of the serving cell). The information lets the user device quickly search by providing the PRN, time slot, and frequency search space for each beacon as part of assistance. The user device receives the over the air transmission from a number of beacons, and computes its 3-D position. Note that if the user device pressure and temperature measurements are available, an accurate altitude estimate is also available as part of the position computation. In fall back mode, the data transmitted over the air from these beacons (or a compressed version) can be provided to the user device. Using this information, the user device can compute its position without decoding the WAPS Beacon data transmitted over the air. The position could then be used on the user device, or sent back to the server for network applications.

In a WAPS UE-Assisted mode, the WAPS capable positioning server (e.g. SAS, E-SMLC, and SLP) provides the user device with a list of WAPS beacons (corresponding to the local area defined by the cell-ID of the serving cell). The information lets the user device quickly search by providing frequency search space for each beacon as part of assistance. The user device measures the over the air transmission from a number of beacons, and returns the raw TOA. The user device also measures the pressure and temperature, if the appropriate sensors are available on the user device, and returns these measurements. The E-SMLC/SLP: takes the coarse TOA and refines it by the beacon timing correction to obtain the fine TOA; uses the user device Pressure and Temperature measurements, if available, to compute the user device's altitude (if these measurements are not available, the user device altitude may be approximated); and uses the fine TOA and altitude to compute the 3-D location of the user device.

Figure 7:
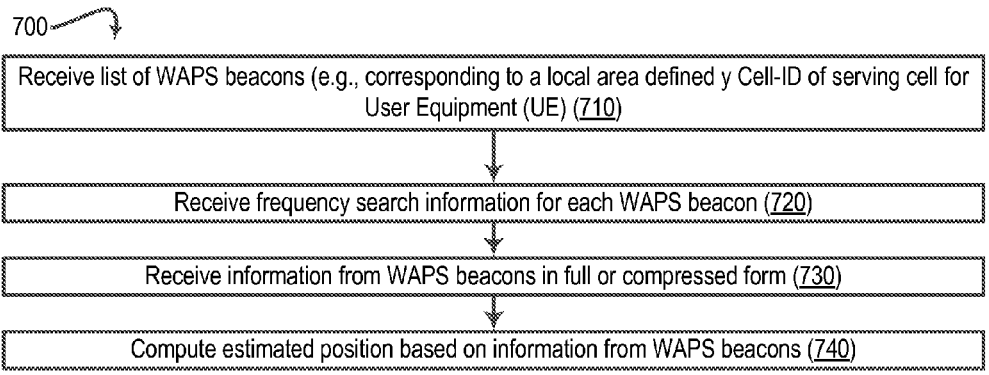
FIG. 7 illustrates a process for performing a UE-Based position determination.

FIG. 7 illustrates details of an embodiment of a process 700 for performing a UE-Based position determination using WAPS. At stage 710, WAPS assistance data including a list of WAPS beacons may be provided to the user device. For example, the list may be determined based on the local area defined by the Cell ID of the serving cell for the user device. Frequency search space(s) for some/all WAPS beacons may also be included as part of the assistance data at stage 720. Providing the search space may shorten the time required for the user device to locate signals for particular beacons. At stage 730, the user device may receive full or compressed WAPS signals transmitted over the air from the beacons. Then, at stage 740, the user device may compute its estimated position based on the WAPS signals. The computation may be possible without decoding the WAPS signals transmitted over the air. Upon computation of the position estimate, the user device may transmit that estimate to the network or WAPS server for further processing.

Figure 8:
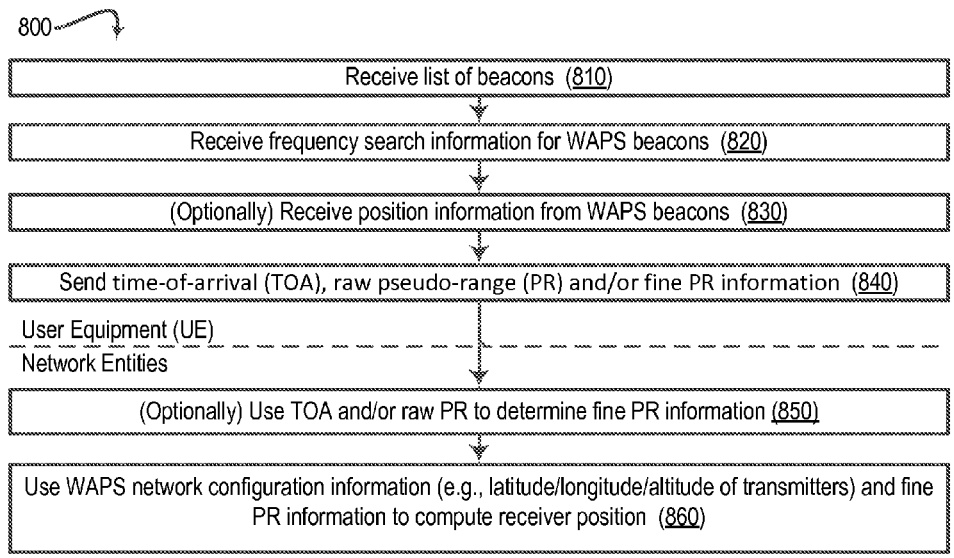
FIG. 8 illustrates a process for performing a UE-Assisted position determination.

FIG. 8 illustrates details of an embodiment of a process 800 for performing a UE-Assisted position determination using WAPS. At stages 810 and 820, WAPS assistance data including a list of WAPS beacons and a frequency search space for some or all of the WAPS beacons may be provided to the user device. At stage 830, the user device may optionally receive full or compressed WAPS signals transmitted over the air from the beacons. Then, at stage 840, the user device may send, to the network or WAPS server, raw time of arrival (TOA), raw pseudo-range, and/or fine pseudo-range information the user device received from the WAPS beacons. At stage 850, the network/WAPS server may optionally use the raw TOA and/or raw pseudo-range information to determine the fine pseudo-range information. Then, at stage 860, the network/WAPS server may consult WAPS network configuration information (e.g., latitude and longitude coordinates along with altitude of transmitter) and the fine pseudo-range information to compute the user device's location.

Location Capabilities for Different Network Technologies

Figure 9A:
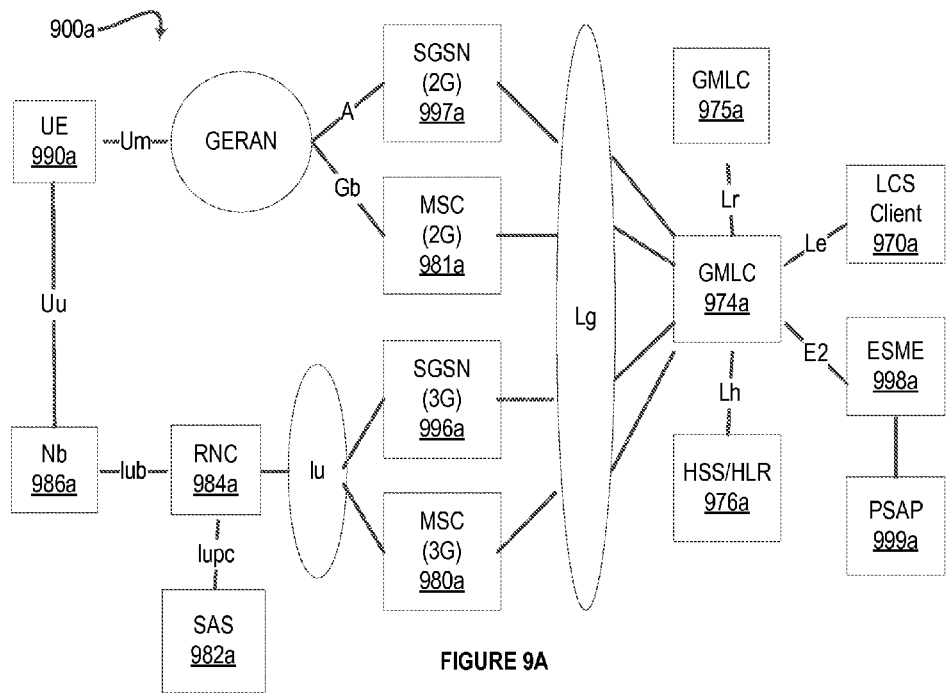
FIG. 9A depicts aspects of a positioning system.

FIG. 9A illustrates a network 900a in accordance with at least one embodiment. The network 900 includes various components involved in determining location positions of a user device 990a. Alternative configurations using more or less components may be also contemplated.

The user device 990a participates in various positioning procedures by performing measurements of downlink signals, transmitting uplink signals for measurement, processing signals, and calculating result(s) which may be transmitted to the network. The participation of the user device 990a varies by the positioning method used.

A Gateway Mobile Location Center (GMLC 974a) (i.e., an LCS server) is the first point of contact for a request from an LCS Client 970a. The GMLC 974a may retrieve routing information from a Home Location Register/Home Subscriber Server (HLR/HSS) 976a, send the positioning request from the LCS Client 970a to Mobile Switching Center (MSC) 980a/981a and/or Serving GPRS Support Node (SGSN) 996a/997a, and then send the resulting position back to the LCS Client 970a. The GMLC 974a may take on one of three roles: (i) a Requesting GMLC is a GMLC which receives the LCS client request; (ii) a Home GMLC is a GMLC in the home PLMN of the user device 990a; and (iii) a Visited GMLC is a GMLC through which the user device 990a is receiving service. The HLR/HSS 976a maintains/holds LCS subscription and routing information for each user device (e.g., user device 990a). The LCS Client 970a sends a location request for an attached user device 990a. The MSC 980a/981a manages user device subscription and non-GPRS related LCS requests, and the SGSN 996a/997a manages user device subscription and GPRS related LCS requests.

A Node-B 986a transmits signals to and receives signals from the user device 990a. The Node-B 986a may have an integrated Location Management Unit (LMU) that performs TDOA-type measurements under SAS control. A Radio Network Controller (RNC) 984a provides radio resource control and mobility for its downstream user device(s). Additionally, it also selects the location determination method to be used for servicing each request and invokes the SAS, as required. A Stand-Alone SMLC (SAS) 982a provides GPS assistance data, WAPS/MBS assistance data, or other data to the RNC 984a for both UE-Assisted and UE-Based computations, performs a U-TDOA position calculation upon request from the RNC 984a, can perform user device location calculations, if needed, and may optionally choose the most optimal positioning method if the RNC 984a does not or cannot.

An Emergency Services Message Entity (ESME) 998a routes and processes out-of-band messages such as location requests related to emergency calls. A Public Safety Answering Point (PSAP) 999a is the location where the emergency call is answered and emergency services dispatched.

The components of the network 900a may be logically interfaced with each other as follows: interface Le links the LCS Client 970a to the LCS Server (GMLC 974a), and transports the location request from the LCS Client to the LCS Server and the position from the LCS Server 974a to the LCS Client 970a; interface E2 links the ESME 998a to the GMLC 974a, and may be functionally equivalent to the Le interface; interface Lr links the GMLC 975a to the GMLC 974a. This GMLC-to-GMLC interface Lr is used to forward location requests when the Requesting GMLC and serving GMLC (either Home or Visited) may be different. Interface Lh links the GMLC 974a to the HLR/HSS 976a, and is used to retrieve user device routing information and LCS subscription information from the HLR/HSS by the GMLC. Interface Lg links the GMLC 974a to the MSC 980a/981a and SGSN 996a/997a, and is used by the GMLC 974a to send location requests to the radio access network and also to receive location information. Interface A links SGCN 997a to a radio access network (RAN)—e.g., GSM Edge RAN—and transports location requests and position. Interface Gb links SGSN to RAN (GERAN) and transports location requests and position between the SGSN 997a and the RAN. Interface Iu links the SGSN 996a and the MSC 980a to UTRAN and transports location requests and position between the MSC/SGSN and the RNC 984a. Interface Iub links the RNC 984a to the Node B 986a, and transports data between each base station and the RNC 984a. Interface Iupc links the RNC 984a to the SAS 982a, and transports GPS assistance data to the RNC 984a as well as providing transport for various position request and result commands. Interface Um links the user device 990a to GERAN, and transports signaling between the user device 990a and its upstream RAN equipment (e.g., an RNC and Base Station Controller not shown). Interface Uu links the user device 990a to UTRAN, and transports signaling between the user device 990a and its upstream RAN equipment (such as the RNC 984a and BSC not shown).

In an LTE network, the GMLC and E-Serving Mobile Location Center (E-SMLC) have similar functions to the GMLC and SAS. In a cdma2000 network, the equivalent entities to the GMLC and SAS may be the Mobile Positioning Center (MPC) and Position Determining Entity (PDE).

Figure 10:
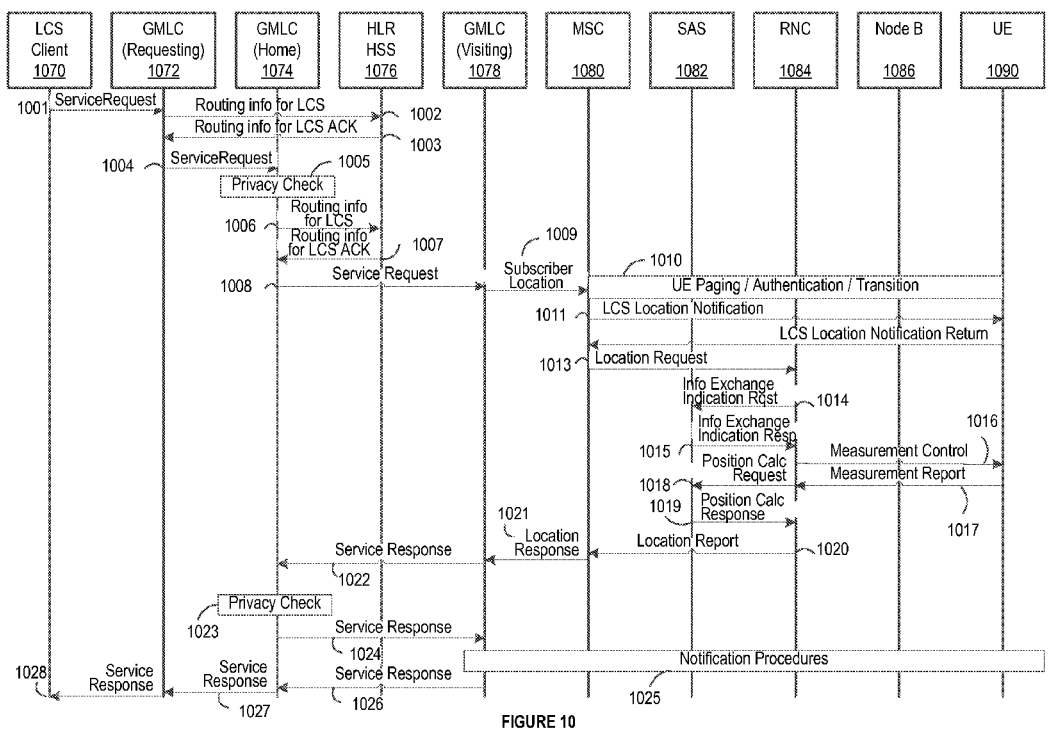
FIG. 10 illustrates a process for carrying out signaling procedures and messages for LCS requests and responses in accordance with A-GPS.

FIG. 10 illustrates details of an embodiment of a process 1000 for carrying out signaling procedures and messages for LCS requests and responses in accordance with A-GPS. Although not shown, variations to the procedures and messages shown in FIG. 10 may be contemplated. For example, different positioning methods, including Cell ID and U-TDOA, among others, fall within the scope and spirit of the invention, and the description herein applies to those positioning methods. Likewise, different generations of networks, including 2G, 3G, 4G and later generations of networks fall within the scope and spirit of the invention, and the description herein applies to those networks as well.

At stage 1001, the request for user device location is sent from the LCS Client 1070 to the LCS Server/R-GMLC 1072. The request includes identifying information for the target user device such as IMSI or MSISDN. The request may also indicate it is immediate or deferred. When the R-GMLC has a privacy profile for the target user device, stages 1002-1004 may not be required. At stage 1002, the R-GMLC 1072 performs a lookup of the H-GMLC 1074 by sending a SEND_ROUTING_INFO_FOR_LCS to the home network HLR/HSS 1076. Stages 1002 and 1003 may be skipped if the R-GMLC 1072 already has this information. At stage 1003, the HLR/HSS returns routing information (e.g., MSC) for the user device along with any known LCS capabilities. At stage 1004, the R-GMLC 1072 sends the location request to the H-GMLC 1074. If the R-GMLC 1072 and H-GMLC 1074 are the same, stage 1004 is skipped.

At stage 1005, the H-GMLC 1074 determines whether the R-GMLC 1072 is authorized to request location for the user device 1090, and includes an examination of the subscriber's privacy profile. At stage 1006, the H-GMLC 1074 performs a lookup of the destination MSC or SGSN address at the HLR/HSS 1076, if not previously known. The HLR/HSS 1076, at stage 1007, returns the address of the destination MSC or SGSN to the H-GMLC 1074. If the address of the V-GMLC 1078 is different from the H-GMLC 1074, the location request is forwarded to the V-GMLC 1078 at stage 1008. Otherwise, this and the related step 1015 may be skipped.

At stage 1009, a Provide Subscriber Location request is sent to the MSC 1080. If needed, the user device 1090 is paged and transitioned out of the idle state at stage 1010. If the user device 1090 has requested LCS notifications and is capable of receiving them, a notification is sent by the MSC 1080 to the user device 1090 at stage 1011. At stage 1012, the user device sends the notification return message. At stage 1013, a Location Request message is sent to the RNC 1084. If the RNC 1084 does not have current GPS ephemeris data, the RNC 1084 invokes the SAS 1082 through the Information Exchange Initiation Request at stage 1014. At stage 1015, the SAS 1082 returns GPS assistance data to the RNC 1084 through the Information Exchange Initiation Response. At stage 1016, a measurement control message is sent to the user device 1090 in order to request a location calculation. GPS Assistance data may also be included in this message.

Stages 1017 through 1019 vary depending on whether the user device 1090 is operating in a UE-Based or a UE-Assisted positioning mode. If operating in UE-Based mode, the user device 1090 returns a measurement report message with its calculated position at stage 1017. If operating in UE-Assisted mode, the measurement report has GPS pseudorange measurements at stage 1017. Stages 1018 and 1019 may be only invoked in UE-Assisted mode. At stage 1018, the RNC 1084 forwards the measurements from the user device 1090 to the SAS 1082 via the Position Calculation Request. The SAS 1082 calculates the user device's position and returns the calculated position to the RNC 1084 via the Position Calculation Response at stage 1019.

At stage 1020, the RNC returns the calculated location via the Location Report message. At stage 1021, the MSC 1080 returns the location response to the V-GMLC 1078. At stage 1022, the V-GMLC 1078 returns the location response to the H-GMLC 1074. At stage 1023, the H-GMLC 474 performs additional privacy checks, if needed. An example of this would be if the subscriber had differing profiles based on geographic region and so the result needed to be re-checked against the profile. If the subscriber's profile indicates that notification is to be performed, then notification is sent towards the RAN at stage 1024, and notification procedures may be performed at stage 1025. At stage 1026, the V-GMLC 1078 returns the LCS service response resulting from the notification procedure to the H-GMLC 1074. At stage 1027, the H-GMLC 1074 sends the LCS Service Response to the R-GMLC 1072. Finally, at stage 1028, the R-GMLC 1072 returns the LCS Service Response to the LCS Client 1070.

Emergency positioning determinations may follow one or more different procedures. In one procedure, for example, the user device requests an emergency call setup. The MSC sets up the emergency call with the appropriate PSAP. Procedures for determining the destination PSAP may be not detailed here. However, the call setup messaging, in this example, will include the ESRK, Cell-ID, and current location. The MSC has been programmed to start a location update procedure at emergency call initiation. The MSC sends the Location Request message to the RAN. The RNC determines that GPS is required and that the user device is capable of computing the location. If it does not have current GPS ephemeris, it engages the SAS to download assistance information. The SAS sends GPS assistance information to the RNC. The RNC instructs the user device to compute its location using GPS and includes GPS assistance information via Measurement Control. The user device returns its computed position via the Measurement Report. The RNC returns the user device's position via the Location Report. The MSC provides the user device's location using the Subscriber Location Report function. The GMLC acknowledges the Report.

At some point in the emergency call the PSAP requests an updated position of the user device using the ESRK. The GMLC sends a Provide Subscriber Location request to the MSC. The MSC sends the Location Request message to the RAN. The RNC determines that GPS is required and that the user device is capable of computing the location. It engages the SAS to download assistance information. The SAS sends GPS assistance information to the RNC. The RNC instructs the user device to compute its location using GPS and includes GPS assistance information via the Measurement Control message. The user device returns its computed position via the Measurement Report message. The RNC returns the user device's position via the Location Report message. The MSC returns the user device's position. The GMLC then returns the user device's updated location estimate to the PSAP.

Sometime later, the PSAP ends the call. The MSC ends the call with the user device and releases RAN resources. The MSC sends a Subscriber Location Report to the GMLC indicating the call has cleared. The GMLC acknowledges the report Due to certain similarities between WAPS and GPS, the GPS signal structure used for location positioning may be used to deliver WAPS positioning signals. For example, WAPS signal information may be transmitted using functionality described in FIG. 10. WAPS signal information may also be transmitted using functionality illustrated in and described with respect to FIG. 11-20 in a similar manner to how the WAPS signal information is transmitted with respect to FIG. 10.

The inventive aspects described herein may be applied to different networks and network technologies on both the control plane and user plane. By way of example, as described in more detail below, the inventive aspects described above may be implemented as follows in relation to certain protocols, including Universal Terrestrial Radio Access Networks (UTRAN) using the Radio Resource Control (RRC), Open Mobile Alliance (OMA) Secure User Plane Location (SUPL), Long Term Evolution (LTE) using the LTE Positioning Protocol (LPP), Global System for Mobile Communications (GSM) using the Radio Resource LCS Protocol (RRLP), and CDMA2000 with TIA-801 protocols and procedures.

One or more embodiments of the invention provide for modifications of and variations from known signaling procedures and messages used to support location capabilities of the Universal Terrestrial Radio Access Networks (UTRAN) using the Radio Resource Control (RRC) protocol. Such modifications may be needed to enable certain features of the WAPS system to operate in existing networks. Various procedures may be contemplated, including methods using a GNSS, network-based location positioning methods using Cell-ID or some form of TDOA, and other location positioning methods.

In accordance with at least one embodiment, the RNC and SAS may interface to one or more WAPS servers and may request authentication information for a location query when the location query is not related to emergency calling. In some instances, the RNC and SAS may not assume user device WAPS capability unless reported by the user device in the user device Capability Information message. Authentication lookups might be avoided if that call flow is treated as an emergency call location request and no application-level location requests (such as from Google Maps) flow across the control-plane infrastructure. However, lack of per-application authentication in the RNC and SAS could result in security and theft-of-service risks. Regardless, the RNC and SAS may be hardened to ensure that the user device cannot, either by accident or intent, flood the RNC and/or SAS with WAPS-related location information and cause network loading or congestion problems. Charging information can be obtained for each WAPS-enabled user device via billing servers; however, if the service provider wishes to have a separate billing record from the network and/or the user device itself, then the RNC and/or SAS may require additional modification and those modifications.

Option 1—At least one embodiment carries out certain aspects of the invention without modification to 3GPP control-plane signaling for either UE-Based or network-based location calculation. Signaling changes are, however, contemplated in other embodiments. Where there may be no signaling changes, WAPS may have its own set of servers into which the subscriber's information is provisioned (unique identifier such as IMSI along with the set of applications authorized to use WAPS services), and WAPS may have its own set of billing servers that directly work with the user device to obtain usage for billing purposes and can provide WAPS usage information with an assumed granularity of a per-query basis to the service provider and other commercial entities that buy enhanced location services from WAPS. Accordingly, there is an assumed requirement for providing raw usage statistics from the user device to the service provider regarding WAPS.

Moreover, a service provider's network may not know the exact signal condition of the user device so as to be able to accurately instruct the user device to use (or not use) WAPS. The user device could be changed to provide feedback to the network about whether it is both WAPS-capable and whether a good WAPS signal was available. Having the user device provide an indication that WAPS is available is presumed to be easier than having the RNC load information about WAPS beacon coverage. However, to recommend use of WAPS, the network would also need to know which application is attempting the location calculation to verify against the WAPS servers. The network (RNC or SAS) would have to interact with the WAPS servers to validate WAPS usage but in some cases there may be no advantages compared to having the user device perform this function. The network could, alternatively, assume that emergency call location is the only use for control-plane location mechanisms, but that assumption carries its own set of security and theft-of-service risks (assuming that the network could instruct the user device to override client controls and use WAPS).

Finally, in the case of network-based (i.e., UE-Assisted) location calculations, the user device measures signals and then sends those measurements back to the SAS for it to calculate a user device location. To return WAPS signals back to the SAS for use in that calculation would require modification of several signaling messages. In order to avoid those modifications, certain embodiments transform WAPS signal information into GPS pseudo-range information before returning that information to the network for processing. If less than three WAPS beacons are received (e.g. the user device is at the edge of WAPS network coverage), then the GPS pseudo-range measurements cannot be computed using WAPS signal measurements making the user device solely dependent on GPS signal coverage or a combination of WAPS, GPS, or other location technologies.

Both UE-Based and UE-Assisted location positioning with WAPS may be achieved without modifications to 3GPP control-plane signaling. In accordance with these embodiments, modifications need only be made to the user device.

Several embodiments contemplate modifications to the control-plane signaling.

Option 2—For instance, at least one embodiment may require a WAPS-aware network. In this manner, the GMLC, SAS, and user device may utilize modified messaging to exchange information about WAPS support. However, a new GNSS constellation may be defined for WAPS and any WAPS measurements transported within the context of the new constellation. In accordance with this option, there is no requirement to transform WAPS signal measurements into GPS pseudo-ranges. This approach is described in further detail below.

Option 3—At least one other embodiment similarly may require a WAPS-aware network. In this manner, the GMLC, SAS, and user device may utilize modified messaging to exchange information about WAPS support. However, rather than transforming WAPS signal measurements into GPS pseudo-ranges, new WAPS specific information elements may be created to send WAPS signal measurements to the network. In accordance with this option, there is no requirement to transform WAPS signal measurements into GPS pseudo-ranges or use a GNSS constellation. This approach is described in further detail below.

The following description illustrates various modifications that may be implemented in accordance with either of Option 2 and Option 3 to carry out different features of the invention. Examples of network and user device equipment modifications for methods 2 and/or 3 may include: RNC (WAPS support for signaling may be required in some instances; WAPS billing/authentication support may be required in some instances; Support for modified signaling messages may be required in some instances); SAS (WAPS support for the signaling may be required in some instances; WAPS billing/authentication support may be required in some instances; Support for modified signaling messages may be required in some instances); UE (a number of hardware and software modifications may be required regardless of whether network-based changes may be made or not). Modifications to signaling messages may include: UE Capability Enquiry (No modifications required. This message only requests the UE to send its capabilities to the network); UE Capability Information (The UE must be able to report WAPS capability); UE Capability Information Confirm (No modifications required. No method-specific information is included in this message); Measurement Control (The RNC must be able to instruct the UE to use WAPS either using GPS pseudoranges or new IEs); Measurement Report (The UE has to be able to report WAPS information in existing or new messages/IEs); Measurement Failure (The UE should be able to communicate WAPS failures, if they occur); Information Exchange Initiation Failure (If desired, WAPS-specific error messages should be added to indicate a WAPS error); Position Calculation Request (The UE has to be able to report WAPS information in existing or new messages/IEs); Position Calculation Response (This message transports the computed UE location and none of the signal measurement information); Position Calculation Failure (Information about WAPS error(s) must be able to be sent to the RNC).

Modifications to the user device positioning capability information element (3GPP 25.331 10.3.3.45) of the user device Capability Information message may include: GANSS ID (For Option 2, WAPS may be added as a new GNSS ID. For example, WAPS would use value X (one of those reserved for future use in 25.331)); GANSS Signal ID (For Option 2, WAPS signal information may be added that corresponds to the GANSS ID. For example, the value X may indicate WAPS signal at one carrier frequency (say, 926.227 MHz with bandwidth 2.046 MHz) whereas value 1 may indicate another WAPS signal (for example, at 920.773 MHz with bandwidth 5.115 MHz)); WAPS support (NEW FIELD for Option 3. Enumerated (none, UE-Based, network-based, standalone)).

Modifications to the Measurement Control message (specifically, the user device positioning reporting quantity IE in 3GPP 25.331 10.3.7.111) to include WAPS support and may include: Positioning Methods (for Option 3, add WAPS, WAPS or GPS, and WAPS or GPS or OTDOA. For example, Enumerated (OTDOA, GPS, OTDOA or GPS, Cell ID, WAPS, WAPS or GPS, WAPS or GPS or OTDOA)); GANSS Positioning Methods (For Option 2, add a value for WAPS. For example, WAPS can use bit X); GANSS timing of Cell wanted (For Option 2, add a value for WAPS. For example, bit X may be used for WAPS); GANSS carrier-phase measurement requested (For Option 2, add a value for WAPS. For example, bit X may be used for WAPS).

Modifications to the Measurement Failure message (3GPP 25.331 10.3.3.13) to add WAPS support may include: Failure cause (For both options, add WAPS positioning method not supported, Invalid WAPS measured results, WAPS position calculation error).

Modifications to the Cause field (3GPP 25.453 9.2.2.3) in the Position Calculation Failure message (3GPP 25.453 9.1.5) to add WAPS support may include: Cause (For both options, add: WAPS positioning method not supported, Invalid WAPS measured results, WAPS position calculation error, user device Positioning Error: Not enough beacons, SAS unable to perform WAPS positioning within Response Time).

Option 2—Modifications to the user device Positioning GANSS measured results (3GPP 25.331 10.3.7.93a) in the Measurement Report message may include: GANSS Time Id (Add a value for WAPS or use GPS time ID. For example, value X); GANSS ID (Add a value for WAPS. For example, WAPS would use value X); GANSS Signal ID (Add WAPS values here. For example, the value X may indicate one of the WAPS signal carriers); Satellite ID (With WAPS, this value must not exceed 64. For example, WAPS ID mapped to compressed 6 bits. One method of compression would be to transform the WAPS ID into WAPS ID modulo 64); $C/N_0$ ($C/N_0$ must be mapped to a WAPS-specific range. For example, the WAPS measurement SNR can range from −32 to 31 dB which is mapped into a 6 bit integer field).

The IE contains fields needed to return user device MBS measurements which may include: BeaconID (Integer 0 to 32767; Identifies the beacon unique ID); Beacon frequency index (Integer 0 to 6; Identifies the beacon frequency offset); Beacon slot index (Integer 0 to 9; Identifies the beacon slot); Temperature (Integer 0 to 511; Indicates the temerature measured by the UE, range 223 to 323 Kelvin, with 0.25 Kelvin resolution, normalized to 0 to 511); Pressure (Integer 0 to 8191; Indicates the atmospheric pressure measured by the UE, range 97229 to 105420 PA, with 1 PA resolution, normalized to 0 to 8191); Pressure confidence (Integer 0 to 100; Indicates the measured pressure confidence, as a percentage); Altitude estimate (Integer 0 to 262143; Indicates the UE estimated altitude, range −500 to 9000 meters, with 6 cm resolution, normalized to 0 to 262143); Altitude confidence (Integer 0 to 100; Indicates the estimated altitude confidence, as a percentage).

Option 2—Modifications to the user device positioning position estimate (3GPP 25.331 10.3.7.109) may include: GANSS Time ID (Define one of the enumerated values for WAPS. For example, a value of 0 may be used for WAPS); GANSS Time ID (Define one of the enumerated values for WAPS. For example, a value of 0 may be used for WAPS).

Option 2—Modifications to GANSS Measured Results field (3GPP 25.453 9.2.2.117) of the Position Calculation Request message (3GPP 25.453 9.1.3) may include: GANSS Time ID (Define an unused enumerated value for WAPS. For example, a value of 0 may be used for WAPS); GANSS Time ID (Define an unused enumerated value for WAPS. For example, a value of 0 may be used for WAPS); GANSS ID (Define an unused enumerated value for WAPS. For example, a value of 0 may be used for WAPS); GANSS Signal ID (Define an unused enumerated value for WAPS. For example, a value of 0 may be used for WAPS); Sat ID (With WAPS, this value may be selected to not exceed 64); $C/N_0$ (C/No must be mapped to a WAPS-specific range. Only 64 dB of dynamic range can be represented).

Option 3—Modifications to the Measured Results field (3GPP 25.331 10.3.7.99) of the Measurement Report to add a WAPS-specific measured results field may include: user device positioning WAPS measured results (New element for WAPS signal measurements). Option 3—Modifications required to the Position Calculation Request message (3GPP 25.453 9.1.3) may include: WAPS Measured Results (New element for WAPS signal measurements).

Option 3—A new message (WAPS Signal Measurement) may be required to hold the WAPS signal measurements and may include: user device WAPS Timing of Cell Frames (Integer 0 to 86399999999750 by steps of 250; WAPS Time of Day in ns); WAPS TOD Uncertainty (Integer 0 to 127; Accuracy between UTRAN and WAPS TOD); UC-ID (Reference cell for WAPS TOD-SFN); Reference SFN (Integer 0 to 4095; The SFN for which the location is valid); WAPS TOD msec (Integer 0 to 3599999; GANSS Time of Day in ms); WAPS TOD Uncertainty (Integer 0 to 127; Accuracy of the WAPS TOD); WAPS Code Phase Ambiguity (Integer 0 to 31; In ms);

WAPS Measurement Parameters (1 to <maxWAPSBCN); WAPS ID (Integer 0 to 65535; WAPS Identifier); $C/N_0$ (Integer 0 to 63; Estimate of the carrier to noise ratio of the received signal in units of dB-Hz); Multipath Indicator (Enumerated NM, Low, Medium, High); Carrier Quality Indication (Bit String 2); WAPS Code Phase (Integer 0 to $2^{21}$-1); WAPS Integer Code Phase (Integer 0 to 63); Code Phase Error (Integer 0 to 63); Doppler (Integer −32K-32K; Hz, scale factor 0.4); ADR (Integer 0 to 33554431; ADR measurement for the satellite signal (in meters)).

It is to be understood that many WAPS functions may be integrated into the GMLC and/or SAS. For example, the GMLC and/or SAS could be programmed to supply encryption key(s) required to decrypt beacon signal(s), may act as an authorization agent for WAPS usage assuming either an on-board database or the ability to query a WAPS-hosted database, and may gather and then report usage from each user device.

Figure 11:
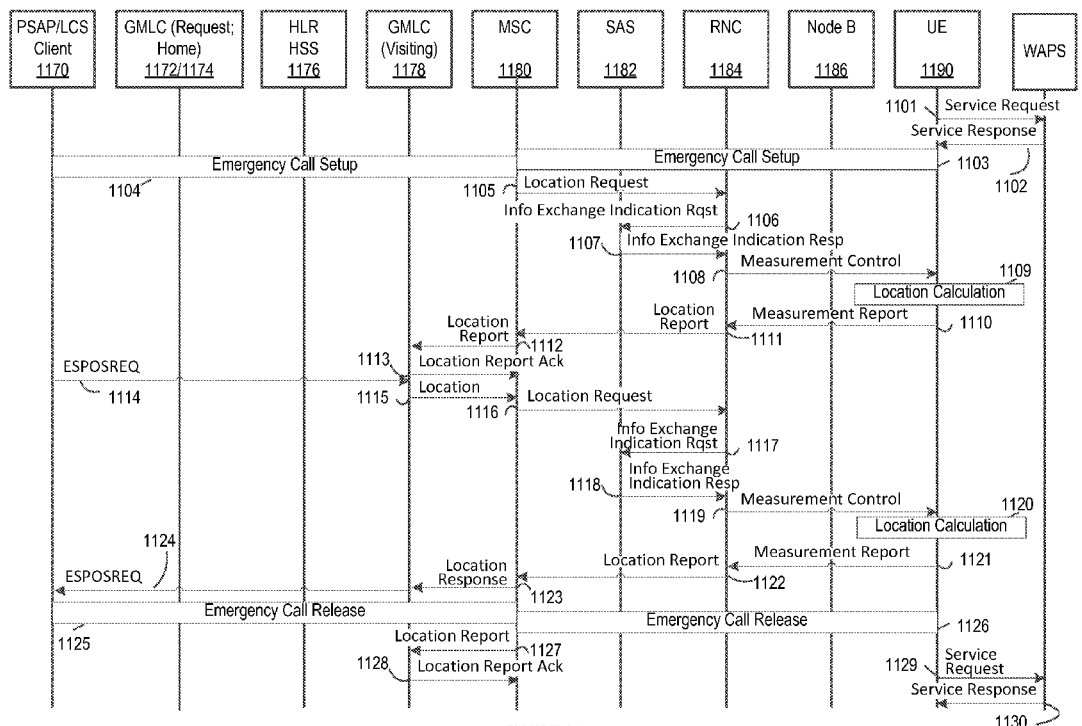
FIG. 11 illustrates an emergency call using the WAPS network.

FIG. 11 illustrates an emergency call using WAPS. Steps 1 and 2 may be a query by the user device to a WAPS authentication server requesting the public key and authorization for that IMSI to access WAPS (and optimally completed before the location calculation request). The format of these messages may be described above. Steps 9 and 20 highlight the fact that the user device can use one or both of GPS and WAPS to calculate its location. Steps 29 and 30 illustrate billing information stored on the user device being transmitted to a WAPS billing server at some periodic interval.

The illustration in FIG. 11 may also apply to an Emergency Call using network-based location computation and showing a sample of WAPS system signaling and operation where the SAS sends a position calculation request to the RNC, which returns a position calculation response to the SAS between steps 1110 and 1111, and 1121 and 1122. Steps 1 and 2 may be a query by the user device to a WAPS authentication server requesting the public key and authorization for that IMSI to access WAPS (and optimally completed before the location calculation request). Steps 9 and 20 highlight the fact that the user device is capturing the WAPS signal and transforming them into GPS pseudo-ranges for return to the network. Steps 11, 12 and 22, 23 may be added into this signaling flow to show the location calculation by the SAS. Steps 29 and 30 illustrate billing information stored on the user device being transmitted to a WAPS billing server at some periodic interval.

One or more embodiments of the invention provide for modifications of and variations from known signaling procedures and messages used to support location capabilities of the OMA Secure User Plane Location (SUPL) protocol. Such modifications may be needed to enable certain features of the WAPS system to operate in existing networks. Various procedures may be contemplated, including methods using a GNSS, network-based location positioning methods using Cell-ID or some form of TDOA, and other location positioning methods. The SLP may operate similarly to the RNC and SAS of the UTRAN implementations above. Modifications to SUPL for WAPS usage may require modifying both the underlying RAN location protocol (such as TIA-801 or RRC) and SUPL. Enabling only one of SUPL or the RAN location protocol on the service provider's network may not enable full usage of WAPS via SUPL. All versions of SUPL may be used.

The discussion regarding UTRAN applies similarly to SUPL implementations of the invention, and is incorporated by reference in this section. For example, the discussion regarding signal modification—that is, the discussions pertaining to not using signal modifications (and instead relying on transformations of pseudo-ranges, among other features) and to using signal modifications—in UTRAN applies similarly to SUPL with few exceptions. The network, however, cannot assume that SUPL is only being used for emergency calls, like a control-plane protocol might. Thus, in accordance with some embodiments, there is no requirement for the SLP (i.e., the network) to know that a user device is WAPS capable. Because of the fact that SUPL uses the underlying RAN location protocol such as RRC and TIA-801 for location calculation, the implementation of that protocol and SUPL support should be the same (e.g., choosing Option 1 for RRLP, Option 2 for RRC, and Option 3 for SUPL could lead to odd interoperability issues).

Figure 12:
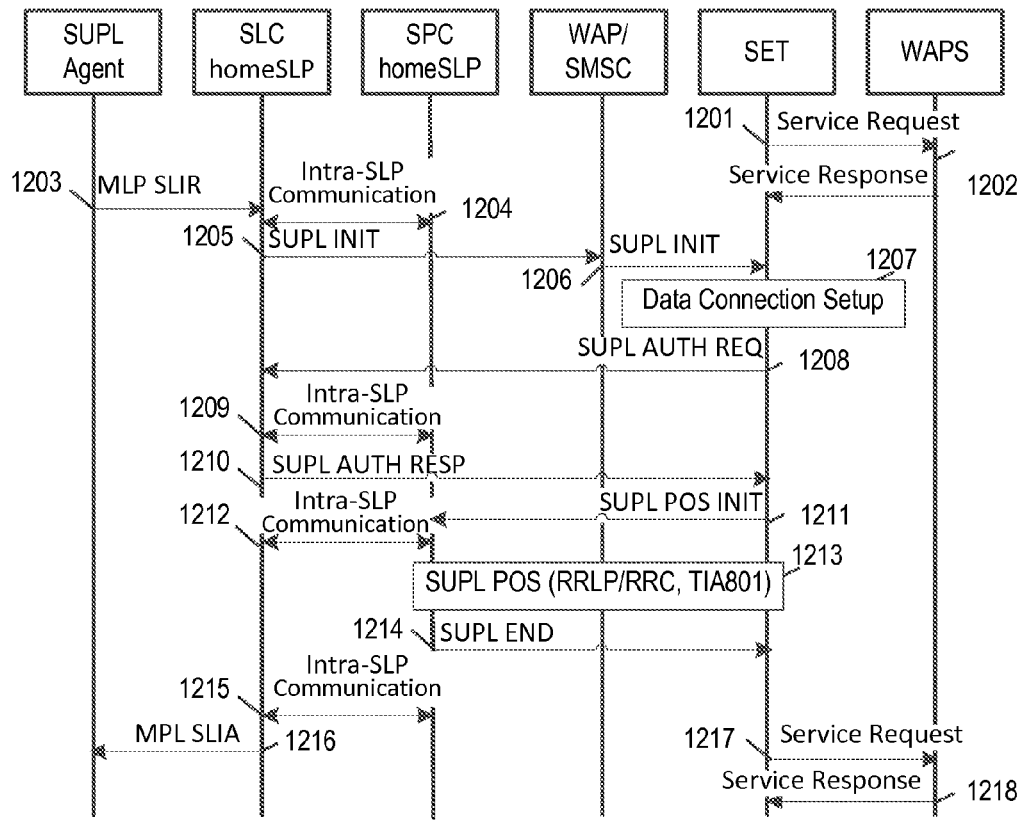
FIG. 12 illustrates a Location Request to a user device with WAPS network support and limited modification to signaling.

FIG. 12 illustrates a MT Location Request to a user device with WAPS support and no modification to signaling. Steps 1 and 2 may be a query by the user device to a WAPS authentication server requesting the public key and authorization for that IMSI to access WAPS (and optimally completed before the location calculation request); Step 13 is the protocol-specific messaging (RRLP, RRC, TIA-801, etc.) that completes the location calculation, whether it is SET-based or SET-assisted; and Steps 17 and 18 illustrate billing information stored on the user device being transmitted to a WAPS billing server at some periodic interval.

Figure 13:
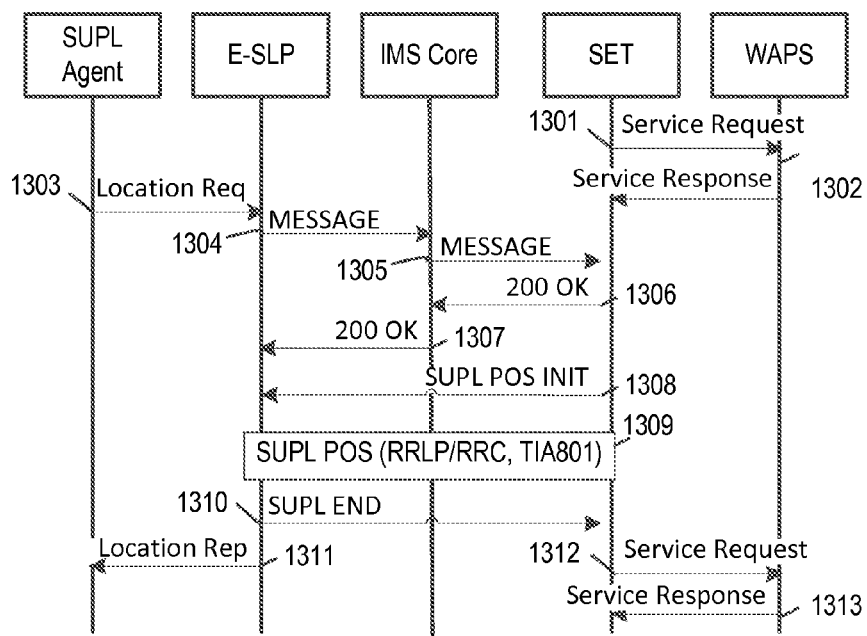
FIG. 13 illustrates an emergency call with WAPS network support.

FIG. 13 illustrates an emergency call with WAPS support. Steps 1 and 2 may be a query by the user device to a WAPS authentication server requesting the public key and authorization for that IMSI to access WAPS (and optimally completed before the location calculation request). Step 9 is the protocol-specific messaging (RRC, TIA-801, etc.) that completes the location calculation, whether it is SET-based or SET-assisted. Steps 12 and 13 illustrate billing information stored on the user device being transmitted to a WAPS billing server at some periodic interval. The illustration in FIG. 13 may also apply to an Emergency Call using network-based location computation and showing a sample of WAPS system signaling and operation.

As shown, a location request arrives at the E-SLP from the SUPL Agent, perhaps from a GMLC or directly from the ESME. The request has an emergency indicator set so the E-SLP will know that the request is for an emergency call. The SUPL session is initiated using a SIP PUSH to the Emergency IMS Core. The IMS uses a SIP PUSH to the SET. The SET acknowledges the MESSAGE with a 200 OK. The IMS sends the 200 OK back to the E-SLP. The SET will create a secure IP connection to the SLP and send the SUPL POS INIT message to it. The SUPL POS INIT will contain supported positioning capabilities (e.g., SET Assisted or SET Based WAPS) and protocol (e.g., LPP). The SET may also request assistance data be sent to it as well in the SUPL POS INIT. The SUPL POS procedure is started. This allows the specific LPP messages to be exchanged to allow the SET to determine its location or for the SLP to calculate the SET's location.

Various modifications that may be implemented in accordance with either of Option 2 and Option 3 to carry out different features of the invention are described below.

Examples of network and user device equipment modifications may include: SLP (WAPS billing/authentication support may be required in some instances; Support for modified signaling messages may be required in some instances; Support for WAPS-modified RAN-specific control-plane location messages such as GSM/RRLP, UTRAN/RRC, or TIA-801 may be required in some instances); and UE (a number of hardware and software modifications may be required regardless of whether network-based changes may be made or not).

Modifications to ULP and ILP signaling messages may include: GNSS Positioning Technology (INIT RESPONSE TRIG. RESPONSE; For Option 2, WAPS may need to be added as a new constellation); Location ID (START POS INIT TRIG. START; Use of "WAPS Cell-ID" is not supported); Position (START POS INIT END TRIG. START REPORT; this element only reports the SET's position and not the signal source from which the position was calculated); Positioning Method (INIT RESPONSE TRIG. RESPONSE REPORT; Support for a WAPS indicator (along with whether WAPS-Based, WAPS-Assisted, and WAPS Standalone) may be required in some instances); Positioning Payload (POS; this message carries the TIA-801 or RRC payload. Even if that payload is modified to transport WAPS related information, no specific changes may be required to this ULP message to handle the revised payload); SET Capabilities (START POS INIT AUTH REQ END TRIG. START REPORT; Support for a WAPS indicator (along with whether WAPS-Based, WAPS-Assisted, and WAPS Standalone) may be required in some instances); Status Code (AUTH RESP END TRIG. STOP; If WAPS-specific error messages may be required (WAN type specific messages may be not supported in the current messaging), then modification may be required in some instances); Supported Network Information (INIT RESPONSE TRIG RESPONSE; Support for a WAPS indicator may be required); Approved Positioning Methods (PREQ; Support for a WAPS indicator (along with whether WAPS-Based, WAPS-Assisted, and WAPS Standalone) may be required in some instances); GNSS Positioning Technology (PRES PINIT; For Option 2, WAPS may need to be added as a new constellation); Location ID (PREQ PLREQ PINIT; Use of "WAPS Cell-ID" is not supported); Position (PINIT PRES PRPT; This element only reports the SET's position and not the signal source from which the position was calculated); Positioning Payload (POS; This message carries the TIA-801 or RRC payload. Even if that payload is modified to transport WAPS related information, no specific changes may be required to this ULP message to handle the revised payload); Preferred Positioning Method (PRES; WAPS support may need to be added to the list of supported positioning methods); SET Capabilities (PREQ PINIT; Support for a WAPS indicator (along with whether WAPS-Based, WAPS-Assisted, and WAPS Standalone) may be required in some instances); Status Code (PRPT PEND; If WAPS-specific error messages may be required (WAN type specific messages may be not supported in the current messaging), then modification may be required in some instances); Supported Positioning Methods (PRES; Support for a WAPS indicator (along with whether WAPS-Based, WAPS-Assisted, and WAPS Standalone) may be required in some instances).

Modifications to the ULP Positioning Method parameter [SUPLV1ULP 7.8] [SUPLV2ULP 10.8] may include: Position Method parameter (Add to the list of supported methods: WAPS SET-based; WAPS SET-assisted; Autonomous WAPS). Modifications to the ULP SET Capabilities parameter [SUPLV1ULP 7.10] [SUPLV2ULP 10.10] may include: Pos Technology (Add to the list of supported methods: WAPS SET-based; WAPS SET-assisted; Autonomous WAPS); GANSS ID (Option 2: add a value for WAPS. For example, a value of 0 may be used for WAPS); GANSS Signals (Option 2: WAPS values may be required. For example, a value of 0 may be used for WAPS); Pref Method (Add to the list of preferred modes: WAPS SET-assisted preferred; WAPS SET-based preferred). Modifications to the ULP Status Code parameter [SUPLV1ULP 7.6] [SUPLV2ULP 10.6] may include: To the enumerated values add: WAPS positioning method not supported, Invalid WAPS measured results, WAPS position calculation error, user device; Positioning Error: Not enough beacons. Modifications to the ULP Supported Network Information parameter [SUPLV2ULP 10.24] may include: New Boolean value; if true, WAPS supported.

Modifications to the ILP Approved Positioning Method parameter [SUPLV2ILP 12.24] may include: Positioning Technology (To the list of supported technologies add: WAPS SET-based; WAPS SET-assisted; Autonomous WAPS); GANSS ID (For Option 2, add a value for WAPS. For example, a value of 0 may be used for WAPS); GANSS Signals (For Option 2, new WAPS signals may be defined. For example, a value of 0 may be used for WAPS). Modifications to the ILP Positioning Method parameter [SUPLV2ILP 12.3] may include: Position Method (To the list of supported methods add: WAPS SET-based; WAPS SET-assisted; Autonomous WAPS). Modifications to the ILP Preferred Positioning Method parameter [SUPLV2ILP 12.26] may include: Position Method (To the list of supported methods add: WAPS SET-based; WAPS SET-assisted; Autonomous WAPS). Modifications to the ILP SET Capabilities parameter [SUPLV2ILP 12.14] may include: Pos Technology (Add to the list of supported methods: WAPS SET-based; WAPS SET-assisted; Autonomous WAPS); GANSS ID (Option 2: add a value for WAPS. For example, a value of 0 may be used for WAPS); GANSS Signals (Option 2: WAPS values may be required. For example, a value of 0 may be used for WAPS); Pref Method (Add to the list of preferred modes: WAPS SET-assisted preferred; WAPS SET-based preferred). Modifications to the ILP Status Code parameter [SUPLV2ILP 12.27] may include: Status Code values (To the enumerated values add: WAPS positioning method not supported, Invalid WAPS measured results, WAPS position calculation error, user device Positioning Error: Not enough beacons). Modifications to the ILP Supported Positioning Methods parameter [SUPLV2ILP 12.25] may include: Positioning Technology (To the list of supported technologies add: WAPS SET-based; WAPS SET-assisted; Autonomous WAPS); GANSS ID (Option 2: a value for WAPS may be needed. For example, a value of 0 may be used for WAPS); GANSS Signals (Option 2: WAPS signal values may be added. For example, a value of 0 may be used for WAPS). Modifications to the ULP GNSS Positioning Technology parameter [SUPLV2ULP 10.34] may include: GNSS Positioning Technology (Add WAPS to the supported GNSS bitmap. For example, bit X may be used for WAPS). Modifications to the ILP GNSS Positioning Technology parameter [SUPLV2ILP 12.23] may include: GNSS Positioning Technology Add WAPS to the supported GNSS bitmap. For example, bit X may be used for WAPS).

It is to be understood that many WAPS functions to be integrated into the SLP. For example, the SLP could be programmed to supply the encryption key(s) required to decrypt the beacon signal(s), could act as an authorization agent for WAPS usage assuming either an on-board database or the ability to query a WAPS-hosted database, and could gather and then report usage from each user device.

One or more embodiments of the invention provide for modifications of and variations from known signaling procedures and messages used to support location capabilities of the Long Term Evolution (LTE) protocol. Such modifications may be needed to enable certain features of the WAPS system to operate in existing networks. Various procedures may be contemplated, including methods using a GNSS, network-based location positioning methods using Cell-ID or some form of TDOA, and other location positioning methods. The E-SMLC may operate similarly to the RNC and SAS of the UTRAN implementations above.

The discussion regarding UTRAN applies similarly to E-SMLC implementations of the invention, and is incorporated by reference in this section. For example, the discussion regarding signal modification—that is, the discussions pertaining to not using signal modifications (and instead relying on transformations of pseudo-ranges, among other features) and to using signal modifications—in UTRAN applies similarly to E-SMLC with few exceptions. For Option 3 in LTE, the externally defined positioning method capability (i.e. external PDU, ePDU) may be used to minimize the number of required standards-based changes.

Figure 14:
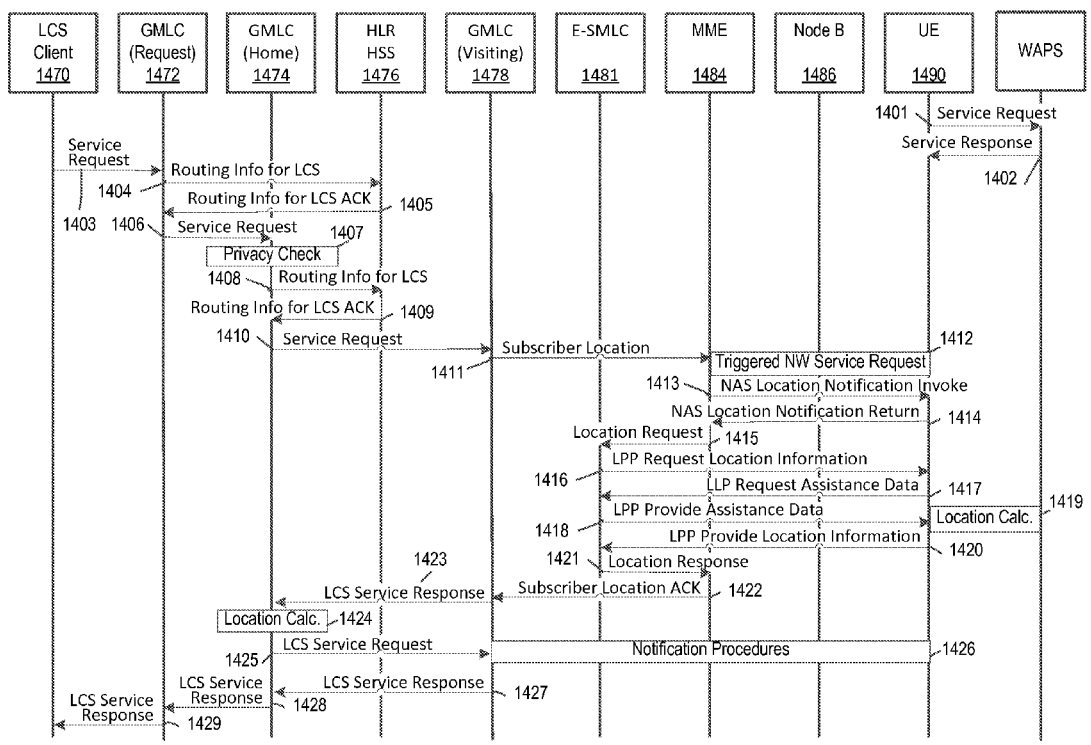
FIG. 14 illustrates a Location Request to a user device with WAPS network support and limited modification to signaling.

FIG. 14 illustrates a MT Location Request to a user device with WAPS support and no modification to signaling. Steps 1 and 2 may be a query by the user device to a WAPS authentication server requesting the public key and authorization for that IMSI to access WAPS (and optimally completed before the location calculation request). Step 19 highlights the fact that the user device can use one or both of GPS and WAPS to calculate its location. Steps 30 and 31 illustrate billing information stored on the user device being transmitted to a WAPS billing server at some periodic interval.

Figure 15:
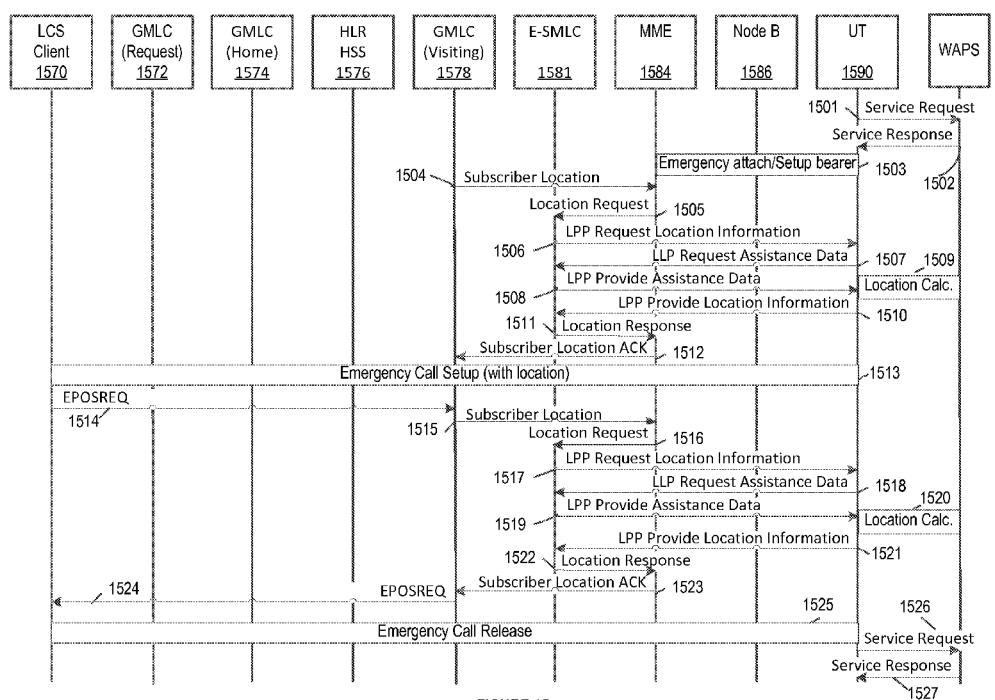
FIG. 15 illustrates an emergency call with WAPS network support.

FIG. 15 illustrates an emergency call with WAPS support. Steps 1 and 2 may be a query by the user device to a WAPS authentication server requesting the public key and authorization for that IMSI to access WAPS (and optimally completed before the location calculation request). Steps 9 and 20 highlight the fact that the user device can use one or both of GPS and WAPS to calculate its location. Steps 26 and 27 illustrate billing information stored on the user device being transmitted to a WAPS billing server at some periodic interval.

The following description relates to various modifications that may be implemented in accordance with either of Option 2 and Option 3 to carry out different features of the invention.

Examples of network and user device equipment modifications may include: E-SMLC (WAPS support for the signaling may be required in some instances; WAPS billing/authentication support may be required in some instances; Support for modified signaling messages may be required in some instances); UE (a number of hardware and software modifications may be required regardless of whether network-based changes may be made or not).

Modifications to signaling messages may include: CommonIEsAbort (WAPS abort information must be added); CommonIEsError (WAPS error information must be added); EPDU-ID (WAPS must be added as a supported external positioning method); EPDU-Name (WAPS must be added as a supported external positioning method); GNSS-ID (WAPS must be added as a GNSS. For example, a value of 0 may be used for WAPS); GNSS-ID-Bitmap (WAPS must be added as a GNSS. For example, a bit 0 may be used for WAPS); GNSS-SignalID (WAPS must be added as a GNSS (and WAPS signals mapped). For example, a value of 0 may be used for the WAPS M1 signal); GNSS-SignalIDs (WAPS must be added as a GNSS (and WAPS signals mapped). For example, bit 0 may be used to indicate the WAPS M1 signal. Alternatively, the WAPS M1 Signal is indicated by setting bit position 1 (e.g., of 8 positions) to the value 1). No modifications to the SV-ID ASN.1 element [3GPP 36.355 6.5.2.13] may be needed. The SV-ID value maps to a 'Preferred Code Index—1' as means to identify the PRN code used by a referenced WAPS transmitter.

Modifications to the CommonIEsAbort ASN.1 element [3GPP 36.355 6.4.2] may include: an error value associated with WAPS. Modifications to the CommonIEsError ASN.1 element [3GPP 36.355 6.4.2] may include: an error value associated with WAPS. Modifications to the GNSS-ID ASN.1 element [3GPP 36.355 6.5.2.13] may include: a WAPS value. It may be noted that a different enumeration position for the WAPS addition may be utilized. Modifications to the GNSS-ID-Bitmap ASN.1 element [3GPP 36.355 6.5.2.13] may include: a WAPS value. Modifications to the EPDU ASN.1 element [3GPP 36.355 6.4.1] may include: ePDU-ID, and ePDU-Name values. It may be noted that a different bit position for the WAPS location in the GNSS-ID-Bitmap may be utilized.

Possible interpretations of satellite-id may include: GPS system (Value of satellite-id: '0'-'62' '63') (Interpretation of satellite-id: Satellite PRN Signal No. 1 to 63, Reserved); SBAS system (Value of satellite-id: '0'-'38' '39'-'63') (Interpretation of satellite-id: Satellite PRN Signal No. 120 to 158, Reserved); QZSS system (Value of satellite-id: '0'-'4' '5-'63') (Interpretation of satellite-id: Satellite PRN Signal No. 193 to 197, Reserved); GLONASS system (Value of satellite-id: '0'-'23' '24-'63') (Interpretation of satellite-id: Slot Number 1 to 24, Reserved); MBS system (Value of satellite-id: '0'-'63') (Interpretation of satellite-id: Preferred Code Index No. 1 to 64).

Modifications to the GNSS-GenericAssistData ASN.1 element[3GPP 36.355 6.5.2.1] for option 2 may include: --ASN1START GNSS-GenericAssistData::=SEQUENCE (SIZE (1 . . . 16)) OF GNSS-GenericAssistDataElement/GNSS-GenericAssistDataElement::=SEQUENCE {gnss-ID GNSS-ID, sbas-ID SBAS-ID OPTIONAL, --Cond GNSS-ID-SBAS gnss-TimeModels GNSS-TimeModelList OPTIONAL, --Need ON gnss-DifferentialCorrections GNSS-DifferentialCorrections OPTIONAL, --Need ON gnss-NavigationModel GNSS-NavigationModel OPTIONAL, --Need ON gnss-RealTimeIntegrity GNSS-RealTimeIntegrity OPTIONAL, --Need ON gnss-DataBitAssistance GNSS-DataBitAssistance OPTIONAL, --Need ON gnss-AcquisitionAssistance GNSS-AcquisitionAssistance OPTIONAL, --Need ON gnss-Almanac GNSS-Almanac OPTIONAL, --Need ON gnss-UTC-Model GNSS-UTC-Model OPTIONAL, --Need ON gnss-AuxiliaryInformation GNSS-AuxiliaryInformation OPTIONAL, --Need ON gnss-MbsAssistance GNSS-MBSAssistance OPTIONAL, --Need ON . . . }--ASN1STOP.

Addition of the GNSS-MBSAssistance ASN.1 element [3GPP 36.366 6.5.2.2] for option 2 may include the following. The IE GNSS-MBSAssistance is used by the location server to provide the target device with MBS specific assistance data. --ASN1START GNSS-MBSAssistance::=SEQUENCE (SIZE(1 . . . 32)) OF MBSAssistanceData MBSAssistanceData::=SEQUENCE {svID SV-ID, BeaconID INTEGER (0 . . . 32767), BeaconFreqIndex INTEGER (0 . . . 6), BeaconLatitude INTEGER (0 . . . 67108863) OPTIONAL, BeaconLongitude INTEGER (0 . . . 134217727) OPTIONAL, BeaconAltitude INTEGER (0 . . . 65535) OPTIONAL, BeaconTxQuality INTEGER (0 . . . 63) OPTIONAL, BeaconTimingCorrection INTEGER (0 . . . 25) OPTIONAL, BeaconTemperature INTEGER (0 . . . 127) OPTIONAL, BeaconPressure INTEGER (0 . . . 8191) OPTIONAL, . . . }--ASN1STOP.

GNSS-MBSAssistance field descriptions may include: svID (This field specifies the GNSS SV (MBS Preferred Beacon Index—1) for which the GNSS-MBSAssistance is given); BeaconID (This field indicates the unique MBS Beacon ID); BeaconFreqIndex (This field indicates the Beacon frequency offset index); BeaconLatitude (This field indicates the beacon latitude, range: [−90, 90] degrees, with 1 millionth of a degree (6 digits) resolution, normalized to 0 . . . 67108863); BeaconLongitude (This field indicates the beacon longitude, range: [−180, 180] degrees, with 1 millionth of a degree (6 digits) resolution, normalized to 0 . . . 134217727); BeaconAltitude (This field indicates the beacon altitude, range −500 . . . 9000 meters, with 6 cm resolution, normalized to 0 . . . 65535); BeaconTxQuality (This field indicates the relative quality metric for the beacon so the receiver can weigh the range data from that transmitter accordingly); BeaconTimingCorrection (This field indicates the residual timing error left over after the beacon adjusts its transmission to account for the various delays in the system, range is 0 . . . 25 ns, with 1 ns resolution); BeaconTemperature (This field indicates the temerature measured at the MBS beacon, range 223 . . . 323 Kelvin, with 1 Kelvin resolution, normalized to 0 . . . 127); BeaconPressure (This field indicates the atmospheric pressure measured at the MBS beacon, range 97229 . . . 105420 PA, with 1 PA resolution, normalized to 0 . . . 8191); and MBSAssistReq (This field is mandatory present if the target device requests GNSS-MBSAssistance; otherwise it is not present).

Modifications to the GNSS-GenericAssistDataReq ASN.1 element [3GPP 36.355 6.5.2.3] for option 2 may include: --ASN1START GNSS-GenericAssistData Req::=SEQUENCE (SIZE (1 . . . 16)) OF GNSS-GenericAssistDataReqElement GNSS-GenericAssistDataReqElement::=SEQUENCE {gnss-ID GNSS-ID, sbas-ID SBAS-ID OPTIONAL, --Cond GNSS-ID-SBAS gnss-TimeModelsReq GNSS-TimeModelListReq OPTIONAL, --Cond TimeModReq gnss-DifferentialCorrectionsReq GNSS-DifferentialCorrectionsReq OPTIONAL, --Cond DGNSS-Req gnss-NavigationModelReq GNSS-NavigationModelReq OPTIONAL, --Cond NavModReq gnss-RealTimeIntegrityReq GNSS-RealTimeIntegrityReq OPTIONAL, --Cond RTIReq gnss-DataBitAssistanceReq GNSS-DataBitAssistanceReq OPTIONAL, --Cond DataBitsReq gnss-AcquisitionAssistanceReq GNSS-AcquisitionAssistanceReq OPTIONAL, --Cond AcquAssistReq gnss-AlmanacReq GNSS-AlmanacReq OPTIONAL, --Cond AlmanacReq gnss-UTCModelReq GNSS-UTC-ModelReq OPTIONAL, --Cond UTCModReq gnss-AuxiliaryInformationReq GNSS-AuxiliaryInformationReq OPTIONAL, --Cond AuxInfoReq gnss-MbsAssistanceReq GNSS-MBSAssistanceReq OPTIONAL, --Cond MBSAssistReq . . . }--ASN1STOP.

The IE GNSS-MBSAssistanceReq may be used by the target device to request the GNSS-MBSAssistance assistance from the location server. Modifications to the GNSS-MeasurementList ASN.1 element [3GPP 36.355 6.5.2.6] for option 2 may include: --ASN1START GNSS-MeasurementList::=SEQUENCE (SIZE(1 . . . 16)) OF GNSS-MeasurementForOneGNSS GNSS-MeasurementForOneGNSS::=SEQUENCE {gnss-ID GNSS-ID, gnss-SgnMeasList GNSS-SgnMeasList, . . . } GNSS-SgnMeasList::=SEQUENCE (SIZE(1 . . . 8)) OF GNSS-SgnMeasElement GNSS-SgnMeasElement::=SEQUENCE {gnss-SignalID GNSS-SignalID, gnss-CodePhaseAmbiguity INTEGER (0 . . . 127) OPTIONAL, gnss-SatMeasList GNSS-SatMeasList, . . . } GNSS-SatMeasList::=SEQUENCE (SIZE(1 . . . 64)) OF GNSS-SatMeasElement GNSS-SatMeasElement::=SEQUENCE {svID SV-ID, cNo INTEGER (0 . . . 63), mpathDet ENUMERATED {notMeasured (0), low (1), medium (2), high (3), . . . }, carrierQualityInd INTEGER (0 . . . 3) OPTIONAL, codePhase INTEGER (0 . . . 2097151), integerCodePhase INTEGER (0 . . . 127) OPTIONAL, codePhaseRMSError INTEGER (0 . . . 63), doppler INTEGER (−32768 . . . 32767) OPTIONAL, adr INTEGER (0 . . . 33554431) OPTIONAL, MbsMeasElement MBSMeasElement OPTIONAL, . . . } MBSMeasElement::=SEQUENCE {BeaconID INTEGER (0 . . . 32767) OPTIONAL, BeaconFreqIndex INTEGER (0 . . . 6) OPTIONAL, BeaconSlotIndex INTEGER (0 . . . 9) OPTIONAL, Temperature INTEGER (0 . . . 127) OPTIONAL, Pressure INTEGER (0 . . . 8191) OPTIONAL, PressureConfidence INTEGER (0 . . . 100) OPTIONAL, AltitudeEstimate INTEGER (0 . . . 65535) OPTIONAL, AltitudeConfidence INTEGER (0 . . . 100) OPTIONAL, . . . }--ASN1STOP.

Fields may include: MBSMeasElement (This field contains MBS specific measurements); BeaconID (This field contains the unique MBS Beacon ID); BeaconFreqIndex (This field contains the Beacon frequency offset index); BeaconSlotIndex (This field contains the Beacon slot index); Temperature (This field contains the temperature measured by the UE, range 223 . . . 323 Kelvin, with 1 Kelvin resolution, normalized to 0 . . . 127); Pressure (This field contains the atmospheric pressure measured by the UE, range 97229 . . . 105420 PA, with 1 PA resolution, normalized to 0 . . . 8191); PressureConfidence (This field contains the confidence for the pressure measurement, expressed as a percentage); AltitudeEstimate (This field contains the UE estimated altitude, range −500 . . . 9000 meters, with 6 cm resolution, normalized to 0 . . . 262143); AltitudeConfidence (This field contains the confidence for the altitude estimate, expressed as a percentage); and MBSAssistSup (This field is mandatory present if the target device supports GNSS-MBSAssistance; otherwise it is not present).

Modifications to the GNSS-GenericAssistanceDataSupport ASN.1 element [3GPP 36.355 6.5.2.10] for option 2 may include: --ASN1START GNSS-GenericAssistanceDataSupport::=SEQUENCE (SIZE (1 . . . 16)) OF GNSS-GenericAssistDataSupportElement GNSS-GenericAssistDataSupportElement::=SEQUENCE {gnss-ID GNSS-ID, sbas-ID SBAS-ID OPTIONAL, --Cond GNSS-ID-SBAS gnss-TimeModelsSupport GNSS-TimeModelListSupport OPTIONAL, --Cond TimeModSup gnss-Differential Corrections Support GNSS-Differential Corrections Support OPTIONAL, --Cond DGNSS-Sup gnss-NavigationModelSupport GNSS-NavigationModelSupport OPTIONAL, --Cond NavModSup gnss-RealTimeIntegritySupport GNSS-RealTimeIntegritySupport OPTIONAL, --Cond RTISup gnss-DataBitAssistanceSupport GNSS-DataBitAssistanceSupport OPTIONAL, --Cond DataBitsSup gnss-AcquisitionAssistanceSupport GNSS-AcquisitionAssistanceSupport OPTIONAL, --Cond AcquAssistSup gnss-AlmanacSupport GNSS-AlmanacSupport OPTIONAL, --Cond AlmanacSup gnss-UTC-ModelSupport GNSS-UTC-ModelSupport OPTIONAL, --Cond UTCModSup gnss-AuxiliaryInformationSupport GNSS-AuxiliaryInformationSupport OPTIONAL, --Cond AuxInfoSup gnss-MbsAssistanceSupport GNSS-MBSAssistanceSupport OPTIONAL, --Cond MBSAssistSup . . . }--ASN1STOP.

A new standard EPDU-ID and EPDU-Name may be created for WAPS. Each of the following ePDU commands may require a WAPS-specific message: RequestCapabilities; ProvideCapabilities; RequestAssistanceData; ProvideAssistanceData; RequestLocationInformation; ProvideLocationInformation; Abort; and Error. In general, the approach to implementing these messages would be to reuse a simplified version of the LPP GNSS message.

An example of the ASN.1 syntax for these messages follows: --ASN1START Abort::=SEQUENCE {abortCause ENUMERATED {undefined, targetDeviceAbort, networkAbort, . . . } }Error::=SEQUENCE {errorCause ENUMERATED {undefined, messageHeaderError, messageBodyError, generalError, wapsSignalFailure, wapsComputation Failure, incorrectDataValue, . . . }} ProvideAssistance Data::=SEQUENCE { . . . } ProvideCapabilities::=SEQUENCE {waps-SupportList WAPS-SupportList OPTIONAL, assistanceDataSupportList AssistanceDataSupportList OPTIONAL, locationCoordinateTypes LocationCoordinateTypes OPTIONAL, velocityTypes Velocity-Types OPTIONAL, . . . } WAPS-SupportList::=SEQUENCE {modes PositioningModes, gnss-Signals GNSS-SignalIDs, velocityMeasurementSupport BOOLEAN, . . . . } PositioningModes::=SEQUENCE {posModes BIT STRING {standalone (0), UE-Based (1), ue-assisted (2)} (SIZE (1 . . . 8)), . . . } AssistanceDataSupportList::=SEQUENCE { . . . } LocationCoordinateTypes::=SEQUENCE {ellipsoidPoint BOOLEAN, ellipsoidPointWithUncertaintyCircle BOOLEAN, ellipsoidPointWithUncertaintyEllipse BOOLEAN, polygon BOOLEAN, ellipsoidPointWithAltitude BOOLEAN, ellipsoidPointWithAltitudeAndUncertaintyEllipsoid BOOLEAN, ellipsoidArc BOOLEAN, . . . } Velocity Types::=SEQUENCE {horizontalVelocity BOOLEAN, horizontalWithVerticalVelocity BOOLEAN, horizontalVelocity-WithUncertainty BOOLEAN, horizontalWithVerticalVelocityAndUncertainty BOOLEAN, . . . } ProvideLocationInformation::=SEQUENCE {commonIEsProvideLocationInformation CommonIEsProvideLocationInformation OPTIONAL, waps-ProvideLocationInformation WAPS-ProvideLocationInformation OPTIONAL, . . . } CommonIEsProvideLocationInformation::=SEQUENCE {///* NO CHANGE FROM LPP; not shown here *///} WAPS-ProvideLocationInformation::=SEQUENCE {waps-SignalMeasurementInformation WAPS-MeasurementList OPTIONAL, waps-Error WAPS-Error OPTIONAL, . . . } GNSS-ID-Bitmap::=SEQUENCE {gnss-ids BIT STRING {gps (0), sbas (1), qzss (2), galileo (3), glonass (4)} (SIZE (1 . . . 16)), . . . } WAPS-Error::=CHOICE {///* NO CHANGE FROM LPP; not shown here *///} WAPS-MeasurementList::=SEQUENCE (SIZE(1 . . . 16)) OF WAPS-Measurements WAPS-Measurements::=SEQUENCE {waps-SignalID waps-SignalID, waps-CodePhaseAmbiguityINTEGER (0 . . . 127) OPTIONAL, waps-SatMeasList waps-MeasList, . . . } WAPS-MeasList::=SEQUENCE (SIZE(1 . . . 64)) OF WAPS-MeasElement WAPS-MeasElement::=SEQUENCE {svID INTEGER (0 . . . 65535), cNo INTEGER (0 . . . 63), mpathDet ENUMERATED {notMeasured (0), low (1), medium (2), high (3), . . . }, carrierQualityInd INTEGER (0 . . . 3) OPTIONAL, codePhase INTEGER (0 . . . 2097151), integerCodePhase INTEGER (0 . . . 127) OPTIONAL, codePhaseRUEError INTEGER (0 . . . 63), doppler INTEGER (−32768 . . . 32767) OPTIONAL, adr INTEGER (0 . . . 33554431) OPTIONAL, . . . } RequestAssistanceData::=SEQUENCE { . . . } RequestCapabilities::=SEQUENCE {WAPS-RequestCapabilities::=SEQUENCE {waps-SupportListReq BOOLEAN, assistanceDataSupportListReq BOOLEAN, locationVelocityTypesReq BOOLEAN, . . . } RequestLocationInformation::=SEQUENCE {commonIEsRequestLocationInformation CommonIEsRequestLocationInformation OPTIONAL, waps-RequestLocationInformation WAPS-RequestLocationInformation OPTIONAL, . . . } CommonIEsRequestLocationInformation::=SEQUENCE {///* NO CHANGE FROM LPP; not shown here *///} WAPS-RequestLocationInformation::=SEQUENCE {fineTimeAssistanceMeasReq BOOLEAN, adrMeasReq BOOLEAN, multiFreqMeasReq BOOLEAN, as sistanceAvailability BOOLEAN, . . . }--ASN1STOP.

It is to be understood that many WAPS functions may be integrated into the GMLC and/or E-SMLC. For example, the GMLC and/or E-SMLC could be programmed to supply the encryption key(s) required to decrypt the beacon signal(s), could act as an authorization agent for WAPS usage assuming either an on-board database or the ability to query a WAPS-hosted database, and could gather and then report usage from each user device.

One or more embodiments of the invention provide for modifications of and variations from known signaling procedures and messages used to support location capabilities of GSM using the RRLP. Such modifications may be needed to enable certain features of the WAPS system to operate in existing networks. Various procedures may be contemplated, including methods using a GNSS, network-based location positioning methods using Cell-ID or some form of TDOA, and other location positioning methods. The SMLC may operate similarly to the RNC and SAS of the UTRAN implementations above.

The discussion regarding UTRAN applies similarly to SMLC implementations of the invention, and is incorporated by reference in this section. For example, the discussion regarding signal modification—that is, the discussions pertaining to not using signal modifications (and instead relying on transformations of pseudo-ranges, among other features) and to using signal modifications—in UTRAN applies similarly to SMLC with few exceptions.

Figure 16:
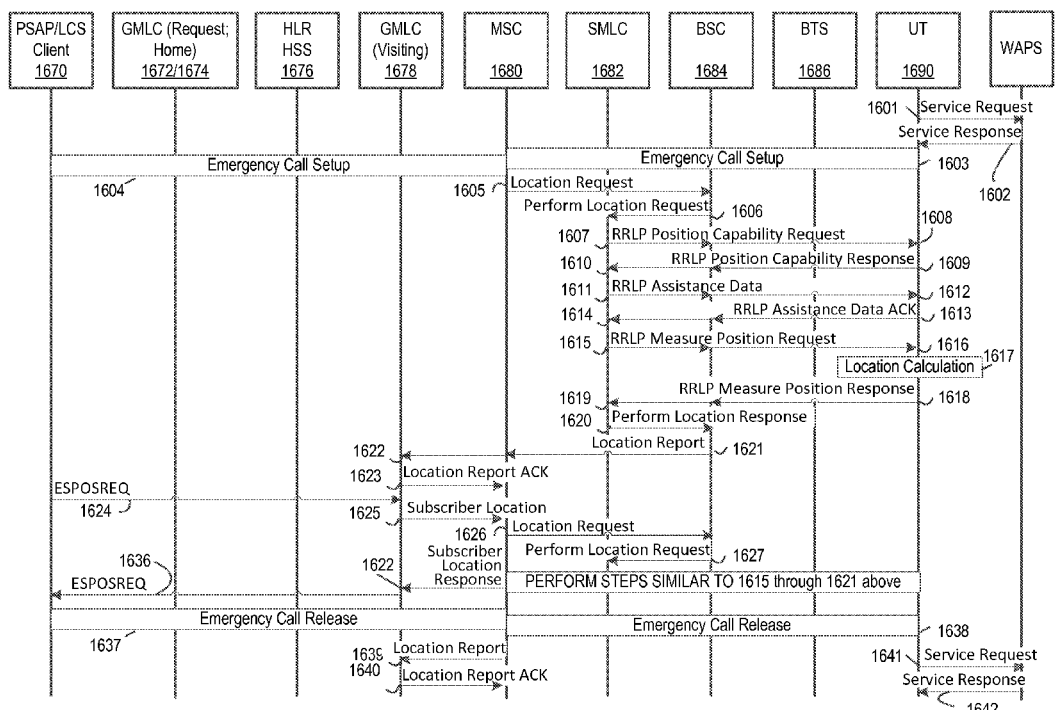
FIG. 16 illustrates an emergency call with WAPS network support.

FIG. 16 illustrates an emergency call with WAPS support. Steps 1 and 2 may be a query by the user device to a WAPS authentication server requesting the public key and authorization for that IMSI to access WAPS (and optimally completed before the location calculation request). Steps 17 and 31 highlight the fact that the user device can use one or both of GPS and WAPS to calculate its location. Steps 42 and 43 illustrate billing information stored on the user device being transmitted to a WAPS billing server at some periodic interval.

The following Tables illustrate various modifications that may be implemented in accordance with either of Option 2 and Option 3 to carry out different features of the invention.

Examples of network and user device equipment modifications may include: RNC (WAPS support for the signaling may be required; WAPS billing/authentication support may be required; Support for modified signaling messages may be required); SMLC (WAPS support for the signaling may be required; WAPS billing/authentication support is required; Support for modified signaling messages may be is required); UE (a number of hardware and software modifications may be required regardless of whether network-based changes may be made or not).

Modifications to signaling messages may include: RRLP Positioning Capability Request (For Option 2, a new GNSS will be used and for Option 3 new WAPS specific capability fields will be added); RRLP Positioning Capability Response (For Option 2, a new GNSS will be used and for Option 3 new WAPS specific capability fields will be added); RRLP Measure Position Request (For Option 2, a new GNSS will be used and for Option 3 new WAPS fields will be added); RRLP Measure Position Response (For Option 2, a new GNSS will be used and for Option 3 new WAPS signal transport fields will be added); RRLP Protocol Error (There may be no location protocol specific elements in this message; it transports errors about RRLP errors (message too short, unknown reference number, etc.)). Modifications to the LocErrorReason IE (3GPP 44.031 4.2, 5.1) to add a WAPS value for a new GNSS may include: LocErrorReason (Add new values for WAPS: WAPS positioning method not supported; Invalid WAPS measured results; WAPS position calculation error). Modifications to the PositionData IE (3GPP 44.031 5.1, A.3.2.9) to add new a WAPS value may include: PositionData (Define a bit value for WAPS).

Modifications to the GANSSAssistanceForOneGANSS IE (3GPP 44.031 5.1) to add a WAPS value for a new GNSS may include: ganssID IE within the GANSSAssistanceForOneGANSS IE (Define one value for WAPS for consistency).

Modification of the ganssID IE in an assistance data message may be made for GNSS ID numbering consistency and should not necessarily be taken to imply support for WAPS assistance. Modifications to the GANSSGenericAssistDataElement IE (3GPP 44.031 5.1) to add a WAPS value for a new GNSS may include: ganssID IE within the GANSSGenericAssistanceDataElement IE (Define one value for WAPS for consistency). Note: the modification of the ganssID IE in the assistance data message may be made for GNSS ID numbering consistency and should not be taken to imply support for WAPS assistance. Modifications to the ganssID IE (3GPP 44.031 5.1, A.4.6.2) to add a WAPS value for a new GNSS may include: ganssID (Define one value for WAPS. The absence value of Galileo need not be changed). Modifications to the GANSS-MsrElement IE (3GPP 44.031 5.1) to add a WAPS value for a new GNSS may include: ganssID within the GANSS-MsrElement IE (Define one value for WAPS. The absence value of Galileo need not be changed). Modifications to the GANSSPositioningMethod IE (3GPP 44.031 5.1, A.2.2.1) to add new WAPS values may include: GANSSPositioningMethod (A new bit value will need to be assigned for WAPS). Modifications to the GANSS-PositionMethod IE (3GPP 44.031 5.1) to add a WAPS value for a new GNSS may include: ganssID within the GANSSPositionMethod IE (Define one value for WAPS. The absence value of Galileo need not be changed). Modifications to the GANSS-SignalID IE (3GPP 44.031 5.1, A.3.2.10.1) to add new WAPS values may include: GANSSSignalID (This parameter will need a new value for WAPS and the A.59 table (signal definitions) will an addition for WAPS). Modifications to the GANSSSignals IE (3GPP 44.031 5.1, A.3.2.10.1) to add new WAPS values may include: GANSSSignals (This parameter will need a new value for WAPS and the A.59 table (signal definitions) will an addition for WAPS). Modifications to the gANSSTimeID IE (3GPP 44.031 5.1, A.3.2.9) to add new WAPS values may include: gANSSTimeID (A new bit value will need to be assigned for WAPS). Modifications to the MultipleMeasurementSets IE (3GPP 44.031 5.1, A.8.2.1) to add new WAPS values may include: MultipleMeasurementSets (Assign a new bit value to show support for WAPS). Modifications to the NonGANSSPositionMethods IE (3GPP 44.031 5.1, A.8.2.1) to add new WAPS values may include: NonGANSSPositionMethods (Assign two bit values to show support for: MS Assisted WAPS; MS Based WAPS). Modifications to the PositionMethod IE (3GPP 44.031 5.1, A.8.2.1) to add new WAPS values may include: PositionMethod (To the enumerated values add: WAPS; WAPS or GPS). It may be assumed that WAPS in any combination with EOTD is not required (such as WAPS or EOTD and WAPS or GPS or EOTD); if required, then additional enumerated values will be required for those value(s).

A new set of messages generically referred to as WAPS Signal Measurements may be required to transport WAPS signal measurements: MsrPosition-Rsp::=SEQUENCE {multipleSets MultipleSets OPTIONAL, referenceIdentity ReferenceIdentity OPTIONAL, otd-MeasureInfo OTD-MeasureInfo OPTIONAL, locationInfo LocationInfo OPTIONAL, gps-MeasureInfo GPS-MeasureInfo OPTIONAL, locationError LocationError OPTIONAL, extensionContainer ExtensionContainer OPTIONAL, . . . , rel-98-MsrPosition-Rsp-Extension Rel-98-MsrPosition-Rsp-Extension OPTIONAL, rel-5-MsrPosition-Rsp-Extension Rel-5-MsrPosition-Rsp-Extension OPTIONAL, rel-7-MsrPosition-Rsp-Extension Rel-7-MsrPosition-Rsp-Extension OPTIONAL, waps-MsrPosition-Rsp-Extension WAPS-MsrPosition-Rsp-Extension OPTIONAL} WAPS-MsrPosition-Rsp-Extension::=SEQUENCE {velEstimate VelocityEstimate OPTIONAL, wapsLocationInfo WAPSLocationInfo OPTIONAL, wapsMeasureInfo WAPSMeasureInfo OPTIONAL, . . . } WAPSLocationInfo::=SEQUENCE {referenceFrame ReferenceFrame OPTIONAL, WAPSTODm INTEGER (0 . . . 3599999) OPTIONAL, WAPSTODFrac INTEGER (0 . . . 16384) OPTIONAL, WAPSTODUncertainty INTEGER (0 . . . 127) OPTIONAL, fixType FixType, stationaryIndication INTEGER (0 . . . 1) OPTIONAL, posEstimate Ext-GeographicalInformation, . . . } WAPSMeasureInfo::=SEQUENCE {WAPSMsrSetList SeqOfWAPS-MsrSgnElement} SeqOfWAPS-MsrSgnElement::=SEQUENCE (SIZE(1 . . . 16)) OF WAPS-SgnElement WAPS-SgnElement::=SEQUENCE {ID INTEGER (0 . . . 63), cNo NTEGER (0 . . . 63), mpathDet MpathIndic, carrierQualityInd INTEGER (0 . . . 3) OPTIONAL, codePhase INTEGER (0 . . . 2097151), integerCodePhase INTEGER (0 . . . 127) OPTIONAL, codePhaseRMSError INTEGER (0 . . . 63), doppler INTEGER (−32768 . . . 32767) OPTIONAL, adr INTEGER (0 . . . 33554431) OPTIONAL}

It is to be understood that many WAPS functions may be integrated into the GMLC and/or SMLC. For example, the GMLC and/or SMLC could be programmed to supply the encryption key(s) required to decrypt the beacon signal(s), could act as an authorization agent for WAPS usage assuming either an on-board database or the ability to query a WAPS-hosted database, and could gather and then report usage from each user device.

One or more embodiments of the invention provide for modifications of and variations from known signaling procedures and messages used to support location capabilities of the CDMA2000 protocol. Such modifications may be needed to enable certain features of the WAPS system to operate in existing networks. Various procedures may be contemplated, including methods using a GNSS, network-based location positioning methods using Cell-ID or some form of TDOA, and other location positioning methods. The MPC and/or PDE may operate similarly to the RNC and SAS of the UTRAN implementations above.

The discussion regarding UTRAN applies similarly to MPC and/or PDE implementations of the invention, and is incorporated by reference in this section. For example, the discussion regarding signal modification—that is, the discussions pertaining to not using signal modifications (and instead relying on transformations of pseudo-ranges, among other features) and to using signal modifications—in UTRAN applies similarly to MPC and/or PDE with few exceptions. For Option 2, the MPC, PDE, and user device may utilize modified messaging to exchange information about WAPS support (e.g., WAPS will be included as a supported positioning method in the MPCAP message), but all WAPS signals may still be mapped by the user device into GPS pseudoranges for transmission back to the network when used for network-based location calculation. For an Option 4, the MPC, PDE, and user device may utilize modified messaging to exchange information about WAPS support, but a new GNSS constellation may be defined for WAPS and any WAPS measurements transported within the context of the new constellation.

Figure 17:
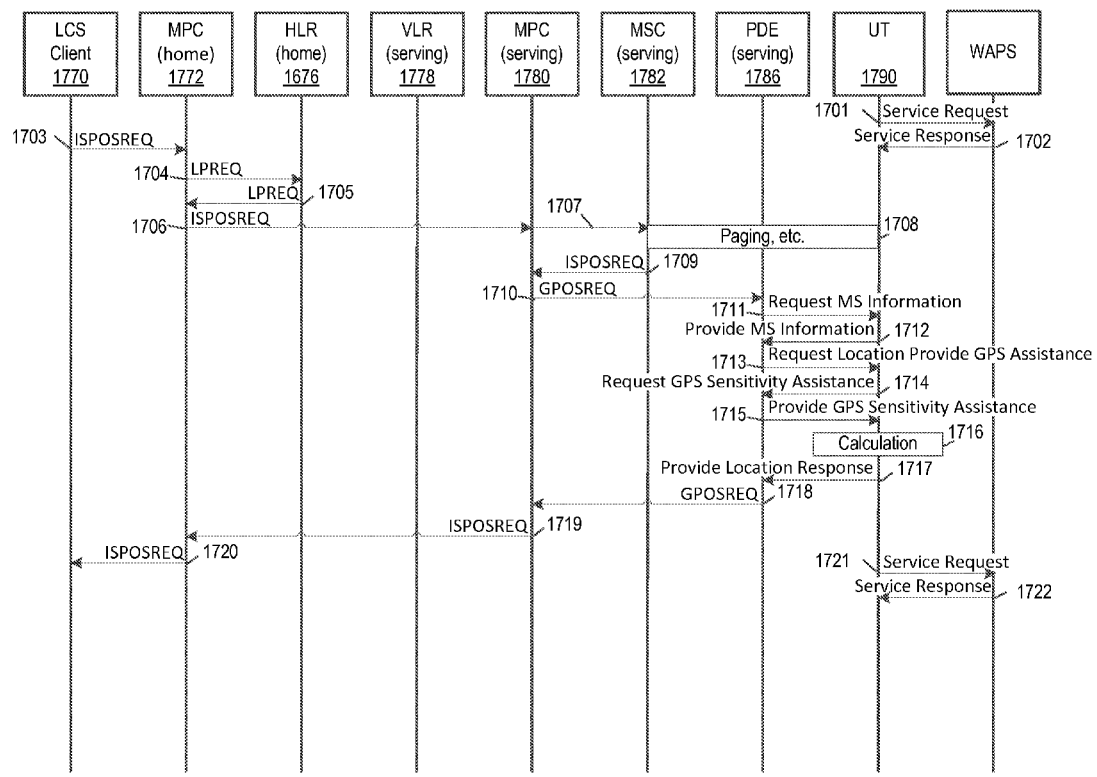
FIG. 17 illustrates a Location Request to a user device with WAPS support and no modification to signaling.

FIG. 17 illustrates a MT Location Request to a user device with WAPS support and no modification to signaling. Steps 1 and 2 may be a query by the user device to a WAPS authentication server requesting the public key and authorization for that MEID to access WAPS (and optimally completed before the location calculation request). Step 16 highlights the fact that the user device can use one or both of GPS and WAPS to calculate its location. Steps 21 and 22 illustrate billing information stored on the user device being transmitted to a WAPS billing server at some periodic interval.

Figure 18:
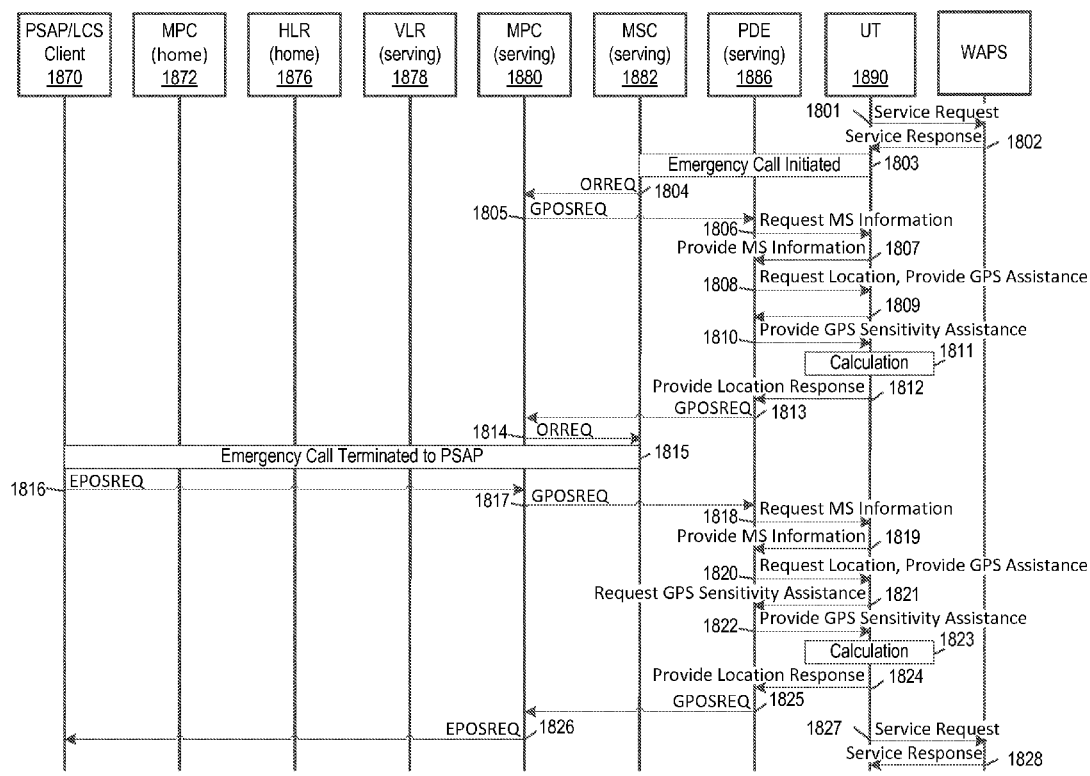
FIG. 18 illustrates an emergency call with WAPS network support.

FIG. 18 illustrates an emergency call with WAPS support. Steps 1 and 2 may be a query by the user device to a WAPS authentication server requesting the public key and authorization for that IMSI to access WAPS (and optimally completed before the location calculation request). Steps 11 and 23 highlight the fact that the user device can use one or both of GPS and WAPS to calculate its location. Steps 27 and 28 illustrate billing information stored on the user device being transmitted to a WAPS billing server at some periodic interval.

The illustration in FIG. 18 may also apply to an Emergency Call using network-based location computation and showing a sample of WAPS system signaling and operation where steps 1805 through 1813 may be omitted. Steps 1 and 2 may be a query by the user device to a WAPS authentication server requesting the public key and authorization for that IMSI to access WAPS (and optimally completed before the location calculation request). Step 14 highlights the fact that the user device is capturing the WAPS signal and transforming them into GPS pseudoranges for return to the network. Steps 19 and 20 illustrate billing information stored on the user device being transmitted to a WAPS billing server at some periodic interval.

The following Tables illustrate various modifications that may be implemented in accordance with either of Option 2 and Option 3 to carry out different features of the invention.

Examples of network and user device equipment modifications may include: BSC (Support for modified signaling messages may be required); MPC (WAPS support for the signaling may be required; WAPS billing/authentication support is required); MSC (Support for the modified MPCAP may be required; Support for modified IS-801 message transport, as required by each MSC); PDE (WAPS support for the signaling may be required; WAPS billing/authentication support may be required; Support for modified signaling messages may be required); UE (a number of hardware and software modifications may be required regardless of whether network-based changes may be made or not).

Modifications to signaling messages may include: MPCAP (WAPS support will need to be indicated as a capability); Request MS Information (This only requests the user device to send its capabilities); Provide MS Information (WAPS support will need to be indicated as a capability); Request Advanced MS Information (This only requests the user device to send its capabilities); Provide Advanced MS Information (WAPS support for GNSS may be required); Request Extended MS Information (If WAPS support is to be independently queried, then this message will require modification); Provide Extended MS Information (WAPS support will need to be indicated as a capability); Request Location Response (There may be no method specific information in this message); Provide Location Response (There may be no method specific information in this message); Request Advanced Location Response (There is no method specific information for WAPS in this message); Provide Advanced Location Response (WAPS support will need to be indicated as a supported GNSS); Request Extended Location Response (There may be no method specific information in this message); Provide Extended Location Response (WAPS support will need to be added as a "fix type"); Request General Location Measurement (If WAPS is to be commanded as a method, then this message will require modification); Provide General Location Measurement (If WAPS is to be used as a method, then this message will require modification); Request GPS Coarse Location Response (There may be no method specific information in this message); Provide GPS Coarse Location Response (See discussion about pseudoranges herein); Request Pseudorange Measurement (See discussion about pseudoranges herein); Provide Pseudorange Measurement (See discussion about pseudoranges herein); Request GNSS Pseudorange Measurement (WAPS support for GNSS may be required); Provide GNSS Pseudorange Measurement (WAPS support for GNSS may be required).

Modifications to the MobilePositioningCapability (MPCAP) parameter [I-STD-036-C Section 2.3.2.16] may include: decimal values to indicate WAPS Standalone mode, WAPS MS-based mode, and WAPS MS-assisted mode. Modifications to the Provide MS Information message [TIA-801-B 2.2.4.2.3] may include: LOC_CALC_CAP (WAPS as a supported capability); WAPS_CALC_CAP (new field to indicate WAPS capabilities). Modifications to the Request Extended MS Information message [TIA-801-B 3.2.4.1.7] may include: WAPS_CAP_REQ (New field: if set to 1, WAPS capabilities to be included). Modifications to the Provide Extended MS Information message [TIA-801-B 2.2.4.2.11] may include: ACQ_CAP (Add bit indicating WAPS support); LOC_CALC_CAP (Add new bit for WAPS support). Modifications to the Provide Advanced Location Response message [TIA-801-B 2.2.4.3.2.25] may include: Assignment of a value for WAPS for Time reference source, Fix Type, and Reference source for clock. Modifications to the Provide Extended Location Response message [TIA-801-B 2.2.4.2.10] may include: FIX_TYPE (Add a bit for WAPS). Modifications to the Request General Location Measurement message [TIA-801-B 3.2.4.1.8] may include: WAPS_MEAS_REQ (If set to 1, include WAPS signal measurements). Modifications to the Provide General Location Measurement message [TIA-801-B 2.2.4.3.2.13] may include: Time reference source (Add a value for WAPS); WAPS Source (Within the Pseudorange IE, add a Boolean to indicate WAPS support). Modifications to the Provide Pseudorange Measurement message [TIA-801-B 2.2.4.2.5] may include: WAPS Source (Within the Pseudorange IE, add a Boolean to indicate WAPS support).

Required network and user device equipment modifications may include: BSC (Support for modified signaling messages may be required); MPC (WAPS support for the signaling may be required; WAPS billing/authentication support may be required; Support for modified signaling messages may be required); MSC (Support for the modified MPCAP may be required; Support for modified IS-801 message transport, as required by each MSC); PDE (WAPS support for the signaling may be required; WAPS billing/authentication support may be required; Support for modified signaling messages may be required); UE (a number of hardware and software modifications may be required regardless of whether network-based changes may be made or not).

Modifications to signaling messages may include: MPCAP (WAPS support may need to be indicated as a capability); Request MS Information (This may only requests the user device to send its capabilities); Provide MS Information (WAPS support may need to be indicated as a capability); Request Advanced MS Information (This may only requests the user device to send its capabilities); Provide Advanced MS Information (WAPS support for GNSS may be required); Request Extended MS Information (If WAPS support is to be independently queried, then this message may require modification); Provide Extended MS Information (WAPS support may need to be indicated as a capability); Request Location Response (There may be no method specific information in this message); Provide Location Response (There may be no method specific information in this message); Request Advanced Location Response (There may be no method specific information for WAPS in this message); Provide Advanced Location Response (WAPS support may need to be indicated as a supported GNSS); Request Extended Location Response (There may be no method specific information in this message); Provide Extended Location Response (WAPS support may need to be added as a "fix type"); Request General Location Measurement (If WAPS is to be commanded as a method, then this message may require modification); Provide General Location Measurement (If WAPS is to be used as a method, then this message may require modification); Request GPS Coarse Location Response (There may be no method specific information in this message); Provide GPS Coarse Location Response (See discussion about pseudoranges herein); Request Pseudorange Measurement (See discussion about pseudoranges herein); Provide Pseudorange Measurement (See discussion about pseudoranges herein); Request GNSS Pseudorange Measurement (WAPS support for GNSS may be required); Provide GNSS Pseudorange Measurement (WAPS support for GNSS may be required).

It is to be understood that many WAPS functions may be integrated into the MPC and/or PDE. For example, the MPC and/or PDE could be programmed to supply the encryption key(s) required to decrypt the beacon signal(s), could act as an authorization agent for WAPS usage assuming either an on-board database or the ability to query a WAPS-hosted database, and could gather and then report usage from each user device. At first blush, it would not appear to be easier to insert WAPS support into the MPC and/or PDE than to build external servers providing that support, but more analysis will be required to definitively answer the question when the WAPS back-office architecture is completed.

As noted previously herein, QPSK modulation may be used for data transmission in some embodiments. QPSK modulation of the transmit signal, while using the same BPSK spreading and spectrum shaping filter, maintains the same peak-to-average ratio almost identically. As a result, there is no additional impact to the transmitter in terms of back-off (such as PA back-off) required to maintain the Out-Of-Band emission performance (which may be applicable for a QPSK spread sequence, for example). The ranging signal may be BPSK modulated with BPSK spreading (same as GPS), so that the GPS receiver can be re-used for acquisition and tracking of the WAPS ranging signal.

At the receiver/user device end, received QPSK data modulation may affect the receiver, such as if a GPS radio front end is used. With respect to acquisition and tracking for the data segments of the WAPS transmission, the GPS signal comprises BPSK spreading of a BPSK modulated data sequence. In order to facilitate re-use of the GPS/GNSS receiver baseband for the WAPS of an embodiment using QPSK, the QPSK modulated data may be spread using a BPSK spreading sequence. The acquisition processing block of a GNSS receiver can be re-used to process the WAPS signal, irrespective of whether it a software GPS receiver or a hardware GPS receiver, and irrespective of whether a linear or squared detector is used in the acquisition process. For the same raw SNR at the input to the acquisition block, the detection performance will be identical for QPSK modulation when compared with BPSK modulation. The GNSS tracking blocks can also be re-used with minor modifications. The GNSS data demodulation is generally performed in firmware or software so, with minor modifications to the frequency tracking loop to account for the QPSK data modulation, the WAPS data demodulation can be performed using the same processing capability.

A signaling method is further described below for WAPS that provides interference mitigation between transmitters, such as transmitters 110 as shown in FIG. 1, and improved data throughput. Positioning signals from transmitters comprise two portions of data, a first portion that is pulsed so as not to interfere with the transmission of other transmitters and a second portion that is on in a continuous manner which allows for improved data throughput and signal acquisition speed.

One problem that occurs in terrestrial systems, especially ones that operate in urban environments, is the problem of mutual interference. Another problem that can occur is the timeliness and the throughput of certain positioning data that allows the overall system to operate efficiently. Conventional positioning systems focus on one of three methods of transmission: code division multiple access (CDMA), time division multiple access (TDMA), and frequency division multiple access (FDMA). In CDMA transmitters typically operate concurrently and mutual interference is reduced by having different transmitters transmit distinct coded signals, which have low cross correlation properties. In TDMA, different transmitters may be assigned different times of transmission, sometimes called "slots" and one and only one transmitter is permitted to transmit during a slot. In FDMA different transmitters may be assigned different frequency passbands. Normally such pass bands may be disjoint although in orthogonal FDMA the passbands overlap somewhat. All such systems utilize time difference of arrival, or trilateration methods at receiving sites in order to determine their locations. The positioning information transmitted by the transmitters includes precision timing sequences, and positioning data, the latter including the location of transmitters, various timing corrections. The positioning data may be provided in a number of ways. For example, it may be modulated onto a coded timing sequence, it may be added or overlaid over the timing sequence, or it may be concatenated with the timing sequence.

The most common wide area positioning system is the Global Position Satellite System (GPS) which for the timing sequence employs a set of distinct pseudo noise sequences chosen among a set of Gold Codes of length 1023. As indicated above, in TDMA systems different transmitters may be assigned slots and the transmitters only broadcast positioning data in their assigned slots, hence producing minimal mutual interference with their neighbors. As a result of the limited number of slots, there may be locations where a receiver may still see simultaneous transmission, and often mutual interference is reduced in such cases by utilizing distinct codes for nearby transmitters that may transmit on the same slot.

Embodiments described herein may use transmitters transmitting on a continuous basis. However, certain portions of the positioning data may be sent at distinct times so as not to provide mutual interference. In an exemplary embodiment, the coded timing sequences may be pulsed and at least a portion of the positioning information, such as transmitter location data, is broadcast by each transmitter in a continuous basis. In an exemplary embodiment, a portion of the positioning information broadcast continuously from each transmitter is simulcast, meaning the data is identical. Simulcast allows a rapid and reliable distribution of data such as transmitter identification and location. This in turn allows a receiving platform to rapidly synchronize itself to the network and determine the number of location of transmitters. Other data that may be included in such simulcasts include transmitter health data and user authorization data. In an exemplary embodiment, the sync signal may be broadcast simultaneously from all transmitters in the system enabling quick receiver synchronization to the network.

Unlike time slotted TDMA systems, embodiments described herein may have cross interference if the transmitters are continuously broadcasting positioning data. The continuously broadcast positioning data is received by receivers concurrently with precision timing data and other positioning data from a transmitter. This cross interference may be minimized by utilizing a narrowband format for the continuous positioning data. In this manner the continuous positioning data and the precision timing data may be separated by standard filtering methods. Nevertheless, a higher RF instantaneous dynamic range is used since, in many cases, the continuously received positioning data from one transmitter may be at a much higher level than the precision timing data.

As an example, consider a system which uses a repeat pattern of 7 transmitters. A particular transmitter, say transmitter A, broadcasts a repeating coded timing sequence of frame length 1023 at 1 M symbols per second, but other embodiments may also be implemented. Each group of three frames may correspond to a data bit of information. These three repetitive frames may be integrated in order to produce a precision timing measurement. Low speed data may be incorporated on such a group of three frames by phase or differential phase modulation. Assume that 100 frames may be transmitted by this transmitter and hence 33 bits of data, assuming biphase coding. This total period is 102.3 msec in length. Concurrently, this transmitter transmits 1 symbol of data per repetition interval again by phase or differential phase modulation. At the end of this period of 102.3 msec, transmitter A ceases the transmission of the precision coded sequence but continues its transmission of positioning data. At this point another transmitter B begins a similar sequence. Of course transmitter B had been transmitting continuous positioning information during the period during which transmitter A was transmitting its precision timing data. The sequence continues in this manner.

In the above example each transmitter transmits at most 33 symbols of data via modulation of its coded sequence during a period of 0.72 seconds. However, the continuous transmission portion of the transmission from a given transmitter corresponds to 722 symbols of data. Assuming on average that a user receives signals from 4 transmitters, then the composite rate would only be 132 symbols if transmitters only transmitted during a particular period of 102.3 msec. Higher throughput of the continuous transmission may be achieved through the use of higher order modulation, such as differential quadraphase shift keying.

Aspects Relating to Control and User Plane Embodiments

Location mechanisms within cellular telephony networks may be categorized into one of two broad categories: "Control-Plane" (e.g., use of the signaling plane within the network to provide the desired functionality); and "User-Plane" (e.g., use of the subscriber bearer traffic plane within the SP's network to provide the desired functionality).

The WAPS standardization may encompass both Control Plane and User Plane approaches. The Control Plane standardization occurs in 3GPP for UTRA/RRC, LTE/LPP, and GSM/RRLP; and in 3GPP2 for CDMA/TIA-801. The User Plane standardization occurs in OMA; although this may also require control plane support for the underlying capability, e.g., OMA LPPe providing extensions for the 3GPP LTE/LPP technology.

Control Plane Positioning

Figure 9B:
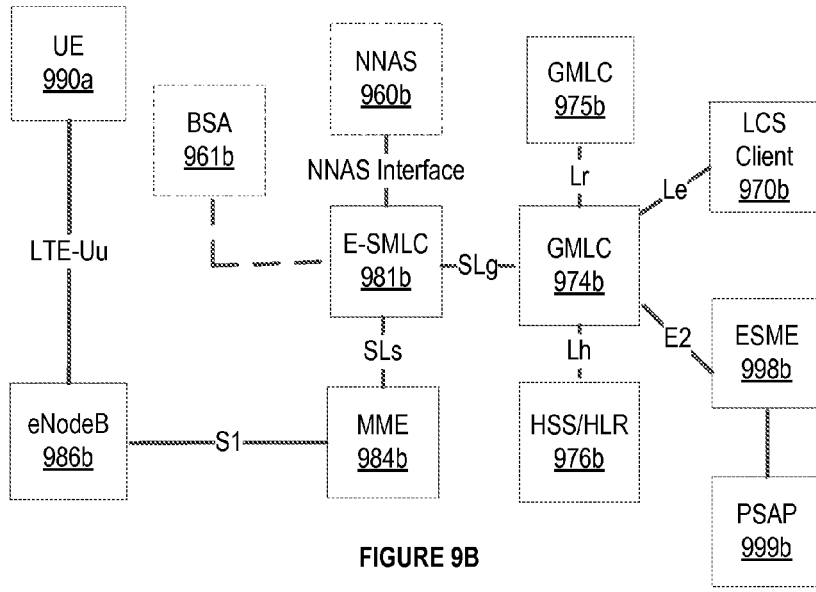
FIG. 9B depicts aspects of a positioning system.

In the LTE Control Plane, user device positioning is accomplished using LPP and the RAN signaling channels. Control Plane Architecture is shown in FIG. 9B.

The Evolved Serving Mobile Location Center (E-SMLC) manages the overall process for obtaining a user device's location. The E-SMLC can supply assistance information and perform the location calculation in UE-Assisted mode, both on an as-needed basis. The Evolved Node B (eNodeB, or sometimes just eNB) can provide signal measurement results to be used in the location computation process. The Emergency Services Message Entity (ESME) routes and processes out-of-band messages such as location requests related to emergency calls. The LCS server and the first point of contact for a LCS client request. The GMLC will retrieve routing information from the HLR/HSS, send the positioning request to the E-SMLC, and then send the resulting position back to the client. Note that a GMLC may take on one of three roles: Requesting GMLC: the GMLC which receives the LCS client request; Home GMLC: the GMLC in the home PLMN of the user device; Visited GMLC: the GMLC through which the UT is receiving service. A single GMLC may serve more than one role simultaneously.

The HLR/HSS holds LCS subscription and routing information for each user device. The client that sends a location request for an attached user device. See EMSE/PSAP. The Mobility Management Entity (MME) is responsible for various UT subscription information elements such as authorization of attachment, E-SMLC selection, and managing LCS position requests. The Public Safety Answering Point (PSAP) is the location where the emergency call is answered and emergency services dispatched. The user device participates in the various positioning procedures by performing measurements of downlink signals, transmitting uplink signals for measurement, processing signals, and calculating result(s) which may be transmitted to the network. The participation of the user device varies by the positioning method used. The Base Station Almanac (BSA) contains the Latitude and Longitude of the service provider's cell sites. The Assistance Server (NNAS) provides the assistance data to the E-SMLC, to be used in UE Based or UE Assisted positioning modes. The WAPS position computation entity on the E-SMLC maps the cell ID to cell LLA using the base station almanac. The cell LLA is sent through an interface to the NNAS to request assistance local to the area around the cell LLA. The NNAS looks up the database that contains both static (beacon LLAs) and dynamic (beacon atmospheric pressure and temperature, etc.) components to provide assistance information to the user device for the different positioning modes of operation. An alternative approach requires the NNAS access to the cellular base station almanac. Based on the cell ID, the NNAS looks-up the latitude and longitude of the base-station and determines the corresponding WAPS beacons likely to be detectable in the geographical area where the user device is operating. The NNAS looks up a WAPS database that contains both static (beacon LLAs) and dynamic (beacon atmospheric pressure and temperature, beacon timing correction) components to provide assistance information to the user device for the different positioning modes of operation.

The ESME to GMLC interface is functionally equivalent to the Le interface. Le refers to the LCS Client to LCS Server (GMLC) interface, which is the interface that transports the location request from the LCS Client to the LCS Server and the location position from the LCS Server to the LCS Client. The Lh refers to the GMLC to HLR/HSS interface, which is used to retrieve user device routing information and LCS subscription information from the HLR/HSS by the GMLC. The Lr refers to the GMLC to GMLC interface, which is used to forward location requests when the Requesting GMLC and serving GMLC (either Home or Visited) may be different. The 51 refers to the MME to eNodeB interface, which transports location related signaling from the MME to (and from) the eNodeB. The SLg refers to the GMLC to E-SMLC interface, which is used by the GMLC to send location requests to the RAN and receive the location. The SLs refers to the E-SMLC to MME interface, which is used by the E-SMLC to send location requests and receive location information and signal measurements from the UT. It also used for tunneling measurement requests to the RAN, as needed. The Uu refers to the UE to UTRAN interface, which transports signaling between the user device and the eNodeB. The NNAS interface associated with E-SMLC and NNAS transports signaling between the S-MLC and the NNAS. This interface conveys WAPS assistance data, and is similar in operation to the WARN utilized for A-GPS.

The architecture of FIG. 9B may also relate to a UE-Standalone positioning mode, where the user device location calculation is performed by the user device, and there is no assistance data provided by the E-SMLC. Components shown by dotted lines may not be needed for the standalone mode. Note that the accurate altitude estimate is also available as part of the location estimate in standalone mode (as in assisted modes) when user device pressure and temperature readings may be available. This is simpler network architecture, as there is no need for the E-SMLC/BSA to interact with the NNAS.

Figure 19:
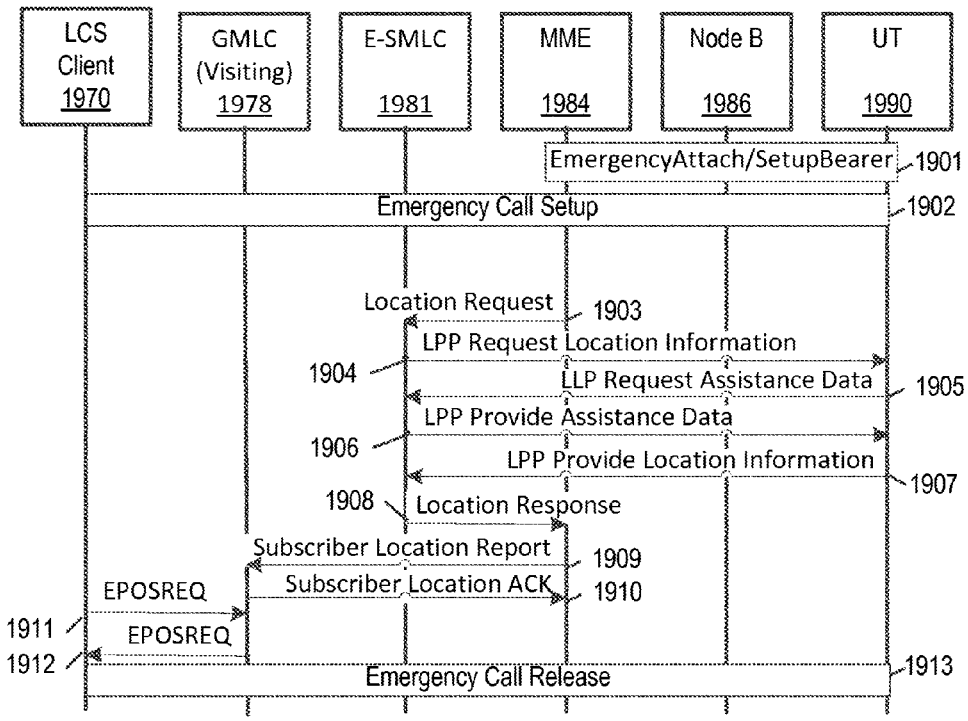
FIG. 19 illustrates a UE Based position calculation with WAPS network assistance data provided by an E-SMLC.

The call flow of FIG. 19 represents a UE Based position calculation, with WAPS assistance data provided by the E-SMLC. As depicted in FIG. 19: The user device requests an emergency attach (if needed) for bearer to be used for an emergency call. The emergency call is setup between the user device and PSAP. The MME selects an E-SMLC and sends the Location Request message to it. In this case, a position using WAPS is calculated by the user device and used to meet the requested location QoS. The E-SMLC sends a LPP Request Location Information to the user device, containing a WAPS-RequestLocationInformation element (e.g., indicating WAPS/MBS and a positioning method). The user device requests WAPS assistance data from the E-SMLC. The E-SMLC returns WAPS assistance data to the user device. The user device returns the WAPS computed location to the E-SMLC. The E-SMLC returns the user device's location to the MME. Once the location is returned to the MME by the E-SMLC, the user device's location is sent to the V-GMLC in the Subscriber Location Report message. The Subscriber Location Report Ack is sent from the V-GMLC to the MME. At some point, the PSAP requests a location update and the EPOSREQ is sent to the V-GMLC. The V-GMLC returns the user device's location to the PSAP in the EPOSREQ message. When completed, the emergency call is ended.

For a user device Assisted position calculation in the E-SMLC, in step 7, the user device provides WAPS measurements instead of the user device computed location, and the E-SMLC utilizes the returned WAPS measurements to calculate the user device's location. For a UE-Standalone position calculation, steps 5 and 6 may be omitted. The user device calculated position is returned at step 7.

User Plane Positioning

Figure 9C:
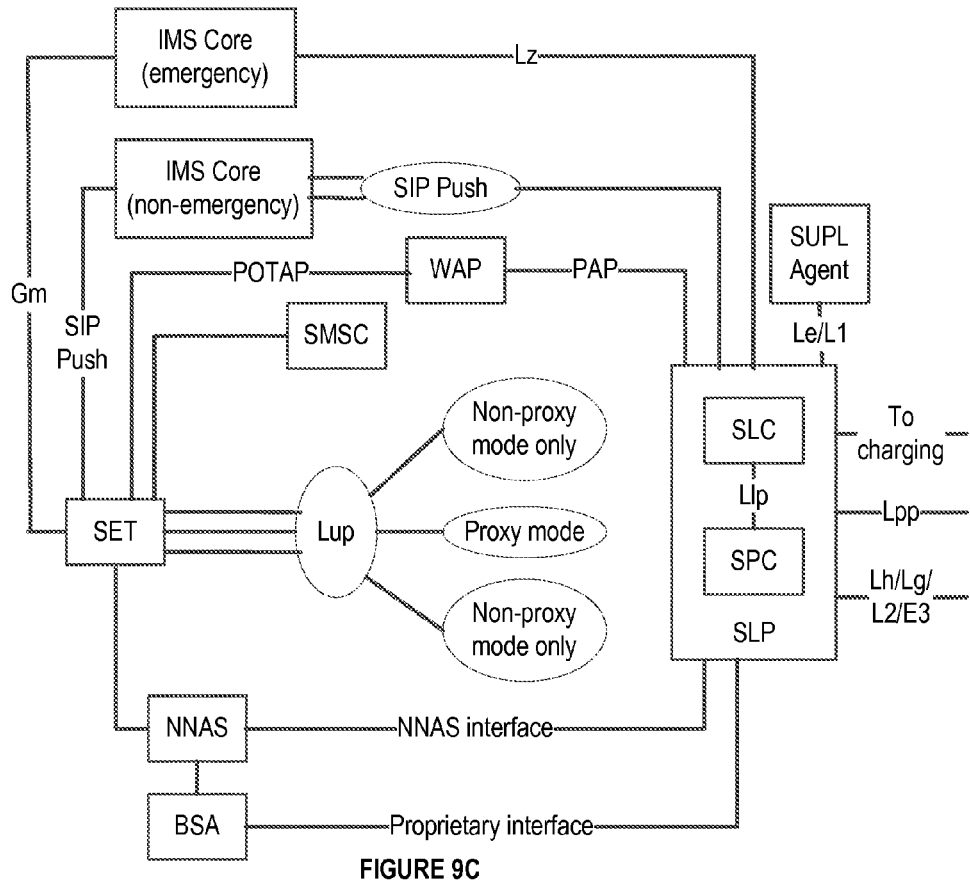
FIG. 9C depicts aspects of a positioning system.

In the User Plane, user device positioning is accomplished using SUPL, with LPP and LPPe, and the RAN user data bearer channels. The SUPL architecture is depicted in FIG. 9C.

The IP Multimedia Subsystem (IMS) Core is used for user device voice call control and other functions as defined by the SP. For SUPL, the SIP PUSH mechanism can be used to trigger a MT location calculation and is initiated over one of two interfaces depending on whether the calculation is related to an emergency call or not. Short Message Service Center (SMSC) can be used by SUPL to initiate a MT location calculation. The interfaces between the SLP and SMSC, and SMSC and SET may be not discussed further in this disclosure. A SUPL Agent is simply an external software or hardware client accessing user device location information in the SLP. The SUPL Enabled Terminal (SET) is a SUPL-enabled user device. The SUPL Location Platform (SLP) consists of the SUPL Location Center (SLC) coordinates the operation of SUPL in the network and interacts with the SET over user-plane bearer (e.g., IP). The SUPL Positioning Center (SPC) is responsible for all the position calculation procedures and delivery of assistance data. To obtain WAPS assistance data, the SLP needs a connection to the NNAS. The SLP may be of several variations: Home, Requesting, Visited, Emergency, or Discovered.

A WAPS/MBS server provides a way for WAPS content to be pushed to a user device. WAPS is commonly used to optimize web traffic for transmission across a RAN (using image compression, as an example). For SUPL, the WAPS Server can push a MT location initiation command to the SET. The Base Station Almanac (BSA) contains the Latitude and Longitude of the service provider's cell sites. The Assistance Server (NNAS) provides the WAPS Assistance Data to the SLP, as an instantiation of the SUPL Reference Retrieval Function. The NNAS provides WAPS assistance data to the E-SLP, to be used in SET Based or SET Assisted positioning modes. The WAPS position computation entity on the SLP maps the cell ID to cell LLA using the base station almanac. The cell LLA is sent through an interface to the NNAS to request assistance local to the area around the cell LLA. The NNAS looks up the database that contains both static (beacon LLAs) and dynamic (beacon atmospheric pressure and temperature etc.) components to provide assistance information to the SET for the different positioning modes of operation. An alternative approach requires the NNAS access to the cellular base station almanac. Based on the cell ID, the NNAS looks-up the latitude and longitude of the base-station and determines the corresponding WAPS beacons likely to be detectable in the geographical area where the SET is operating. The NNAS looks up a WAPS database that contains both static (beacon LLAs) and dynamic (beacon atmospheric pressure and temperature, beacon timing correction) components to provide assistance information to the SET for the different positioning modes of operation.

The E3 is a cdma2000 interface. The Gm is an SIP interface between the IMS and UT. The L1 is an interface between any LCS Client and the SLP. This is functionally equivalent to the E3 interface. The L2 is an LTE interface. The Le is an LCS Client to LCS Server (SLP) interface. The Lg/Lh are GSM/UTRAN interfaces. The LLP may be used to logically separate the Positioning Control Function and Positioning Data Function. The LTE Positioning Protocol (LPP) can be used to query the SPC for location lookups. The Lup is an IP-based interface used between the SLP and SET for delivering SUPL Service Management and Position Determination messages. The Lz is a SPC/IMS Core interface for emergency call MT location determination initiation. The WAPS Push Access Protocol (PAP) is used to push MT location initiation commands to the WAPS Server. The WAPS Push Over the Air Protocol (POTAP) is used to push MT location initiation commands to the SET. Using OMA extensions, a SIP MES- SAGE can be used to initiate a MT location initiation via an IMS Core. The NNAS Interface E-SMLC to NNAS transports signaling between the S-MLC and the NNAS. This interface conveys WAPS assistance data, and is similar in operation to the WARN utilized for A-GPS.

The architecture in FIG. 9C may also apply to a UE-Standalone positioning mode, where the user device location calculation is performed by the user device, and there is no assistance data provided by the SLP. Note that the accurate altitude estimate is also available as part of the location estimate in standalone mode (as in assisted modes) when user device pressure and temperature readings may be available. This is simpler network architecture, as there is no need for the SLP/BSA to interact with the NNAS.

Figure 20:
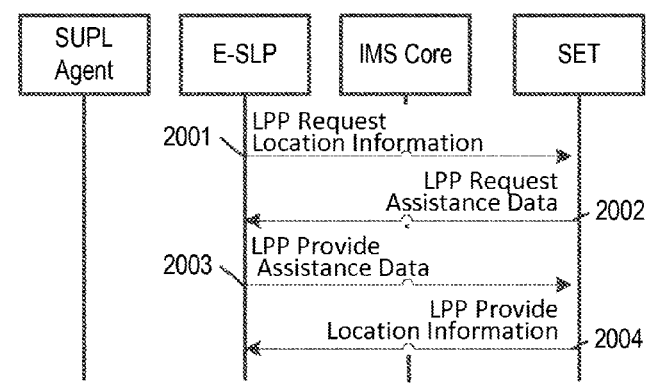
FIG. 20 illustrates aspects of a process for determining a user device's position.

Incorporating the WAPS location determination capabilities requires modifications to several of the network components as depicted in the procedural flows depicted in FIG. 20. The main changes may be comprised of:

An Assistance Server that contains the Beacon database, which includes both the static aspects such as the Beacon LLA information, and also the dynamic aspects such as Beacon timing corrections and Pressure/Temperature measurements. The NNAS provides assistance data to the E-SMLC/SLP to enable UE-Based and user device Assisted position determination modes. The E-SMLC/SLP network components may be enhanced to support the WAPS Positioning Calculation function, and to provide WAPS Assistance Data to the user device/SET as needed. This requires an interface to the NNAS, and the BSA. The Base Station Almanac (BSA) contains the Service Providers Cell Site LLA database.

The SLP and SET conduct LPP Positioning is shown in FIG. 20, which depicts: (Step 2001) In this case, a position using WAPS is calculated by the SET and used to meet the requested location QoS. The SLP sends a LPP Request Location Information to the user device, containing a WAPS-RequestLocationInformation element (e.g., indicating WAPS/MBS and a positioning method). (Step 2002) The SET requests WAPS assistance data from the SLP. (Step 2003) The SLP returns WAPS assistance data to the SET. (Step 2004) The SET returns the WAPS computed location to the SLP. For a SET Assisted position calculation in the SLP, the SET provides WAPS measurements instead of the SET computed location, and the SLP utilizes the returned WAPS measurements to calculate the SET's location. For a SET Standalone position calculation, Steps 2002 and 2003 may be omitted. The user device calculated position is returned at Step 2004. Once the location calculation is complete, the E-SLP sends the SUPL END message to the SET. The SET releases the secure IP connection to the SLP. The E-SLP returns the SET's location.

Acronyms

The following list of acronyms provides examples of various terms disclosed herein: 3rd Generation Partnership Project (3GPP); Third Generation Partnership Project 2 (3GPP2); Assisted Galileo and Additional Satellite Systems (A-GANSS); Assisted GNSS (A-GNSS); Assisted GPS (A-GPS); Advanced Encryption Standard (AES); Advanced Forward Link Trilateration (AFLT); Authentication and Key Agreement (AKA); Angle of Attack (AoA); Base Station (BS); Base Station Controller (BSC); Base Transceiver System (BTS); Code Division Multiple Access (CDMA); Circuit Switched (or Switching, depending on context) (CS); Call Service Control Function (CSCF); Cellular Telephone Industries Association. Their official name is now "CTIA—The Wireless Association" (CTIA); Emergency CSCF (E-CSCF); Enhanced Observed Time Difference (E-OTD); Enhanced SMLC (E-SMLC); Evolved UTRAN (E-UTRAN); Enhanced Forward Link Trilateration (EFLT); eNodeB (eNB); Evolved Node B (eNodeB; eNB); External PDU (ePDU); Emergency Services Message Entity (ESME); Electronic Serial Number (ESN); EmergencyServicesPositionRequest (cdma2000) (EPOSREQ); Emergency Services Routing Key (ESRK); Federal Communications Commission (FCC); Galileo and Additional Navigation Satellite Systems (GANSS); Generic Bootstrapping Architecture (GBA); GSM Edge Radio Access Network (GERAN); Global Navigation Satellite System (GLONASS); Gateway Mobile Location Center (GMLC); Greenwich Mean Time (GMT); Global Navigation Satellite System (GNSS); GeoPositionRequest (cdma2000) (GPOSREQ); Global Positioning System (GPS); Global System for Mobile Communications (GSM); Home Location Register (HLR); Home Subscriber Server (HSS); Hypertext Transfer Protocol (HTTP); Information Element (IE); Internal Location Protocol (ILP); IP Multimedia Subsystem (IMS); International Mobile Subscriber Identity (IMSI); Internet Protocol (IP); Inter System Position Request (cdma2000) (ISPOSREQ); Location-based Services (LBS); LoCation Services (LCS); Location Information Restriction (LIR); Location Management Unit (LMU); LTE Positioning Protocol (LPP); LTE Positioning Protocol Annex (LPPa); LCSParameterRequest (cdma2000) (LPREQ); Long Term Evolution (LTE); Multilateral Location and Monitoring Service (M-LMS); Media Access Control (MAC); Mobile Country Code (MCC); Mobile Directory Number (MDN); Mobile Equipment Identifier (MEID); Mobile Location Protocol (MLP); Mobility Management Entity (MME); Mobile Network Code (MNC); Mobile Originated (MO); Mobile Terminated (MT); Mobile Station System Time Offset (cdma2000) (MOB_SYS_T_OFFSET); MobileInformation (cdma2000) (MOBINFO); Mobile Positioning Center (MPC); MobilePositionCapability (cdma2000) (MPCAP); Mobile Station (MS); Mobile Switching Center (MSC); Mobile Subscriber Identification Number (MSIN); Mobile Station International ISDN Number (MSISDN); Mobile Terminated (MT); Non Access Stratum (NAS); Open Mobile Alliance (OMA); OriginationRequest (cdma2000) (OR-REQ); Observed Time Difference of Arrival (OTDOA); WAPS Push Access Protocol (PAP); Positioning Calculation Application Part (PCAP); Position Determining Entity (PDE); Packet Data Network (PDN); Protocol Data Unit (PDU); PDN Gateway (PGW); PositionRequest (cdma2000) (POSREQ); WAPS Push Over The Air Protocol (POTAP); Position Quality of Service (PQOS); Packet Switched (or Switching, depending on context) (PS); Public Safety Answering Point (PSAP); Quality of Position (QoP); Quality of Service (QoS); Quasi-Zenith Satellite System (QZSS); Radio Access Network (RAN); Time Reference PN Sequence Offset (cdma2000) (REF_PN); Registration Notification (cdma2000) (REGNOT); Radio Network Controller (RNC); Radio Resource Control (RRC); Radio Resource Location Protocol (RRLP); Round Trip Time (RTT); System Assisted Mobile Positioning through Satellite (cdma2000) (SAMPS); Standalone SMLC (SAS); Space Based Augmentation System (SBAS); ServingCellID (cdma2000) (SCELLID); Service Control Point (SCP); SUPL Enabled Terminal (SET); System Frame Number (also Single Frequency Network) (SFN); Serving GPRS Support Node (SGSN); Serving Gateway (SGW); Subscriber Identity Module (SIM); SUPL Location Center (SLC); Standard Location Immediate Answer (SLIA); Standard Location Immediate Request (SLIR); SUPL Location Platform (SLP); SMSDeliveryPointToPoint (cdma2000) (SMDPP); Serving Mobile Location Center (SMLC); Short Message Service (SMS); Short Message Service Center (SMSC); Service Node (SN); Service Provider (SP); SUPL Positioning Center (SPC); Secure User Plane Location (SUPL); Time Division Multiple Access (TDMA); Time-based Difference of Arrival (TDOA); Telecommunications Industry Association (TIA); Triggered Location Reporting Accept (SUPL, MLP) (TLRA); Triggered Location Report (SUPL, MLP) (TLREP); Triggered Location Reporting Request (SUPL, MLP) (TLRR); Transport Layer Security (TLS); Time of Day (TOD); Time of Week (TOW); Uplink Time-based Difference of Arrival (U-TDOA); User Equipment (UE); User Identity Module (UIM); UserPlane Location Protocol (ULP); User Terminal (UT); Universal Terrestrial Radio Access Network (UTRAN); Visitor Location Register (VLR); Wide Area Network (WAN); Wireless Application Protocol (WAPS); Wide Area Positioning System (WAPS); and Wide Area Reference Network (WARN).

Additional Aspects

One or more aspects may relate to systems, methods, computer program products and means for determining a position of a user device. Such systems may include one or more components or means (e.g., a processor, a computer and the like) that are operable to implement one or more method steps. Such computer program products may comprise a non-transitory computer usable medium having a computer readable program code embodied therein that is adapted to be executed to implement one or method steps. Such methods may include steps to: access timing data derived from positioning signals transmitted by remote transmitters; and cause the timing data or position data based on the timing data to be transmitted to a remote computing device.

Additional method steps may include: determine, based on the timing data, estimated distances between corresponding satellites and an estimated location of the processor, wherein the position data includes data that represents the estimated distances.

Additional method steps may include: determine a first set of estimated distances between corresponding remote transmitters and the processor; determine an estimated location of the processor, wherein the estimated location is based on the first set of estimated distances; and determine a second set of estimated distances between corresponding satellites and the estimated location of the processor, wherein the second set of estimated distances is based on the estimated location of the processor and constellation information associated with the corresponding satellites.

In accordance with some aspects, the position data includes data that represents the second set of estimated distances. In accordance with some aspects, the estimated location of the processor is further based on respective latitude, longitude and altitude parameters for each of the corresponding remote transmitters. The estimated location of the processor is further based on pressure and temperature measurements corresponding to atmospheric conditions near the processor. In accordance with some aspects, constellation information associated with the corresponding satellites includes a position and a timing correction for each of the corresponding satellites at a reference time. In accordance with some aspects, the position data includes the reference time.

Additional method steps may include: determine an estimated velocity of the processor; determine a first set of Doppler values for the corresponding satellites; and determine a second set of Doppler values based on the estimated velocity and the first set of Doppler values, wherein the position data includes data that represents the second set of Doppler values.

In accordance with some aspects, the position data includes data that represents the second set of estimated distances, and additional method steps may include: cause the position data to be transmitted to the remote computing device using a standard protocol for transmitting GNSS positioning information in a cellular network.

In accordance with some aspects, the position data includes data that represents the second set of estimated distances, and additional method steps may include: cause the position data to be transmitted to the remote computing device using a plurality of bits allocated for transmission of GNSS positioning information.

In accordance with some aspects, the position data includes data that represents the second set of estimated distances, and additional method steps may include: cause individual bits of the position data to be mapped into bits for GNSS information elements; and cause the individual bits of the position data to be transmitted to the remote computing device based on the mapping.

Additional method steps may include: access assistance data that includes a code, a time slot, and a frequency search space for each of the remote transmitters, wherein the assistance data further includes a transmitter latitude, a transmitter longitude and a transmitter altitude for each of the remote transmitters, wherein the assistance data further includes a pressure measurement and temperature measurement for each of the remote transmitters, wherein the assistance data further includes a unique identifier for each of the remote transmitters, and wherein the assistance data further includes a timing correction for each of the remote transmitters; and cause time-of-arrival measurements to be measured based on the assistance data.

In accordance with some aspects, the assistance data is accessed from a data source coupled to the processor. In accordance with some aspects, the assistance data is accessed via a control plane or a user plane communication channel.

Additional method steps may include: access assistance data that includes a code, a time slot, a quality indicator, and a frequency search space for each of the remote transmitters; and cause the first set of estimated distances to be determined based on the assistance data.

Additional method steps may include: determine a first set of estimated distances between corresponding remote transmitters and the processor using the timing data, wherein the position data includes data that represents the first set of estimated distances; and cause the position data to be transmitted to the remote computing device using a first plurality of bits allocated for transmission of geographic positioning information.

Additional method steps may include: cause an indicator to be transmitted to the remote computing device using a second plurality of bits allocated for transmission of a first type of geographic positioning information, wherein the indicator is configured to notify the remote computing device that the first set of estimated distances are not based on the first type of geographic positioning information.

Additional method steps may include: cause a compressed identifier corresponding to a remote transmitter to be transmitted to the remote computing device, wherein the remote computing device correlates the compressed identifier to a list of uncompressed identifiers corresponding to a geographic area defined by a base station communicating with the processor, a pressure measured at the processor, or a temperature measured at the processor.

Additional method steps may include: receive assistance data that includes a code, a time slot, a quality indicator, and a frequency search space for each of the remote transmitters, wherein the assistance data further includes a transmitter latitude, a transmitter longitude and a transmitter altitude for each of the remote transmitters, wherein the assistance data further includes a pressure measurement and temperature measurement for each of the remote transmitters, wherein the assistance data further includes a unique identifier for each of the remote transmitters, and wherein the assistance data further includes a timing correction for each of the remote transmitters; and estimate a latitude, a longitude and an altitude of the processor based on some or all of the assistance data and the timing data, wherein the position information transmitted to the remote computing device includes data that represents the estimated latitude, longitude and altitude or the processor.

Additional method steps may include: receive assistance data that includes a code, a time slot, and a frequency search space for each of the remote transmitters; and cause the timing data to be measured based on the assistance data, wherein the timing data or raw pseudo-range data based on the timing data is transmitted to the remote computing device, wherein the position information transmitted to the remote computing device includes pressure and temperature measurements corresponding to atmospheric conditions near the processor.

Additional method steps may include: determine a first set of estimated distances between corresponding remote transmitters and the processor using the timing data, wherein the position data transmitted to the remote computing device includes data that represents the first set of estimated distances; receive assistance data that includes a code, a time slot, and a frequency search space for each of the remote transmitters, wherein the assistance data further includes a transmitter latitude, a transmitter longitude and a transmitter altitude for each of the remote transmitters, wherein the assistance data further includes a pressure measurement and temperature measurement for each of the remote transmitters, wherein the assistance data further includes a unique identifier for each of the remote transmitters, and wherein the assistance data further includes a timing correction for each of the remote transmitters; and estimate a latitude, a longitude and an altitude of the processor based on some or all of the assistance data and the timing data, wherein the position information transmitted to the remote computing device includes data that represents the estimated latitude, longitude and altitude or the processor.

Additional method steps may include: determine a first set of estimated distances between corresponding remote transmitters and the processor using the timing data, wherein the position data transmitted to the remote computing device includes data that represents the first set of estimated distances; receive assistance data that includes a code, a time slot, and a frequency search space for each of the remote transmitters; and cause the timing data to be measured based on the assistance data, wherein the timing data or raw pseudo-range data based on the timing data is transmitted to the remote computing device, wherein the position information transmitted to the remote computing device includes pressure and temperature measurements corresponding to atmospheric conditions near the processor.

In accordance with certain aspects, the remote transmitters are identified based on their proximity to a first of a plurality of cellular transmitter that is exchanging information with the processor.

Other Aspects

Systems and methods described herein may be used for tracking the position of all things known in the art or later developed, for providing navigation to such things, for providing information relating to the position of such things, and other applications.

It is noted that the term "GPS" is referred to in the broader sense of including Global Navigation Satellite Systems (GNSS), which may include existing or later developed satellite positioning systems such as GLONASS, Galileo, and Compass/Beidou.

Transmitters may transmit positioning data/information in a signal received by the user device. Positioning data may include "timing data" as is understood in the art, and that can be used to determine a time-of-arrival (TOA) associated with the propagation time of the signal, which can be used to estimate a pseudorange (e.g., distance between user device and transmitter) by multiplying the propagation time of the signal by the speed of the signal (e.g., speed of light).

The various illustrative systems, methods, logical blocks, modules, circuits, and algorithm steps described herein may be implemented or performed directly in hardware, in software executed by a processor (also referred to as a "processing device"), or in a combination of the two. Accordingly, a processor may perform any one, some or all of the processing, computational and other method steps or other system functionality relating to the processes/methods and systems disclosed herein. Such processors may include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor can also refer to a chip, where that chip includes various components (e.g., a microprocessor and other components) that are configured to carry out any of the processing, computational and other method steps disclosed herein in addition to other functionality disclosed herein. The term "processor" may refer to one, two or more such devices. Furthermore, a processor may be implemented as a combination of processors (e.g., a combination of a DSP and a microprocessor), multiple microprocessors, a microprocessor in conjunction with a DSP core, or any other such configuration. It is noted that the terms "computer" or "computing device" or the like may refer to devices that include a processor.

Software may reside in RAM memory, flash memory, ROM memory, EPROM memory, EEPROM memory, registers, hard disk, a removable disk, a CD-ROM, or any other form of storage medium known in the art. An exemplary storage medium is "memory" coupled to a processor such that the processor can read information from, and write information to, the memory. In the alternative, the storage medium may be integral to the processor. The processor and the storage medium may reside in an ASIC. The ASIC may reside in a user device. In the alternative, the processor and the storage medium may reside as discrete components in a user device.

Software may be stored on or encoded as one or more instructions or code on a computer-readable medium. Computer-readable media includes computer storage media which may be any available media that can be accessed by a computer. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include transfers (uploads, downloads, e-mail, etc.) over the Internet and/or other computer networks via one or more data transfer protocols known or later developed in the art. When received within a computer system via one or more computer-readable media, such data and/or instruction-based expressions of the components may be processed by a processor (e.g., one or more processors) within a computer system in conjunction with execution of one or more other computer programs.

Aspects of systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include microcontrollers with memory (such as electronically erasable programmable read only memory (EEPROM)), embedded microprocessors, firmware, software, and the like. Aspects of systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and the like. Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Aspects of the present disclosure are typically carried out in or resident on a computing network. The computing network generally includes computer hardware components such as servers, monitors, I/O devices, network connection devices, as well as other associated hardware. In addition, the aspects and features described herein may include one or more application programs configured to receive, convert, process, store, retrieve, transfer and/or export data and other content and information. Data may be stored on any number of data sources that may be a hard disk drive or other storage media. A data source may include one or more types of a data sources, including hierarchical data sources, network data sources, relational data sources, non-relational data sources, object-oriented data sources, or another type of data source able to handle various data types (e.g., structured data that fits nicely into fields, rows, and columns, or data from various media sources such as graphics, photographs, audio, and video structured data . . . . For example, the data source 132 may store data in a fixed file format, such as XML, comma separated values, tab separated values, or fixed length fields. Alternatively, the data source may store data in a non-fixed file format (e.g., a NoSQL data source).

Unless the context clearly requires otherwise, throughout the description and the claims, the words "comprise," "comprising," "include," "including" and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and any incorporated references. When the words "or" or "and" are used in reference to a list of two or more items, each of those words cover all of the following interpretations: any of the items in the list, all of the items in the list, and any combination of the items in the list. Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Figures and associated description are provided for illustration, and it is to be understood that parts of any number or all figures may be rearranged, omitted, or combined. Moreover, a computation shown at one device may be performed across various devices. The term "system" may refer to one or more devices that may be geographically remote from each other. The term "device" may comprise one or more components (e.g., a processor, a memory, a screen). The term "module" may refer to hardware or software.

Description herein of systems and methods is not intended to be exhaustive or to limit the systems and methods to the precise forms disclosed. Indeed, systems and methods are described herein for illustrative purposes, and various equivalent modifications are possible as those skilled in the art will recognize. Terms used in the claims are not to be limited to only the embodiments disclosed expressly herein. Instead, those terms are to receive their broadest interpretation. "Exemplary" means serving as an example, instance or illustration. Any aspect and/or embodiment described herein as "exemplary" is not to be construed as preferred or advantageous over other aspects and/or embodiments.

Various modifications to aspects disclosed herein will be readily apparent to those skilled in the art, and the generic principles defined herein may be applied to various systems and methods without departing from the spirit or scope of the disclosure. Thus, the disclosure is not intended to be limited to the aspects shown herein but is to be accorded the widest scope consistent with the appended claims and their equivalents.

The invention claimed is:

1. A method for determining position data used to estimate a position of a receiver, the method comprising:
   determining a first set of estimated distances between a receiver and each of a plurality terrestrial transmitters based on positioning signals transmitted by the terrestrial transmitters;
   determining an estimated location of the receiver using the first set of estimated distances;
   determining a second set of estimated distances between each of a plurality of satellites and the estimated location of the receiver using the estimated location of the receiver and constellation information associated with the plurality of satellites, wherein the constellation information associated with the plurality of satellites includes a position and a timing correction for each of the plurality of satellites at a reference time; and
   transmitting the reference time and the second set of estimated distances to a computing device.

2. The method of claim 1, wherein the estimated location of the receiver is further based on latitude, longitude and altitude parameters for each of the plurality of terrestrial transmitters.

3. The method of claim 2, wherein the estimated location of the receiver is further based on a pressure measurement measured by a pressure sensor of the receiver.

4. The method of claim 1, wherein the method comprises:
determining an estimated velocity of the receiver;
determining a first set of Doppler values for the satellites;
determining a second set of Doppler values based on the estimated velocity and the first set of Doppler values; and
transmitting the second set of Doppler values to the computing device.

5. The method of claim 1, wherein the method comprises: transmitting the second set of estimated distances to the computing device using a standard protocol for transmitting GNSS positioning information in a cellular network.

6. The method of claim 1, wherein the method comprises: transmitting the second set of estimated distances to the computing device using a plurality of bits allocated for transmission of GNSS positioning information.

7. The method of claim 1, wherein the second set of estimated distances are transmitted to the computing device by mapping bits corresponding to the second set of estimated distances into a set of bits for GNSS information elements.

8. The method of claim 7, wherein the second set of estimated distances are transmitted to the computing device by transmitting the set of bits with the mapped bits corresponding to the second set of estimated distances to the computing device.

9. The method of claim 1, wherein the method comprises:
using assistance data to determine the estimated location of the receiver, wherein the assistance data specifies latitude, longitude, altitude, a pressure measurement, and a temperature measurement for each of the plurality of terrestrial transmitters.

10. The method of claim 9, wherein the assistance data is accessed from a data source coupled to the computing device.

11. The method of claim 9, wherein the assistance data is accessed via a control plane or a user plane communication channel.

12. The method of claim 1, wherein the method comprises:
transmitting, to the computing device, pressure and temperature measurements that correspond to atmospheric conditions at the receiver.

13. The method of claim 1, wherein the method comprises:
identifying one of more of the plurality of terrestrial transmitters based on its proximity to one or more corresponding cellular transmitters that are exchanging information with the receiver.

14. The method of claim 1, wherein the computing device is a remote server at a different location than the receiver.

15. The method of claim 1, wherein the first set of estimated distances are pseudo-ranges.

16. A method for determining position data used to estimate a position of a receiver, the method comprising:
determining a first set of estimated distances between a receiver and each of a plurality terrestrial transmitters based on positioning signals transmitted by the terrestrial transmitters;
using a first plurality of bits allocated for transmission of geographic positioning information to transmit the first set of estimated distances to a computing device;
using a second plurality of bits allocated for transmission of a first type of geographic positioning information to transmit an indicator to the computing device, wherein the indicator is specifies that the first set of estimated distances are not the first type of geographic positioning information; and
determining an estimated location of the receiver using the first set of estimated distances.

17. The method of claim 16, wherein the first type of geographic positioning information is GNSS geographic positioning information.

18. A method for determining position data used to estimate a position of a receiver, the method comprising:
determining a first set of estimated distances between a receiver and each of a plurality terrestrial transmitters based on positioning signals transmitted by the terrestrial transmitters;
using a first plurality of bits allocated for transmission of geographic positioning information to transmit the first set of estimated distances to a computing device; and
transmitting a compressed identifier corresponding to a transmitter from the plurality of terrestrial transmitters to the computing device, wherein the computing device compares the compressed identifier to a list of uncompressed identifiers; and
determining an estimated location of the receiver using the first set of estimated distances.

19. The method of claim 18, wherein the computing device identifies the latitude, longitude and altitude of the transmitter after matching the compressed identifier with one of the listed uncompressed identifiers that corresponds to the transmitter.

20. The method of claim 19, wherein the estimated location is determined using the latitude, longitude and altitude of the transmitter.

21. A method for determining position data used to estimate a position of a receiver, the method comprising:
determining a first set of estimated distances between a receiver and each of a plurality terrestrial transmitters based on positioning signals transmitted by the terrestrial transmitters;
receiving assistance data that specifies a code, a time slot, a quality indicator, a frequency search space, transmitter latitude, transmitter longitude, transmitter altitude, a pressure measurement, a temperature measurement, a unique identifier, and a timing correction for each of the plurality of terrestrial transmitters;
determining an estimated location of the receiver by estimating latitude, longitude and altitude of the receiver using the first set of estimated distances and some or all of the assistance data; and
transmitting the estimated latitude, longitude and altitude to a computing device.

22. A method for determining position data used to estimate a position of a receiver, the method comprising:
determining a first set of estimated distances between a receiver and each of a plurality terrestrial transmitters based on positioning signals transmitted by the terrestrial transmitters;
determining an estimated location of the receiver using the first set of estimated distances; and
transmitting a compressed identifier corresponding to a transmitter from the plurality of terrestrial transmitters from the receiver to a computing device, wherein the computing device compares the compressed identifier to a list of uncompressed identifiers that correspond to a geographic area defined by a base station communicating with the receiver.

23. The method of claim 22, wherein the computing device identifies the latitude, longitude and altitude of the transmitter after matching the compressed identifier with one of the listed uncompressed identifiers that corresponds to the transmitter.

24. The method of claim 23, wherein the estimated location is determined using the latitude, longitude and altitude of the transmitter.

* * * * *